US012626250B1

(12) United States Patent
Gertig et al.

(10) Patent No.: US 12,626,250 B1
(45) Date of Patent: May 12, 2026

(54) DIGITAL ASSET TRANSFER VIA ENCODED OBJECT

(71) Applicant: Block, Inc., Oakland, CA (US)

(72) Inventors: Andrew Gertig, Charlotte, NC (US); Michael Rihani, Palo Alto, CA (US); James Kraus, Charlotte, NC (US); Hugo Müller-Downing, Hawthorn East (AU); Bradley Wrage, Arroyo Grande, CA (US)

(73) Assignee: Block, Inc., Oakland, CA (US)

( * ) Notice: Subject to any disclaimer, the term of this patent is extended or adjusted under 35 U.S.C. 154(b) by 188 days.

(21) Appl. No.: 18/538,950

(22) Filed: Dec. 13, 2023

Related U.S. Application Data

(60) Provisional application No. 63/387,457, filed on Dec. 14, 2022.

(51) Int. Cl.
G06Q 20/38 (2012.01)
G06Q 20/06 (2012.01)

(52) U.S. Cl.
CPC ....... G06Q 20/385 (2013.01); G06Q 20/0655 (2013.01)

(58) Field of Classification Search
None
See application file for complete search history.

(56) References Cited

U.S. PATENT DOCUMENTS

| | | | | |
|---|---|---|---|---|
| 10,055,715 B1 * | 8/2018 | Grassadonia | .......... | G06Q 20/36 |
| 10,262,351 B2 * | 4/2019 | Boemi | ............... | G06Q 30/0617 |
| 10,621,561 B1 * | 4/2020 | Brock | .................. | G06Q 20/381 |
| 10,817,853 B1 * | 10/2020 | Brock | ................... | G06Q 20/02 |

(Continued)

FOREIGN PATENT DOCUMENTS

| | | | | |
|---|---|---|---|---|
| WO | WO-2022034592 A1 * | 2/2022 | .......... | G06Q 20/227 |
| WO | WO-2023235138 A1 * | 12/2023 | .......... | G06Q 20/381 |
| WO | WO-2024072915 A1 * | 4/2024 | ............. | G06Q 20/06 |

OTHER PUBLICATIONS

Johannes Ehrentraud. "Fintech and payments: regulating digital payment services and e-money." (Jul. 2021). Retrieved online Aug. 18, 2025. https://www.bis.org/fsi/publ/insights33.pdf (Year: 2021).*

(Continued)

*Primary Examiner* — James A Reagan
(74) *Attorney, Agent, or Firm* — Polsinelli PC

(57) ABSTRACT

In particular embodiments, a computing device of a cryptocurrency service provider may receive a cryptocurrency payment request and in response may generate a code for facilitating the cryptocurrency payment. The computing device may cause the code to be presented via a user interface of a user device associated with a recipient. The user interface may be associated with a first user interface element, the interaction with which causes one or more sharing options to be presented. The computing device may receive an input designating a user and an application for sharing the cryptocurrency payment request. The computing device may cause the cryptocurrency payment request to be shared with the user via the application. A second user interface element representative of the cryptocurrency payment request may be presented to the user. The user may make the cryptocurrency payment to the recipient by interacting with the second user interface element.

20 Claims, 24 Drawing Sheets

(56) References Cited

U.S. PATENT DOCUMENTS

| | | | | |
|---|---|---|---|---|
| 11,010,729 | B2* | 5/2021 | Musiala, Jr. | G06Q 20/0655 |
| 12,205,100 | B2* | 1/2025 | Caldwell | G06Q 20/322 |
| 2015/0324764 | A1* | 11/2015 | Van Rooyen | G06Q 20/02 |
| | | | | 705/69 |
| 2015/0324768 | A1* | 11/2015 | Filter | G06Q 20/023 |
| | | | | 705/41 |
| 2015/0324789 | A1* | 11/2015 | Dvorak | H04L 9/3297 |
| | | | | 705/67 |
| 2015/0356555 | A1* | 12/2015 | Pennanen | G06Q 20/4014 |
| | | | | 705/71 |
| 2016/0012465 | A1* | 1/2016 | Sharp | G06Q 20/321 |
| | | | | 705/14.17 |
| 2017/0345105 | A1* | 11/2017 | Isaacson | G06Q 20/40 |
| 2018/0174122 | A1* | 6/2018 | Mattingly | G06Q 20/202 |
| 2018/0232817 | A1* | 8/2018 | Isaacson | G06F 3/048 |
| 2019/0034888 | A1* | 1/2019 | Grassadonia | G06Q 20/065 |
| 2019/0230070 | A1* | 7/2019 | Isaacson | H04W 12/084 |
| 2020/0394651 | A1* | 12/2020 | Kreder, III | G06Q 20/22 |
| 2022/0051219 | A1* | 2/2022 | Sells | H04L 9/50 |
| 2022/0277274 | A1* | 9/2022 | Pyo | G06Q 20/389 |
| 2022/0292543 | A1* | 9/2022 | Henderson | G06Q 30/0252 |
| 2023/0004629 | A1* | 1/2023 | Aggarwal | G06Q 20/3274 |
| 2023/0298008 | A1* | 9/2023 | Sarin | H04L 9/50 |
| | | | | 705/69 |
| 2023/0368293 | A1* | 11/2023 | Navarro | G06Q 20/405 |
| 2024/0144245 | A1* | 5/2024 | Bhandekar | G06Q 20/108 |
| 2024/0428229 | A1* | 12/2024 | Durvasula | G06Q 20/40 |
| 2025/0209461 | A1* | 6/2025 | Medure | G06Q 20/4014 |

OTHER PUBLICATIONS

Ali Waqas et al. "A Secured Architecture for Transactions in Micro E-Commerce using QR scan, eWallet Payment Applications with Adaptation of Blockchain." (Sep. 4, 2020). Retrieved online Aug. 18, 2025. (Year: 2020) https://www.researchtrend.net/ijet/pdf/88%20A%20Secured%20Architecture%20for%20Transactions%20in%20Micro%20E-Commerce%20using%20QR%20scan,%20e-Wallet%20Payment%20Applications%20with%20Adaptation%20of%20Blockchain-3390-Addepalli%20Lavanya.pdf (Year: 2020).*

Deutsche Bank Research. "The Future of Payments." (Jan. 2020). Retrieved online Aug. 18, 2025. https://www.dbresearch.com/PROD/RPS_EN-PROD/PROD0000000000504508/The_Future_of_Payments_-_Part_II_Moving_to_Digita.pdf (Year: 2020).*

* cited by examiner

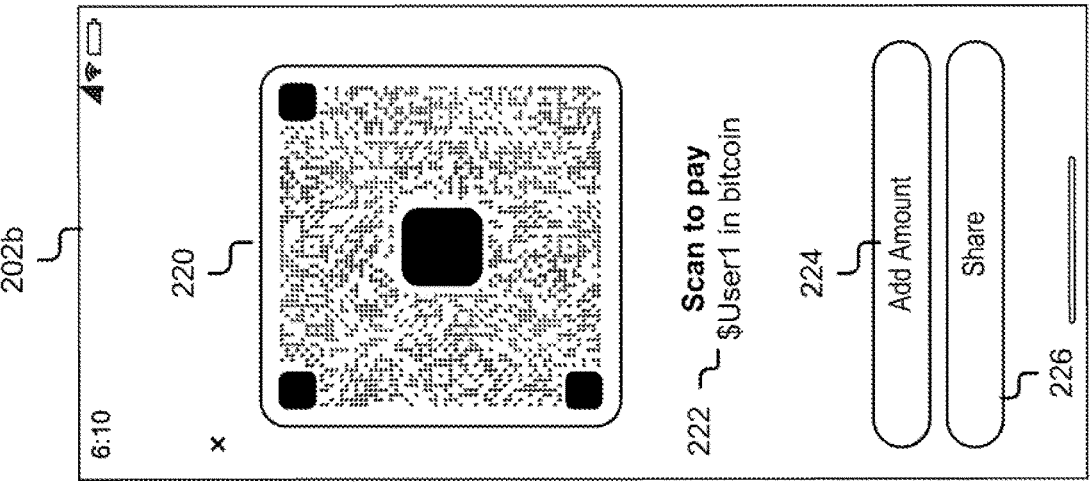
*FIG. 2B*
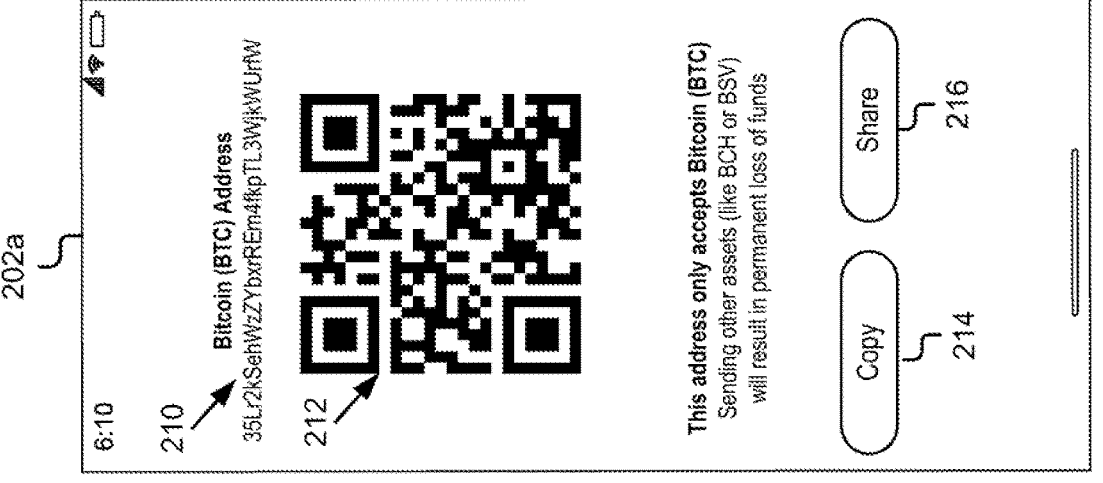
*FIG. 2A*

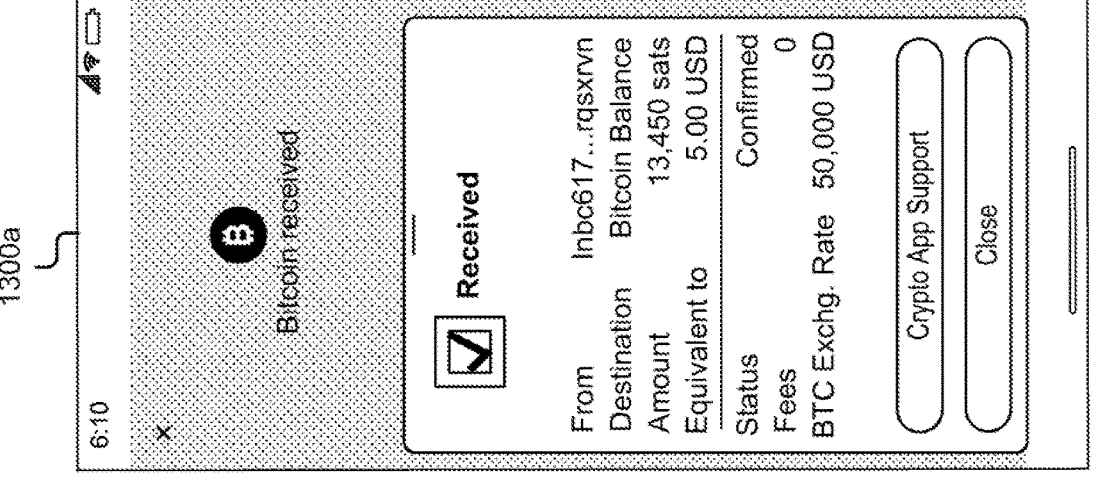

6:10

Bitcoin received

☑ Received

From              Inbc617...rqsxrvn
Destination    Bitcoin Balance
Amount          13,450 sats
Equivalent to  5.00 USD Status    Confirmed
Fees       0
BTC Exchg. Rate  50,000 USD Crypto App Support Close 1300a

FIG. 13A

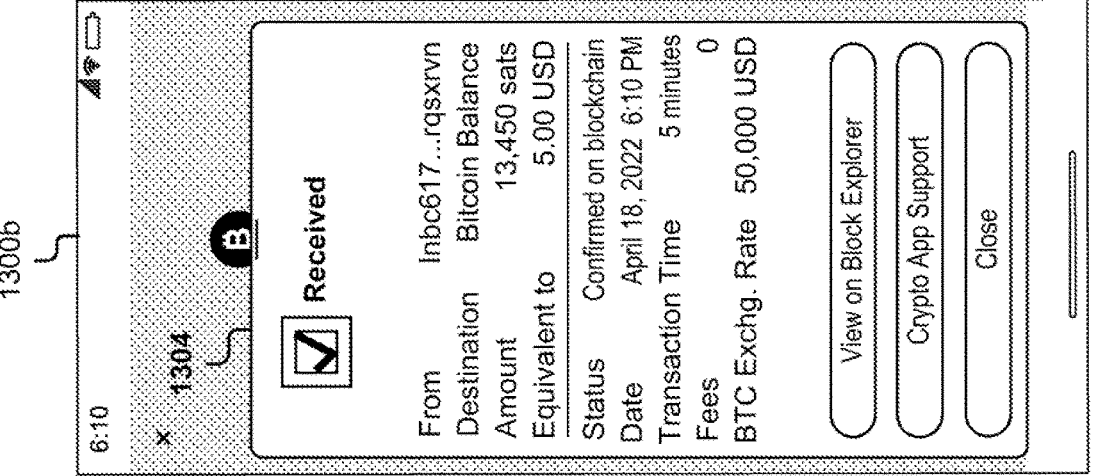

6:10

☑ Received

From              Inbc617...rqsxrvn
Destination    Bitcoin Balance
Amount          13,450 sats
Equivalent to  5.00 USD Status              Confirmed on blockchain
Date                April 18, 2022  6:10 PM
Transaction Time  5 minutes
Fees                0
BTC Exchg. Rate  50,000 USD View on Block Explorer Crypto App Support Close 1300b

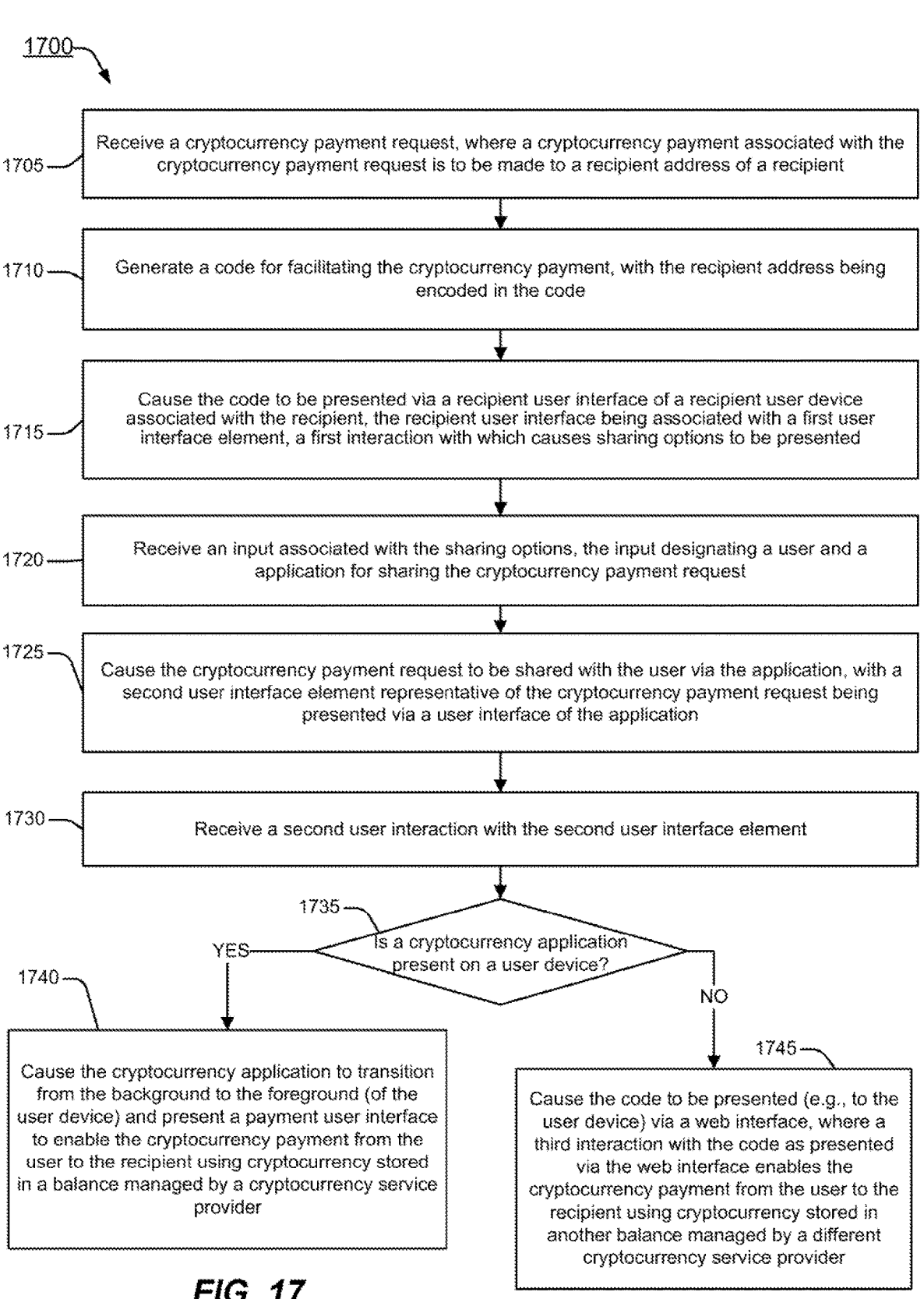

1700

1705 — Receive a cryptocurrency payment request, where a cryptocurrency payment associated with the cryptocurrency payment request is to be made to a recipient address of a recipient 1710 — Generate a code for facilitating the cryptocurrency payment, with the recipient address being encoded in the code 1715 — Cause the code to be presented via a recipient user interface of a recipient user device associated with the recipient, the recipient user interface being associated with a first user interface element, a first interaction with which causes sharing options to be presented 1720 — Receive an input associated with the sharing options, the input designating a user and a application for sharing the cryptocurrency payment request 1725 — Cause the cryptocurrency payment request to be shared with the user via the application, with a second user interface element representative of the cryptocurrency payment request being presented via a user interface of the application 1730 — Receive a second user interaction with the second user interface element 1735 — Is a cryptocurrency application present on a user device?

YES

NO

1740 — Cause the cryptocurrency application to transition from the background to the foreground (of the user device) and present a payment user interface to enable the cryptocurrency payment from the user to the recipient using cryptocurrency stored in a balance managed by a cryptocurrency service provider 1745 — Cause the code to be presented (e.g., to the user device) via a web interface, where a third interaction with the code as presented via the web interface enables the cryptocurrency payment from the user to the recipient using cryptocurrency stored in another balance managed by a different cryptocurrency service provider

*FIG. 17*

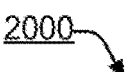

2000

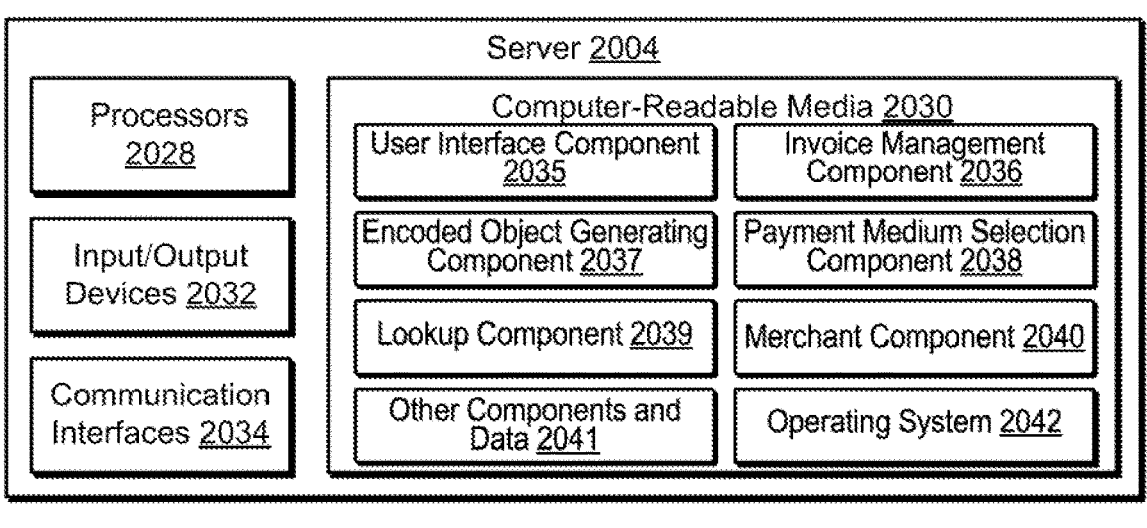

Server 2004

Processors 2028

Input/Output Devices 2032

Communication Interfaces 2034

Computer-Readable Media 2030

User Interface Component 2035

Invoice Management Component 2036

Encoded Object Generating Component 2037

Payment Medium Selection Component 2038

Lookup Component 2039

Merchant Component 2040

Other Components and Data 2041

Operating System 2042

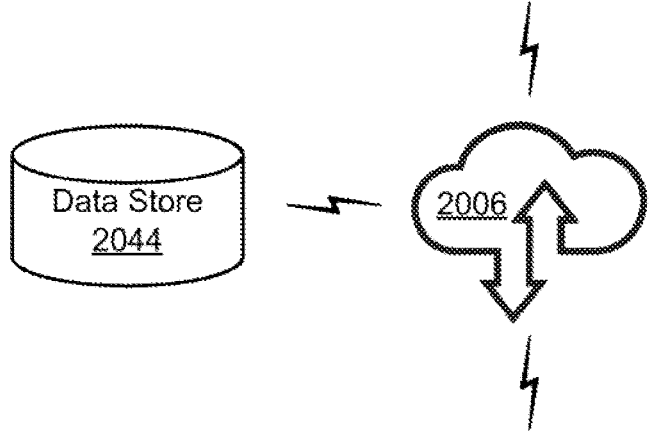

Data Store 2044

2006

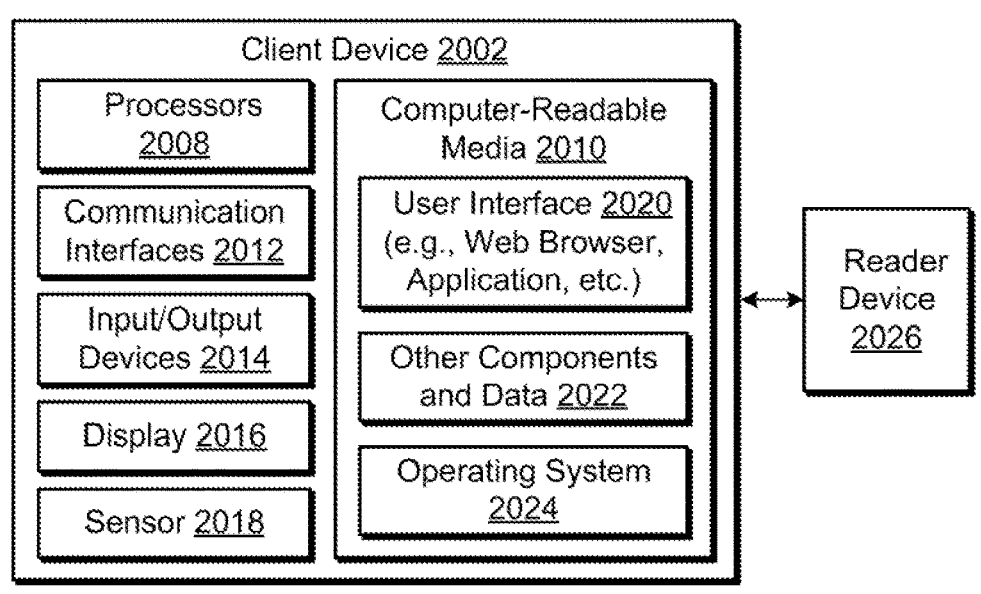

Client Device 2002

Processors 2008

Communication Interfaces 2012

Input/Output Devices 2014

Display 2016

Sensor 2018

Computer-Readable Media 2010

User Interface 2020 (e.g., Web Browser, Application, etc.)

Other Components and Data 2022

Operating System 2024

Reader Device 2026

*FIG. 20*

DIGITAL ASSET TRANSFER VIA ENCODED OBJECT

CROSS-REFERENCE TO RELATED APPLICATIONS

This application claims the benefit of, and priority to, U.S. Provisional Patent Application No. 63/387,457, filed Dec. 14, 2022, entitled "DIGITAL ASSET TRANSFER VIA ENCODED OBJECT," the full disclosure of which is incorporated herein by reference in its entirety.

TECHNICAL FIELD

Blockchain networks provide a variety of functionality in connection with implementing and securely transferring various digital assets, examples of which include cryptocurrencies and blockchain-based tokens, such as tokens for "smart contracts" and non-fungible tokens (or "NFTs"). Additional decentralized networks have been developed to sit on top of the blockchain networks and enable transactions involving such digital assets to be executed without committing every transaction to the underlying blockchain network. These additional decentralized networks are referred to as "layer 2" networks because their framework and protocol is built on top of a blockchain network, which is referred to as a "layer 1" network.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical components or features. Moreover, multiple instances of the same part are designated by a common prefix separated from the instance number by a dash. The figures are not drawn to scale.

FIGS. 2A-2B illustrate example graphical user interfaces for receiving cryptocurrency payment.

FIGS. 13A-13B illustrate example graphical user interfaces showing example transaction summaries associated with a cryptocurrency payment according to some embodiments disclosed herein.

FIG. 17 illustrates an example process for processing a cryptocurrency payment request according to some embodiments disclosed herein.

FIG. 20 is a block diagram illustrating a system for performing techniques described herein according to some embodiments disclosed herein.

DETAILED DESCRIPTION

Figure 1:
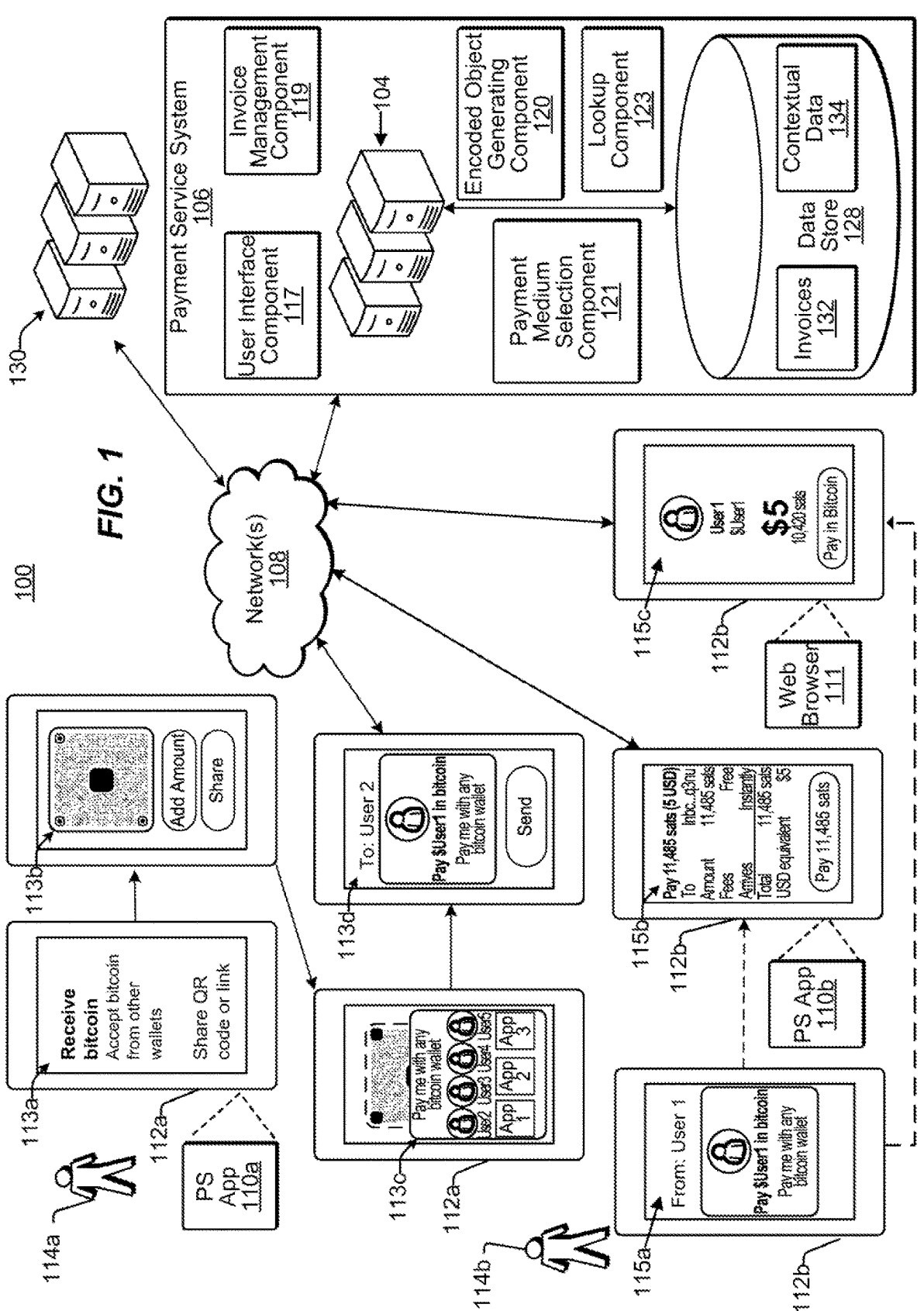
FIG. 1 is an example operating environment for processing user payment requests and performing payment transactions according to some embodiments disclosed herein.

Techniques described herein relate to transferring digital assets using an encoded object. For example, techniques described herein relate to enabling a payment recipient (also referred to herein as a recipient, a payee, or a receiving user) to receive a payment (e.g., cryptocurrency payment) from a user using an encoded object, such as a quick response (QR) code, deep link, combination of the foregoing, or the like, via a blockchain network. The encoded object can be a machine-readable and/or otherwise interactable object that can be encoded with, have embedded therein, be associated with, or the like data identifying party(s) to the payment (e.g., sender and/or recipient), user identifiers or tags, an amount, a particular invoice, a location of a particular invoice (e.g., a uniform resource locator (URL)), recipient preferences, a token associated with the invoice, payment, and/or the like. In examples, the encoded object can be shared, for example, via a messaging application, in a forum, on a social networking platform, at a point-of-sale, or the like. When a payor (also referred to as a sender, a sending user, or a payment sender) receives a payment request comprising the encoded object and interacts with said encoded object (e.g., by touch input, image capture, or the like), techniques described herein can cause an optimal or otherwise preferred medium to be initiated and utilized to facilitate a payment associated with the payment request. A payment making "medium" (or a payment medium) can refer to a payment application, a cryptocurrency application, a web browser, or the like. In some examples, in response to the payor interacting with the encoded object, the user device of the payor can (alone or in combination with one or more backend computing devices, such as servers of a payment service system) determine whether to (i) initiate or otherwise cause a payment application and/or associated cryptocurrency application of a payment service system (e.g., payment service system 106) to be presented to facilitate the payment or (ii) redirect to a web browser that can facilitate the payment. In examples, the web browser can present the encoded object, or another encoded object that is based at least in part on the encoded object, that can be captured (e.g., using an image capturing device or the like) and/or otherwise interacted with by the user. In some examples, in response to the encoded object(s) being captured and/or otherwise interacted with (e.g., by the user), the web browser can initiate a download and/or onboarding process for the payment application and/or associated cryptocurrency application or can initiate another cryptocurrency application to facilitate the payment. The payment can be made via a cryptocurrency network, which as described below, can be a layer 1 network, layer 2 network, or the like.

Blockchain networks provide a variety of functionality in connection with implementing and securely transferring various digital assets, examples of which include cryptocurrencies and blockchain-based tokens, such as tokens for "smart contracts" and non-fungible tokens (or "NFTs"). While their architecture and protocols provide a variety of advantages that support the secure transfer of digital assets (and provenance of physical assets in various cases), many blockchain networks have scaling limitations. For example, a fixed number of transactions can occur on the Bitcoin and Ethereum networks each day due to computer processing requirements and associated time delays.

Due to this, additional decentralized networks have been developed to sit on top of blockchain networks and enable transactions involving blockchain-implemented digital assets to be executed, without recording every transaction to a blockchain network. These additional decentralized networks are referred to as "layer 2" networks (or, "off-chain" solutions) because their framework and protocol is built on top of a blockchain network, which is referred to as a "layer 1" network. In addition to the Bitcoin and Ethereum networks, examples of layer 1 blockchain networks include the Litecoin blockchain network, the Ripple blockchain network, and the Hyperledger blockchain network. Examples of layer 2 decentralized networks include the Lightning Network, Ethereum Plasma, Raiden, and RIF Lumino. Techniques described herein are not limited to such example layer 1 and layer 2 networks.

The underlying architecture and protocols for implementing some layer 2 decentralized networks are based on the notion of a "channel," which is a medium of communication that can be established between two nodes of the decentralized network. In channel-based implementations, an individual node may not be directly connected to every other node of the decentralized network via a channel, and only pairs of nodes between which a channel has been established are directly connected. Once a channel is established between nodes of the decentralized network, any number of transactions can occur back and forth over the channel between the nodes and, notably, are executed without requiring the transactions be recorded to the blockchain network at the time they are executed. In other words, many transactions are executed "off-chain," thereby enabling the transactions to be completed without the use of, or with a reduced use of, computer processing and/or associated time delays as is the case with conventional, layer 1 networks. In particular, the use of channels to execute transactions "off-chain" enables transactions to be completed without involving computationally intensive tasks such as validation. As such, usage of computational resources is reduced for nodes participating in the validation process. Further, executing transactions using "channels" reduces the processing associated with propagating the transaction to each node in the network, as would otherwise be required with conventional, layer 1 networks. Propagation of the transaction involves sending communications which involve computational resources to prepare, transmit, and receive information between nodes. Additionally, bandwidth usage is reduced as a result from the reduction in communications between nodes in the network. Conducting transactions "off-chain" also reduces the delay in completing a transaction, as discussed above, which can result from network congestion and queued transactions. Accordingly, using "channels" improves the responsiveness (i.e., efficiency and speed) of processing a transaction. Conducting transactions "off-chain" also enables privacy to be improved, especially in the case of public blockchain networks, as the transaction is not publicly broadcasted.

As described herein, a payment recipient may provide an input through a payment service application associated with a payment service system to configure a cryptocurrency payment request from another user, wallet, or a cryptocurrency service provider. In at least one example, the payment service application associated with the payment service system may be or include a cryptocurrency application to buy, sell, transfer, send, and/or receive cryptocurrencies (e.g., Bitcoin, Litecoin, Ethereum, etc.). The payment service system discussed herein may be a cryptocurrency service provider or system. In response to the input, the payment service system may generate a payment invoice including recipient details and payment information that may be displayed to a paying user (or payor) for making the requested payment to the recipient. An example payment invoice may include, for example, a name of the payment recipient, an image representative of the recipient, a unique user identifier (e.g., user ID) associated with the recipient to enable the payor to verify an identity of the recipient, payment amount requested by the recipient, a cryptocurrency amount that is equivalent to the requested payment amount, etc. In some examples, the payment service system may encode the generated invoice into an object, such as a deep link, configured according to embodiments disclosed herein. The encoded object (also interchangeably herein referred to as a deep link) encoding the invoice may be represented as a scannable matrix barcode (e.g., QR code, data matrix, etc.) and/or a payment link for facilitating the cryptocurrency payment. In some examples, a wallet address or receiving account of the recipient may also be encoded in the object. In some examples, a user ID or other unique user identifier or unique payment request identifier may be encoded in the object. Upon generating the encoded object, the payment service system may cause the payment service application on the recipient's device to display the generated encoded object. The recipient may also be presented with an option to share the encoded object (e.g., deep link) with another user via one or more sharing applications. The one or more sharing applications can be, for example and without limitation, a messaging application, an email application, a social networking application, a blogging application, a microblogging application, a forum application, a close proximity data transfer application, or a collaboration application. The recipient can select or designate a particular user and a sharing application on which to share the encoded object with that user. For example, the recipient can choose to share the deep link as a message with the user through a messaging application.

In some examples, a paying user (e.g., a payor) may receive, through a user device, a deep link from a payment recipient requesting to make a cryptocurrency payment. The deep link may be received on a particular application executing on the user device. For example, the deep link may be received as a text message from the recipient on a messaging application. In at least one example, upon interacting with the deep link, the paying user may be automatically directed to a particular payment interface on a cryptocurrency application or a web interface on a web browser (e.g., if the cryptocurrency application is not installed and available on the user device and/or a determination is otherwise made to present the web interface instead of the cryptocurrency application), where the paying user may review the payment invoice and approve the requested payment. When a paying user interacts with the deep link, the payment service system may intelligently determine which of several applications installed on the user device to launch or bring to the foreground in order for the paying user to make the requested payment to the recipient. By way of an example and without limitation, if a cryptocurrency application associated with the payment service system is installed on the user device, then, after the paying user interacts with the deep link, the payment service system may instruct the user device to launch the cryptocurrency application and present the payment invoice thereon for the paying user to make the payment. In at least one example, the deep link is configured such that the paying user's device automatically identifies and launches (e.g., without input from the user) the cryptocurrency application associated with the payment service system which presents the invoice. As another example, if the cryptocurrency application associated with the payment service system is not installed on the user device and/or a determination is made to use an application and/or other medium, then the payment service system may instruct the user device to launch a web browser to present the payment invoice on a web interface. In at least one example, the deep link is configured such that the paying user's device automatically launches the web browser to send a request to display the payment invoice to the payment service system via the web interface without the user providing any additional input. Therefore, techniques described herein can be used to streamline the user interactions involved in facilitating a payment request, sharing or initiating the payment request, and/or responding to the payment request with an appropriate payment such that device information and/or context data can be used to determine which medium to use to facilitate the payment (vs. a user needing to manually navigate through multiple applications and/or user interfaces to do the same). Furthermore, the deep link and generated code are more easily shared than shared invoices associated with previous techniques. In addition, the deep link enables a user device receiving the deep link to automatically identify an application to process the payment, avoiding potential confusion from user's unsure how to respond to the payment request.

In some examples, the payment service system discussed herein may select a particular application to launch on a user device in response to the payor interacting with an encoded object, such as a deep link. For instance, responsive to the user interaction with the deep link, the payment service system may automatically decide whether to launch a default cryptocurrency application associated with the payment service system, an alternate cryptocurrency application installed on the payor's device, a web browser, or another payment application. In at least one example, the payment service system may perform this application selection based on contextual data. The contextual data may include data associated with a recipient (e.g., payee preferences, wallet balance, previous transaction data, previously-selected default application for cryptocurrency payment transactions, applications installed on payee's user device for payments, etc.), data associated with payor (e.g., e.g., payor preferences, wallet balance, previous transaction data, previously-selected default application for cryptocurrency payment transactions, applications installed on payor's user device for payments, etc.), device data (e.g., which applications are currently running, whether applications are running in the foreground or background, compute required and/or available for running applications, which applications are installed, etc.), and data associated with different payment applications including the payment service application associated with the payment service system. Therefore, techniques described herein can be used to intelligently determine a recommendation for a preferred or otherwise optimal medium (e.g., cryptocurrency application, web browser, or the like) to use to complete the payment.

When a user interacts with an encoded object (or a deep link), the techniques described herein further ensure safety against attempts of a fraudulent user to phish fraudulent or misrepresented payments from a payor. Additionally, the techniques herein ensure safety against attempts by a fraudulent user of spoofing an invoice and attempting to redirect payments to their own wallet address. For instance, when a payor interacts with the deep link, the payment link associated with the deep link may be sent to the payment service system for checking or verification. Upon receiving the user interaction with the deep link, the payment service system may retrieve or lookup the payment invoice associated with the deep link. The payment service system may try to retrieve the invoice from a datastore using a unique user ID or token of the recipient included in the deep link. In some examples, the datastore may store invoices generated by the payment service system based on recipients' past payment requests. Each invoice stored in the datastore may be associated with a unique user ID or a token associated with a recipient who sent the payment request. If the invoice is found, the payment service system may provide the retrieved invoice to the payor either on a web interface or a cryptocurrency application to make the requested payment to the recipient. If, however, the invoice is not found, the payment service system may notify the payor that the payment link is invalid or that it seems to be received from a suspicious account or fraudulent user. In this way, the payment service system may prevent or slow spoofing or phishing attacks associated with the payment transactions discussed herein.

In some examples, the techniques described herein provide a better or improved technical mechanism for requesting and receiving cryptocurrency payment at least because the recipient or the payee does not have to copy, verify, or share a long string of characters and/or numbers identifying their wallet address. Techniques described herein facilitate the payor completing a transaction associated with an invoice using multiple cryptocurrency networks. For example, transactions from the same invoice can be processed over either a layer 1 cryptocurrency network (e.g., Bitcoin network) or a layer 2 cryptocurrency network (e.g., the Lightning network). This gives the recipient and the payor more flexibility, as discussed in further detail herein. Techniques described herein provide the recipient options to add custom or specific amounts and/or notes when requesting payment. Additionally, since the generated deep links are registered and recorded by the payment service system with unique user IDs of payees or tokens, techniques described herein incorporate fraud prevention techniques. Making a payment responsive to an invoice through the encoded object (e.g., deep link) as described herein avoids spoofing or phishing attacks, for example, because the code or payment link is confirmed and validated (e.g., by reference to a user ID or token) at the payment service system that the code or payment link is indeed associated with the recipient and not with any other (fraudulent) user.

While techniques described herein relate to cryptocurrencies and transactions relating to cryptocurrencies, such techniques can be similarly applicable to any other currencies (e.g., fiat currencies), payment methods, service, or the like. Similarly, while techniques described herein relate to enabling a user to receive a cryptocurrency payment from another user, such techniques can be similarly applicable to any functionalities including social networking functionalities, banking functionalities, non-fungible token functionalities, or the like. That is, techniques described herein are not limited to "payment" service and functionalities.

FIG. 1 illustrates an example operating environment for processing user payment requests and performing payment transactions as discussed herein. The example environment 100 can include a payment service system 106 (also referred to herein as a cryptocurrency service system or a cryptocurrency service provider). The payment service system 106 can include servers 104 and a datastore 128 that are configured to exchange electronic communications through network(s) 108 with one or more other computing devices. For example, the server(s) 104 or datastore 128 may exchange electronic communications with at least one of a user device 112a associated with first user 114a by way of a payment service (PS) app 110a executing on user device 112a or a user device 112b associated with second user 114b by way of a payment service app 110b or a web browser 111 executing on user device 112b. The payment service app 110a and 110b (shown as PS App 110a and PS App 110b) can each be respective instances of the payment service app provided by a payment service operating the payment service system 106. The payment service can be associated with the payment service system 106 such that operations described as being performed by the payment service can be performed by the payment service system 106. In some examples, the payment service system 106 can comprise a "backend" and the PS app 110a, 110b can be referred to as a "client" or "frontend." In some examples, individual of the components described herein can comprise a "frontend" and other components can comprise a "backend." In general, the components described herein as performing operations can be combined or divided, can have different names or functions, be used alone or in combination, be implemented by the server(s) 104 or user devices, and so on.

As discussed above, the first user 114a, which may be a payment recipient or payee, may send a cryptocurrency payment request to the payment service system 106 through the PS app 110a executing on the user device 112a. For example, the PS app 110a may display a graphical user interface 113a on the user device 112a. Using the graphical user interface 113a, the first user 114a may request funds, payment, or a particular cryptocurrency (e.g., Bitcoin) from other wallets or users, such as second user 114b. While making the payment request, the first user 114a may provide the wallet address or identifier to which the requested payment should be made (e.g., the first user's 114a wallet address). The payment request and associated payee details may be received by a user interface component 117 of the payment service system 106. Upon receiving the payment request and associated details from the first user 114a, the user interface component 117 may coordinate with an invoice management component 119 to generate a payment invoice to request payment from another user, such as the second user 114b. The generated invoice, or an identifier associated therewith, may be encoded or embedded into an object, such as a deep link by an encoded object generating component 120. The encoded object (or deep link) embedded in the invoice may be represented as a matrix barcode (e.g., QR code, data matrix code, etc.) and/or a payment link for facilitating the payment. In some examples, the first user's wallet address or account, an identifier associated therewith, an amount, user preferences, and/or the like may also be encoded in or otherwise associated with the deep link. The deep link may be shared by a user (e.g., the recipient) with another user (e.g., the payor) via one or more sharing applications (e.g., messaging application, email application) to request payment from the other user.

In some examples, the user interface component 117 may cause the PS app 110a to display the generated deep link included in the code in a graphical user interface 113b. As depicted, the graphical user interface 113b may display the code for facilitating requested payment to the first user 114a. In some examples, in addition to the generated code or link, the first user 114a may also be presented with an "Add Amount" option to add a custom/specific amount to request from the second user 114b and a "Share" option to share the code or link with another user (e.g., second user 114b) via one or more sharing applications discussed herein. Upon receiving a selection of the "Share" option, the user device 112a may display a graphical user interface 113c that presents one or more other users, including the second user 114b, and one or more applications on which the deep link including the payment link or QR code can be shared. The one or more applications can be, for example, a messaging application, an email application, a social networking application, a blogging application, a microblogging application, a forum application, or a collaboration application, any of which can be centralized or decentralized (e.g., Nostr).

Using the graphical user interface 113c, the first user 114a can designate a particular user (e.g., second user 114b) and a particular application for sharing the encoded object, such as the deep link discussed herein. For example, the first user 114a may select the second user 114b and a messaging application for sharing the payment code or link with the second user 114b. Based on the user and application selection, the user device 112a may display a graphical user interface 113d associated with the messaging application having a message including the deep link, the selected second user to which the deep link is to be shared, and/or a send option to send the message to the second user 114b.

Using the interface 113d, the first user 114a may share the deep link with the second user 114b for them to make the requested payment to the first user 114a. More specifically, using the interface 113d, the first user 114a may request to receive a particular cryptocurrency (e.g., Bitcoin) from the second user 114b by sending the payment code or link to the second user 114b as a text message via the messaging application. The message including the payment link or code may be sent from the first user 114a to the second user 114b via the network 108. Additional details regarding a payment recipient (e.g., payee) generating a payment request and sending the payment request to another user (i.e., payor) via one or more applications (e.g., messaging application, email application, etc.) are shown and discussed herein in reference to at least FIGS. 3, 4A-4C, and 5A-5E.

The second user 114b may receive a payment request from the first user 114a. For instance, the second user 114b may receive the payment request to make a payment (e.g., send an amount of a particular cryptocurrency equal to the requested payment amount) to the first user 114a. As discussed above, the first user 114a may share the payment request in the form of a deep link including a payment link and/or a QR code with the second user 114b on a messaging application. Upon receiving the payment request from the first user 114a, a particular instance of the messaging application executing on the second user device 112b may display a graphical user interface 115a. In at least one example, the graphical user interface 115a may include an interactable deep link. The deep link may be configured such that, upon interaction with the deep link, the second user device 112b may direct the second user 114b to either a graphical user interface 115b or a graphical user interface 115c. For instance, based at least in part on receiving an indication of an interaction with the deep link in the graphical user interface 115a and based at least in part on a determination that an instance of a cryptocurrency application (e.g., PS app 110b) associated with the payment service system 106 (or cryptocurrency service provider) is installed on the user device 112b of the second user 114b, the user interface component 117 may cause the PS app 110b (e.g., cryptocurrency application) to transition to the foreground and present a payment user interface 115b to enable the second user 114b to make the cryptocurrency payment to the first user 114a (e.g., the recipient) using cryptocurrency stored in a balance managed by the payment service system 106.

If, on the other hand, the particular cryptocurrency application or PS app 110b associated with the payment service system 106 is not installed on the user device 112b of the second user or a determination is otherwise made not to use the PS app 110b/or to use another application, then the user interface component 117 may cause the second user device 112b to display the graphical user interface 115c on a web browser 111. That is the user interface component 117 can cause a redirect to the web browser 111. The graphical user interface 115c on the web browser 111 may enable the second user 114b to make the cryptocurrency payment to the first user 114a using cryptocurrency stored in another balance managed by a different cryptocurrency service provider (e.g., third-party service provider) or a different application than the PS app 110b. As described herein, in some examples, the second user device 112b can be automatically directed to the different application than the PS app 110b based on the deep link, a revised version of the deep link generated by components of the payment service system 106, or contextual information associated with the deep link.

The server(s) 104 may store one or more functional components that enable the payment service to perform operations as described herein. For example, the server(s) 104 can include a user interface component 117, an invoice management component 119, an encoded object generating component 120, a payment medium selection component

121, and a lookup component 123, among other components. Further, the payment service system 106 can access and maintain a datastore 128. In at least one example, and as illustrated, the datastore 128 can store invoices 132 associated with various payment requests received from users or transactions involving the users of the environment 100. Each of the invoices can be associated with an invoice identifier, a location/resource identifier, or the like. The datastore 128 can also store contextual data 134, which may include data associated with the recipient (e.g., recipient preferences, wallet balance, previous transaction data, default application for cryptocurrency payment transactions, applications installed on the recipient's user device for payments, etc.), data associated with the payor (e.g., payor preferences, wallet balance, previous transaction data, default application for cryptocurrency payment transactions, applications installed on payor's user device for payments, etc.), and data associated with different payment applications including the PS app 110a, 110b associated with the payment service system 106. The datastore 128 can store additional or alternative data, as described herein. The server(s) 104 can store additional or alternative functional components. Additional details associated with the server(s) 104 and associated functional components are described herein. In some examples, operations described as being performed by the functional components associated with the server(s) 104 can be performed in whole or in part by the PS app 110a, 110b.

In some examples, the user interface component 117 may manage user interactions associated with users (e.g., users 114a and 114b) and display of graphical user interfaces involved in a particular payment transaction, such as a cryptocurrency payment transaction discussed herein. The user interface component 117 may act as a frontend of the payment service system 106 to receive user input(s) from a user (e.g., first user 114a or second user 114b), send the received input(s) to other components of the payment service system 106 for processing, and send the processed data back to the user. Based on the processing and received user input(s), the user interface component 117 may send instructions to cause a display of one or more graphical user interfaces on the user's device. As an example, the user interface component 117 may receive a cryptocurrency payment request, via the PS app 110a, from the first user 114a for a cryptocurrency payment to be made to a recipient address of the first user 114a. Based on the request from the first user 114a, the user interface component 117 may coordinate or communicate with other components of the payment service system 106 to generate a payment invoice for the requested payment and an encoded object, such as a deep link, embedding the generated payment invoice. The encoded object may include a payment link and/or a code to facilitate the cryptocurrency payment. Once the encoded object is generated, the user interface component 117 may send instructions to the PS app 110a to cause the graphical user interface 113b to be displayed on the user device 112a. Using the graphical user interface 113b, the first user 114a may share the encoded object including the payment link and/or code for making the payment to the first user 114a with other user(s), such as the second user 114b as discussed herein. As another example, the user interface component 117 may receive a user interaction by the second user 114b on the encoded object shared by the first user 114a. Upon receiving the user interaction with the encoded object, the user interface component 117 may communicate with other components of the payment service system 106 to retrieve an invoice associated with the encoded object (e.g., through the lookup component 123) and determine which particular payment medium (e.g., payment service application associated with the payment service system 106, alternate cryptocurrency or payment application, web browser, etc.) to trigger to display the invoice for making the payment. Once the invoice is retrieved and the payment medium has been selected, the user interface component 117 may send instructions to the user device 112b to either generate the graphical user interface 115b on the PS app 110b or the graphical user interface 115c on the web browser 111.

In some examples, the invoice management component 119 may manage payment invoices for payment requests received from users (e.g., payees, payment receiving customers). Managing a payment invoice may include generating the payment invoice and storing the generated invoice in the datastore 128 for later retrieval or lookup. For instance, the user interface component 117 may receive a payment request from a user, such as user 114a. The payment request may include an identifier or tag associated with a user (e.g., $user1), a user picture, an image, an avatar, a representation, etc., an amount to be received from another user or wallet, notes or remarks for the requested payment, etc. The user interface component 117 may send this payment request to the invoice management component 119, which may generate a payment invoice including one or more items, such as user's picture, image, avatar, representation, etc., user ID, requested amount, notes/remarks, etc. The invoice management component 119 may store this generated payment invoice in the datastore 128 for later retrieval and/or lookup. Furthermore, the invoice management component 119 may send the generated invoice to the encoded object generating component 120, which may generate an encoded object, such as a deep link, embedding the generated invoice as discussed in further detail below.

Figure 4C:
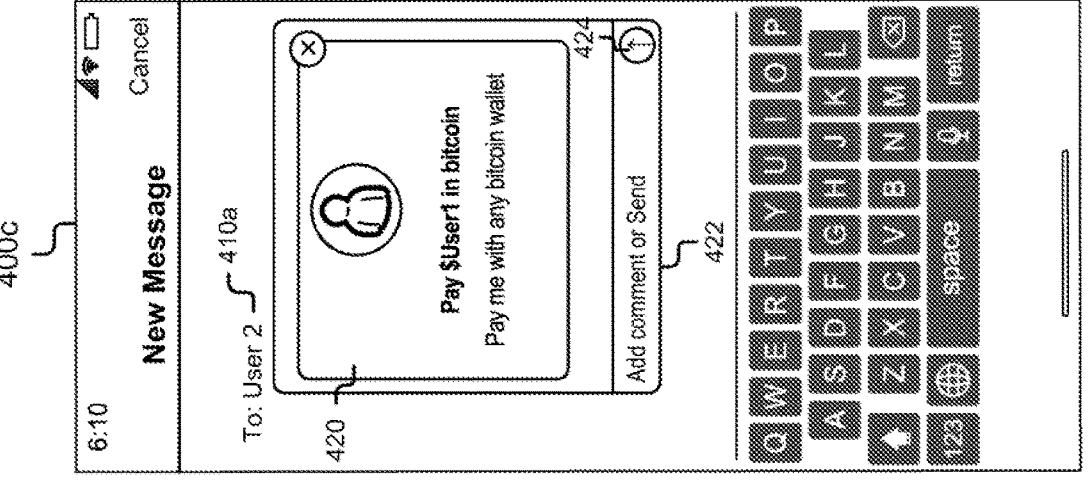
FIGS. 4A-4C illustrate example graphical user interfaces of a payee sharing an encoded object, such as a deep link, with a payor via a sharing application to receive cryptocurrency payment according to some embodiments disclosed herein.

In some examples, the encoded object generating component 120 may generate an encoded object (e.g., deep link) to facilitate a transfer of an asset (e.g., receive a cryptocurrency payment) from one account or wallet of a first user to another account or wallet of a second user. The encoded object may embed, encode, tokenize, or refer to a payment invoice generated for a particular payment requested by a recipient. The encoded object embedding the payment invoice may be represented as a matrix barcode, such as a QR code (e.g., as shown in FIG. 4A) or a payment link (e.g., as shown in FIG. 4C). Based on interaction with the matrix barcode or payment link, the paying user can make a payment (e.g., cryptocurrency payment) to the receiving customer. The encoded object may be sharable by a recipient (or payee of a payment) with one or more payors via one or more sharing applications (e.g., messaging application, email application, social-networking application, etc.) executing on the recipient's user device 112a. In some examples, a user interface element rendered in association with the object (e.g., deep link or the like) shared can include one or more identifying features of the requesting user such that the user receiving the request (e.g., the paying user) can verify the identity of the requesting user prior to sending the payment.

In some examples, the encoded object may include a QR code and the payment link, a QR code, a payment link, or another machine-readable or user-interactable object. The QR code may be used by the paying user to make the requested payment in-person (e.g., via a capture of the QR code as presented by the receiving user's user device) or via a capture of the QR code presented by the paying user's user device (e.g., via the paying user's a user device). For example, the paying user may scan the QR code shown on the recipient's user device 112a using a camera. Upon scanning the QR code, the paying user's user device 112b may present the invoice for which the paying user is making the payment and pay the invoice using a balance stored in their wallet using a payment service application 110b, as shown for example in FIGS. 9A-9D. In some examples, the paying user may make the payment to the recipient remotely using the QR code or the payment link. For instance, the recipient may share the deep link represented as a QR code or a payment link with the paying user on a sharing application, such as a messaging application as shown in graphical user interface 113d or in FIGS. 4A-4C.

In some examples, upon capturing an image of the QR code and/or otherwise interacting with the payment link, the payor may be directed to a default cryptocurrency application (e.g., as shown in interface 115b or in FIGS. 6A-6D) associated with the payment service system 106 to make the cryptocurrency payment to the recipient if the cryptocurrency application is determined to be installed on the payor's device 112b and/or otherwise determined to be optimal for facilitating the payment. If the default cryptocurrency application associated with the payment service system 106 is not present on the payor's device 112b, then the payor may be directed to a web interface 115c on the web browser 111. The web interface 115c can present the QR code or a payment link, or another QR code or payment link based on the QR code or payment link, for interaction by the second user 114b. In some examples, an interaction with the QR code or payment link presented via the web interface 115c can cause an instance of the PS app, or a portion thereof, to be downloaded onto the user device 112b and can launch an onboarding flow to onboard the user to the payment service. In some examples, upon completion of the download and/or onboarding, the deep link can launch the PS app to facilitate payment. In some examples, an interaction with the QR code or payment link presented by the web interface 115c can cause an alternative cryptocurrency application to be launched (e.g., initiated, transitioned to the foreground, etc.) to facilitate the payment. That is, in such an example, the payor may be directed to a web interface 115c of the web browser 111 to make the payment to the recipient using an alternate cryptocurrency application, as shown for example in interface 115c or in FIGS. 7A-7D.

In some embodiments, the payment medium selection component 121 may select the particular medium (e.g., PS app 110b, web browser 111, other application, etc.) to be used for facilitating the payment upon the payor interacting with the payment link. In some examples, the payment medium selection component 121 may select a particular payment application to be displayed in response to a user (e.g., a payor) interacting with an encoded object. Specifically, the payment medium selection component 121 may determine, upon a payor interacting with a payment link shared by a payee, which payment application of a plurality of payment applications installed on the payor's device 112b to display, launch, or foreground for making the payment to the payee. If in case the PS app 110b (e.g., a default cryptocurrency application) associated with the payment service system 106 is installed on the payor's device 112b, then the payment medium selection component 121 may coordinate with the user interface component 117 to cause the PS app 110b to transition to the foreground and present a payment user interface (e.g., interface 115b) to enable the payor to make the cryptocurrency payment to the recipient using cryptocurrency stored in a balance managed by the cryptocurrency service provider or the payment service system 106. If the cryptocurrency application associated with the payment service system 106 (e.g., the PS app 110*b*) is not installed on the payor's device 112*b* or is otherwise determined not to be optimal for facilitating the payment, then the payment medium selection component 121 may coordinate with the user interface component 117 to cause the invoice associated with the payment link to be presented via a web interface (e.g., interface 115*c*) on a web browser. That is, the payment medium selection component 121 may interrupt and redirect the user to a web interface. From the web interface, the payor may make the cryptocurrency payment to the recipient using cryptocurrency stored in another balance managed by a different cryptocurrency service provider or system. For example, using the web interface 115*c*, the payor may choose to make the payment (e.g., send Bitcoin) to a wallet of the recipient using an alternate cryptocurrency application installed on the payor's device.

In some examples, the payment medium selection component 121 may select a particular payment application from a plurality of payment applications installed on a user device 112*b* based on contextual data 134. The contextual data may include data associated with recipient (e.g., recipient preferences, wallet balance, previous transaction data, default application for cryptocurrency payment transactions, applications installed on recipient's user device for payments, etc.), data associated with payor (e.g., e.g., payor preferences, wallet balance, previous transaction data, default application for cryptocurrency payment transactions, applications installed on payor's user device for payments, etc.), device data (e.g., which applications are currency running, whether applications are running in the foreground or background, compute required and/or available for running applications, which applications are installed, etc.), and data associated with different payment applications including the PS app 110*b* associated with the payment service system 106. In some examples, by default, if the cryptocurrency application (including, but not limited to the PS app 110*b*) associated with the payment service system 106 is installed on the user's device 112*b*, then the payment medium selection component 121 may select the default cryptocurrency application to be presented to the user for making the payment to the recipient. In some examples, if the cryptocurrency application associated with the payment service system 106 is not installed and there are other alternative payment applications installed on the user device 112*b*, then the payment medium selection component 121 may select an alternate payment application based on contextual data. In some examples, the payment medium selection component 121 can select any of the payment applications based on contextual data with or without regard to whether one of the applications is considered a "default" application. As an example, the payment medium selection component 121 may determine recipient preferences with respect to receiving a payment from an alternate payment application. As another example, the payment medium selection component 121 may determine payor preferences with respect to sending a payment using the alternate payment application. As another example, the payment medium selection component 121 may determine speed of transactions associated with different payment applications (i.e., how long past transactions took to process or received by the recipients) in order to select an alternate payment application for making the payment. In some examples, the payment medium selection component 121 can select a payment application based on speed, application availability, application state (e.g., open, closed, running, running in the foreground, running in the background, etc.), application resources, exchange rate, asset availability (e.g., in wallets associated with different applications), fraud data (e.g., number of disputed transactions, frequency of disputed transactions, number/percentage of accounts flagged for fraud, etc.), preferences of parties to the transaction, rules, and/or the like. Although some examples describe the payment medium selection component 121 as the sole determining component for which application or service is to be used to facilitate a payment in response to a payment request, in certain examples, the user device 112*b* itself can be configured to interpret the deep link to select an appropriate application or service, as described herein. The payment medium selection component 121 and/or the user device 112*b* can utilize rules, a machine trained model, or the like to determine which medium (e.g., application, web interface, etc.) to initialize to facilitate the payment.

In at least one example, a training component (not shown) associated with the server(s) 104 can train one or more models using artificial intelligence, such as machine learning mechanism(s). In such an example, the training component can analyze training data, which can comprise prior payments and data associated with such payments, including contextual data, applications selected or otherwise used for facilitating the payments, and/or the like. Such training data can be used to train a model to output an indication of which medium to use for facilitating a payment. Additional details associated with machine learning are described below.

Figures 5A, 5B, 5C:
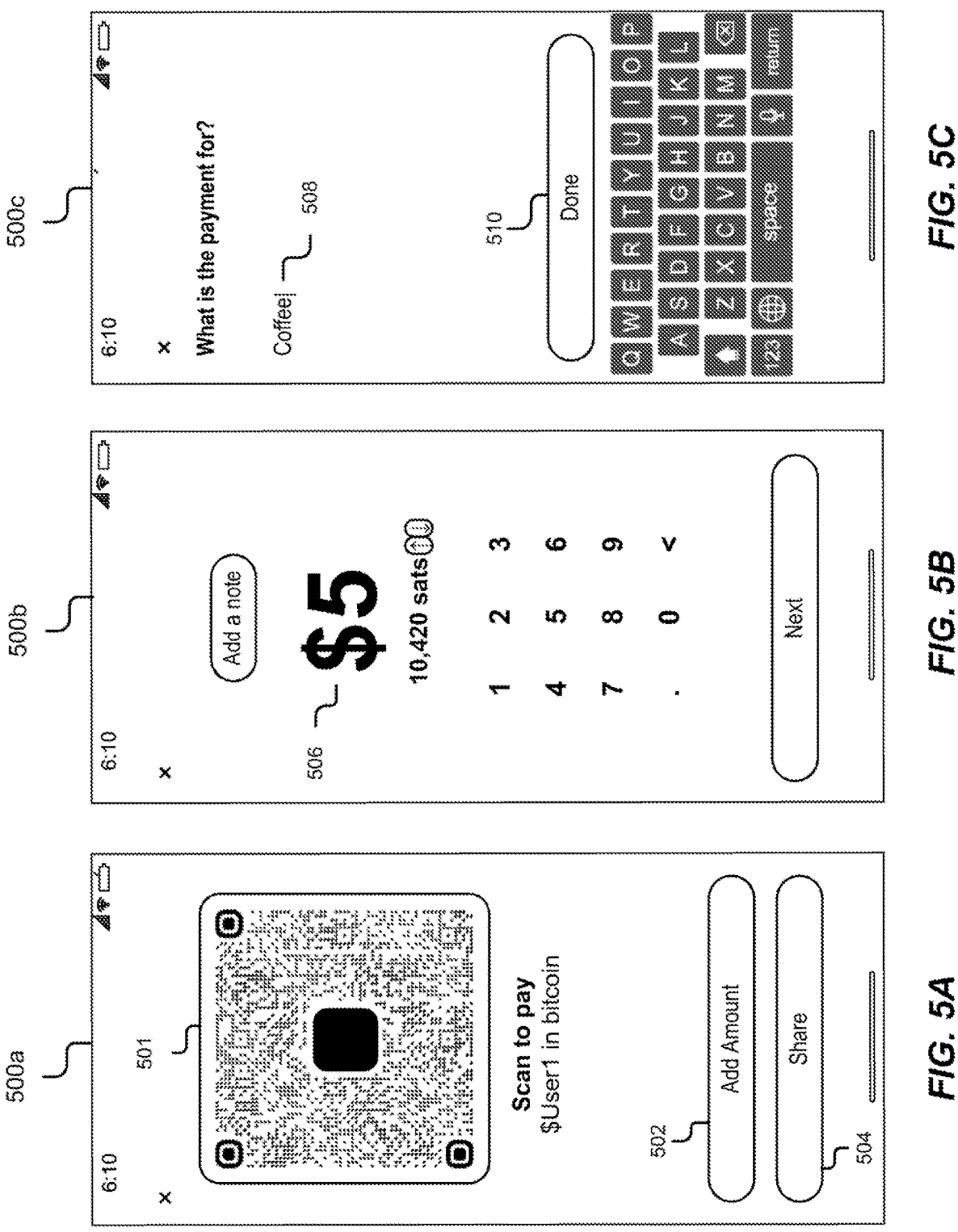
FIGS. 5A-5E illustrate example graphical user interfaces for adding an amount to a payment request according to some embodiments disclosed herein.
Figures 5D, 5E:
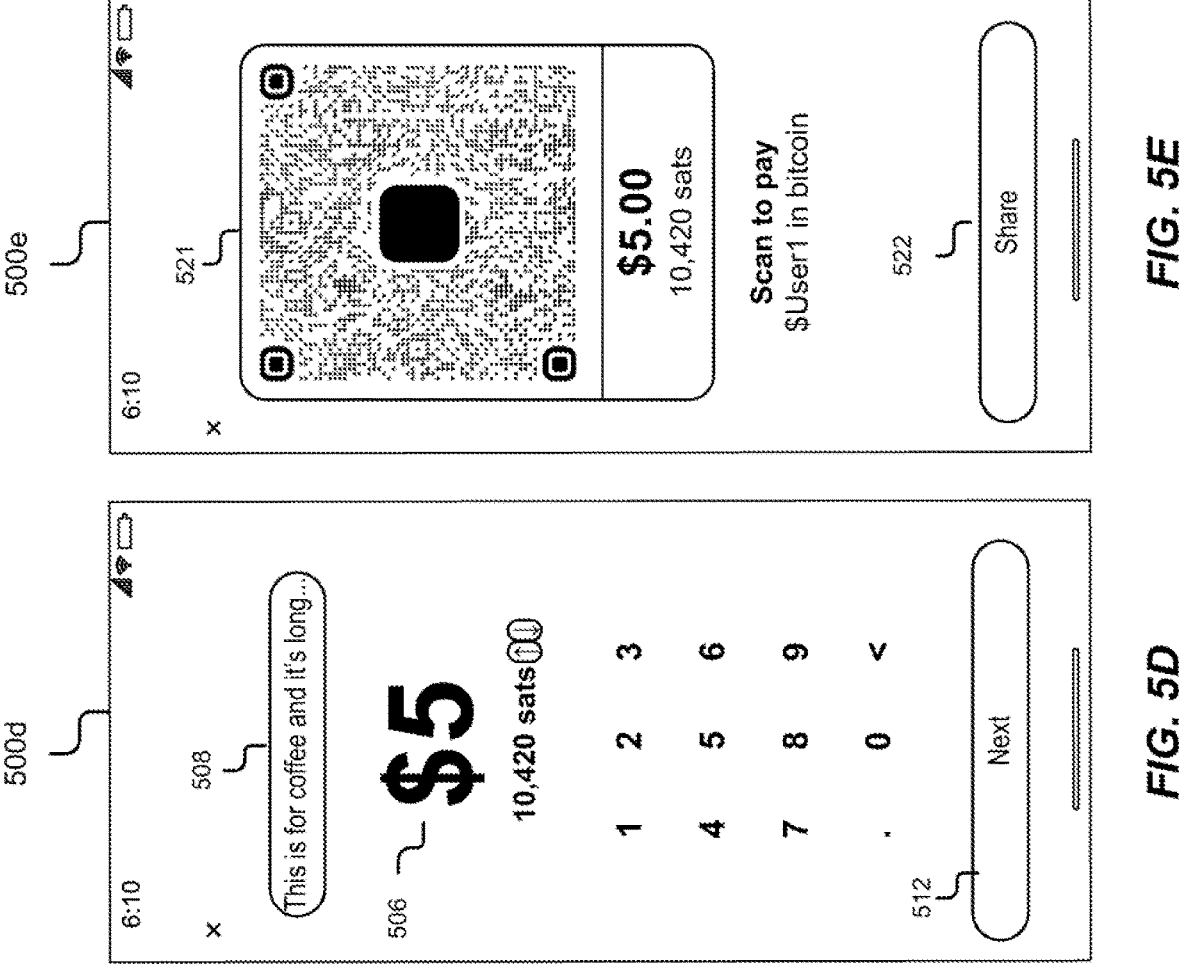
Figures 6A, 6B:
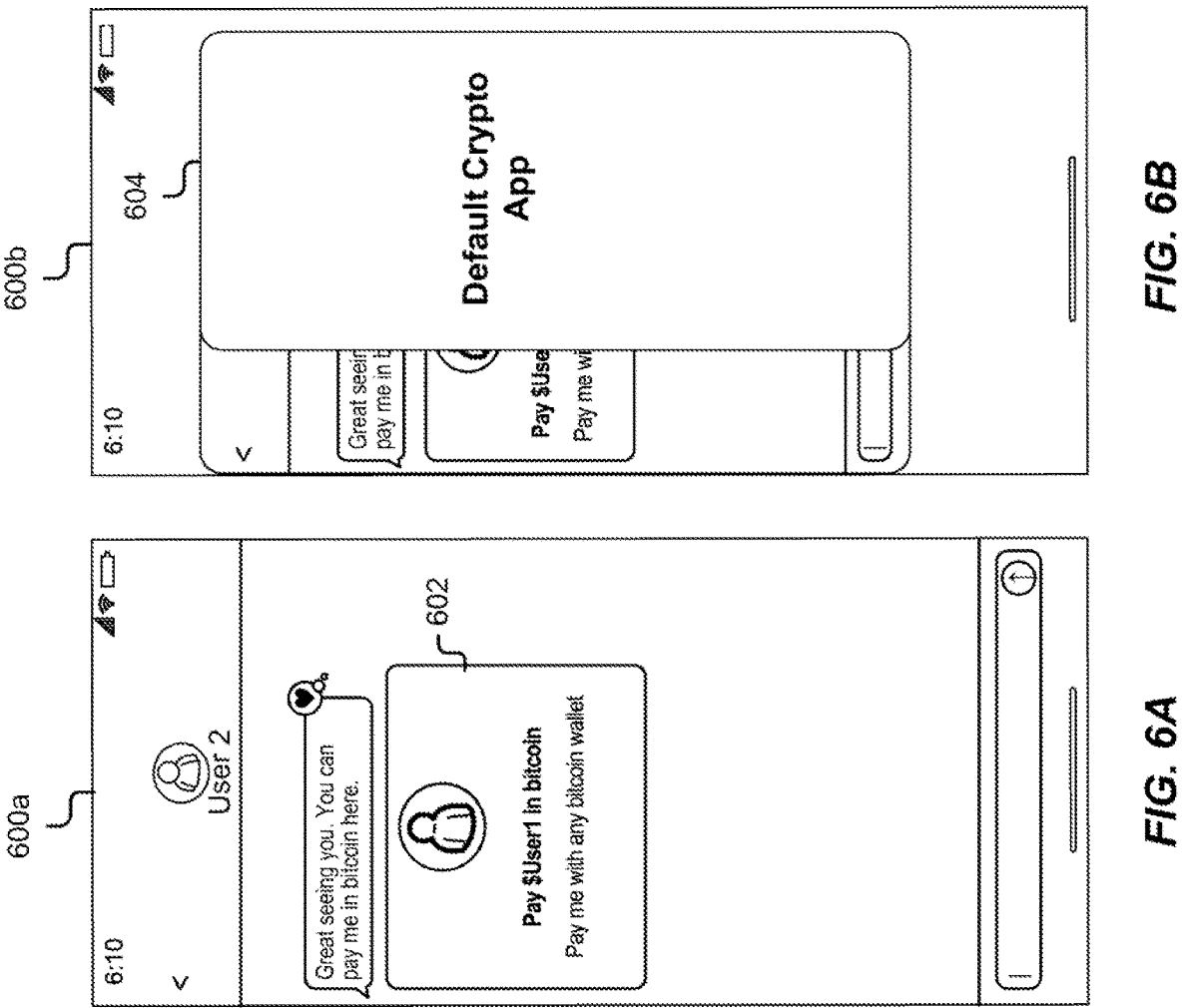
FIGS. 6A-6D illustrate example graphical user interfaces for displaying and activating an encoded object, such as a deep link, to make a cryptocurrency payment according to some embodiments disclosed herein.
Figures 6C, 6D:
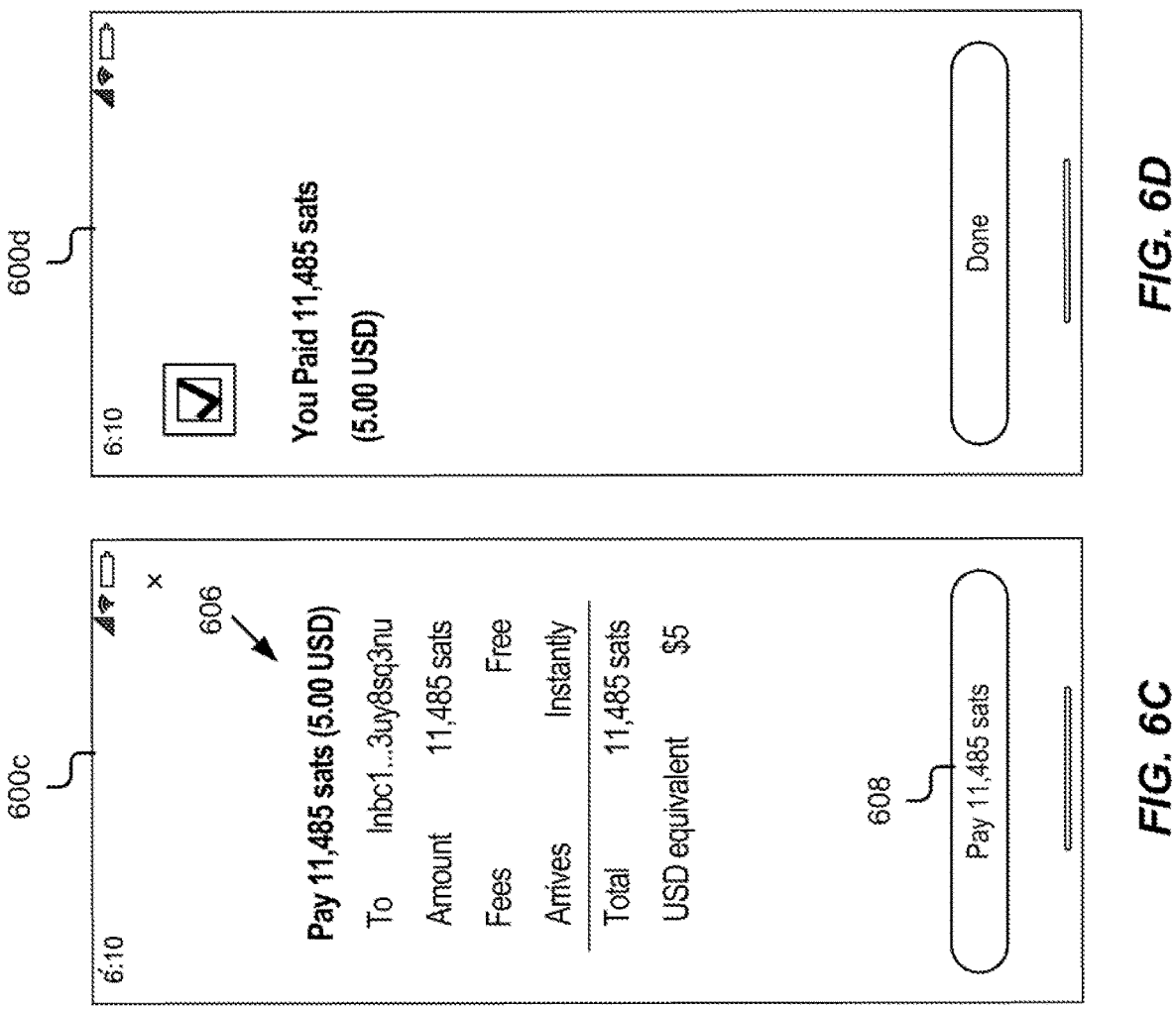

In some examples, once a payment application and/or cryptocurrency application is selected and a payment user interface associated therewith is presented via a user device, the payment can be made using assets associated with the payment application and/or cryptocurrency application, as shown for example in at least FIG. 6C. In some examples, the assets can be custodial assets or noncustodial assets accessible via the payment application. In some examples, a payment can be made using assets associated with a different type of asset (e.g., fiat currency, stocks, etc.) that can be converted into cryptocurrency prior to the payment being made. In some examples, the payment request and/or deep link can include an amount for the payment (e.g., as shown in FIG. 5E) and, in such examples, the amount requested can be withdrawn from the assets. In some examples, the payment request and/or deep link may not designate an amount and, in such examples, the sending user can designate an amount, as shown and discussed with respect to at least FIGS. 5A-5E. The latter may be the case, for instance, in a tipping scenario where the receiving user does not specify an amount but instead the sending user designates the amount. In some examples, the payment can be made using a layer 1 protocol cryptocurrency network, as shown and discussed for example in reference to at least FIG. 11B. In some examples, the payment can be made using a layer 2 protocol cryptocurrency network, as shown and discussed for example in reference to at least FIG. 11B. In some examples, the payment can be made using internal ledgers associated with a payment service. In some examples, a first network (layer 2 protocol) may be prioritized over a second network (layer 1 protocol), wherein the second network is provided as a fallback option in the event the first network is unable to facilitate the transaction. In some examples, contextual data can be used to determine which network to use to facilitate the payment.

In some examples, the lookup component 123 may retrieve or lookup an invoice in response to a user interacting with an encoded object, such as a deep link. Specifically, when a payor interacts with a payment link from an interface (e.g., interface 115*a*), the payment link may be sent to the payment service system 106 to check or verify the invoice. In some examples, the payment link may be checked at the payment service system 106 for any spoofing or phishing attacks. For instance, the payment link can include an identifier (e.g., user, invoice number, token, etc.) that is uniquely associated with the payment request or invoice. The user interface component 117 upon receiving the payment link may determine the identifier and may coordinate with the lookup component 123 to retrieve a corresponding invoice associated with the identifier. The lookup component 123 may attempt to retrieve the invoice from the datastore 128 using the identifier. The datastore 128 may store invoices 132 generated in the past by the invoice management component 119 based on payees' payment requests. Each invoice 132 stored in the datastore 128 may be associated with a unique identifier, such as a user identifier associated with a payee who sent the payment request, or another identifier that may be uniquely associated with the invoice 132 itself. If the invoice is found, the lookup component 123 may provide the retrieved invoice to the user interface component 117, which may then present the invoice 132 to the payor's device 112b, as shown for example in interface 115b or interface 115c. If the invoice is not found, then the lookup component 123 may notify the user interface component 117 of no invoice found or invalid payment link, and the user interface component 117 may notify the payor that the payment link is invalid or seems to be received from a suspicious account or user. In this way, the payment service system 106 may reduce spoofing or phishing attacks associated with the payment transactions discussed herein.

In some examples, the lookup component 123 may compare the invoice to other invoices associated with the payor or payee to determine whether the invoice is suspicious or otherwise appears to be fraudulent. That is, the lookup component 123 can compare the invoice to previous invoices to determine whether the payor and payee have a history of transactions (e.g., fraudulent transactions and/or transactions as a whole), whether the amount of the invoice is consistent with previous invoices of the payee or payor, whether transaction data, appointment data, or other third-party data is indicative of an existing relationship between the payor and the payee, etc., to determine whether the invoice is suspicious or otherwise appears to be fraudulent. In some examples, the lookup component 123 can detect suspected fraud by detecting that account(s) associated with the payor and/or the payee in a transaction have a history of at least one previous fraudulent transaction.

The datastore 128 may store data used by the payment service system 106. In at least one example, the datastore 128 can store invoices 132 generated by the invoice management component 119 and contextual data 134 corresponding to recipients, payors, and various payment applications, including PS app 110a, 110b. The invoices 132 may be generated based on payees' payment requests. Each invoice 132 stored in the datastore 128 may be associated with a unique identifier, such as a user ID associated with a payee who sent the payment request. The contextual data may include data associated with the recipient (e.g., recipient preferences, wallet balance, previous transaction data, default application for cryptocurrency payment transactions, applications installed on the recipient's user device for payments, etc.), data associated with the payor (e.g., e.g., payor preferences, wallet balance, previous transaction data, default application for cryptocurrency payment transactions, applications installed on payor's user device for payments, etc.), device data (e.g., which applications are currency running, whether applications are running in the foreground or background, compute required and/or available for running applications, which applications are installed, etc.), and data associated with different payment applications including the payment service application associated with the payment service system 106. Additional details associated with the datastore 128 are described below with reference to FIGS. 18-20.

In some examples, the lookup component 123 or another component of the payment service system 106 can detect fraud attempt(s) based on contextual data 134. For instance, detection of numerous requests and/or invoices (e.g., more than a threshold amount) that are share attributes with only minor variations (e.g., difference(s) in address, name, device identifier(s), wallet identifier(s), currency, amount, or a combination thereof) can indicate a brute force attack to the lookup component 123 or another component of the payment service system 106. Detection of inconsistencies or differences that would be impossible or unlikely in non-fraudulent transactions may also be detected as fraud attempts, such as requests for, and/or invoices indicating, simultaneous transactions in different locations or a series of transactions in different locations. Similarly, detection of certain patterns or trends in a user's transaction history may be detected as fraud attempts. For instance, transactions at regular intervals, such as every day at the same time, or periodically according to a repeating interval, could be detected as fraud attempts.

Servers 130 can be associated with third-party service providers that provide payment services, including but not limited to, an acquirer bank, an issuer, a card payment network, a cryptocurrency exchange, and/or the like. The payment service system 106 is capable of providing additional or alternative services and the services described above are offered as a sampling of services. In at least one example, the payment service system 106 can exchange data with the server(s) 130 associated with third-party service providers. Such third-party service providers can provide information that enables the payment service system 106 to provide services, such as those described above. In additional or alternative examples, such third-party service providers can access services of the payment service system 106. That is, in some examples, the third-party service providers can be subscribers, or otherwise access, services of the payment service system 106.

FIGS. 2A-2B illustrate example graphical user interfaces 202a and 202b for receiving cryptocurrency payment. In some examples, the user interface 202a of FIG. 2A is associated with a first method of sharing recipient information (e.g., recipient's wallet address and QR code) to receive cryptocurrency payment (e.g., Bitcoin) from a user (e.g., payor). As depicted, the user interface 202a includes a wallet address 210 of a payee or recipient to where the payment should be sent, a scannable QR code 212 that the payor can scan to make the payment to the recipient over a layer 1 cryptocurrency network (e.g., Bitcoin network), an activatable user interface element 214 to copy the recipient's wallet address to manually share with another user, and an activatable user interface element 216 to share the recipient information with one or more other users via one or more applications.

The user interface 202b of FIG. 2B is associated with an improved method of receiving cryptocurrency payment from another user according to the operations or techniques discussed herein. As depicted, the user interface 202b includes an encoded object 220, such as a deep link, that is represented as a scannable QR code that a payor can scan to make the payment to the recipient over a layer 1 or layer 2 cryptocurrency network (e.g., lightning network), a user identifier (ID) 222 of a recipient or payee to whom the cryptocurrency payment to be made, an activatable user interface element 224 to add a custom or specific payment amount in a payment request for requesting payment from another user, and an activatable user interface element 226 to share the encoded object 220 (or deep link) with one or more other users via one or more applications, such as messaging application, email application, social-networking application, etc.

In some examples, the user interface 202b of FIG. 2B represents an improved way of receiving cryptocurrency payment than the user interface 202a of FIG. 2A at least because the recipient does not have to manually copy or share a long string of characters and/or numbers identifying their wallet address (e.g., wallet address 210), the transaction associated with interface 202b of FIG. 2B can be processed with either the layer 1 cryptocurrency network (e.g., Bitcoin network) or the layer 2 cryptocurrency network (e.g., lightning network) that gives the payee and the payor more flexibility, the payee has the option to add custom or specific amounts and notes when requesting payment. Additionally, since the deep links including the payment codes (e.g., encoded object 220) generated for payment invoices are registered with unique user IDs at the payment service system 106, making the payment through a deep link configured as described reduces the success rate of spoofing or phishing attacks as the scanned QR code (e.g., encoded object 220) is checked by user ID 222 at the payment service system 106 to confirm that that the code is indeed associated with the recipient and not with any other fraudulent user.

Figure 3:
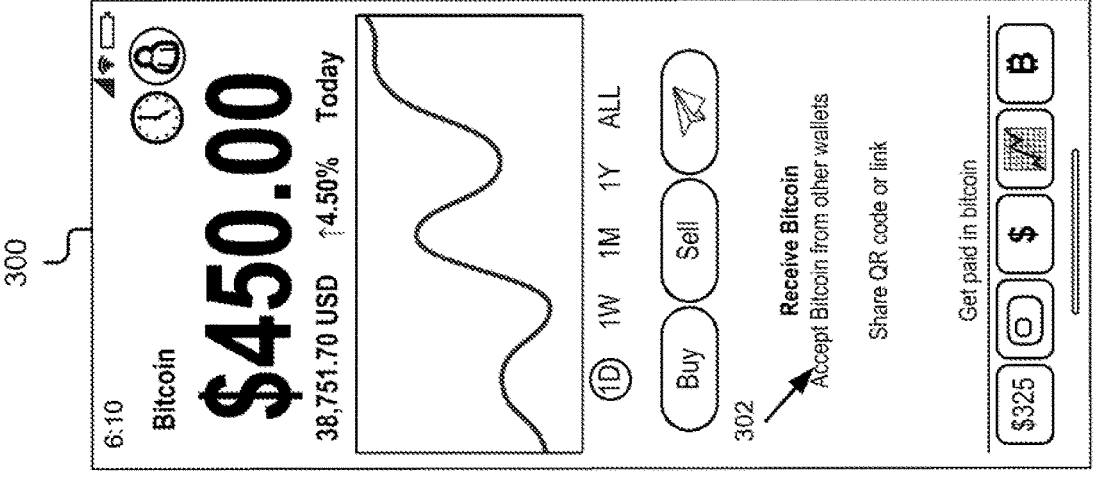
FIG. 3 illustrates an example graphical user interface for requesting cryptocurrency payment according to some embodiments disclosed herein.

FIG. 3 illustrates an example graphical user interface 300 for requesting cryptocurrency payment according to some embodiments disclosed herein. In one example, the interface 300 depicts a home page or a main screen of the PS app 110a associated with the payment service system 106. As mentioned elsewhere herein, the PS app 110a may be a cryptocurrency application to buy, sell, transfer, send, and receive cryptocurrencies. As depicted, the interface 300 includes an activatable user interface element 302 to request or receive cryptocurrency payment. More specifically, a user (e.g., a payment recipient or payee) may initiate the process of requesting cryptocurrency payment from another user (e.g., payor) by interacting with the activatable user interface element 302. Upon interacting with the element 302, the cryptocurrency payment request may be received by the user interface component 117, which may then coordinate with one or more other components of the payment service system 106 to generate a deep link that the requesting user can share with another user to receive the cryptocurrency payment as discussed herein. Other mechanisms for initiating the cryptocurrency payment request are also envisioned for this disclosure.

Figure 4B:
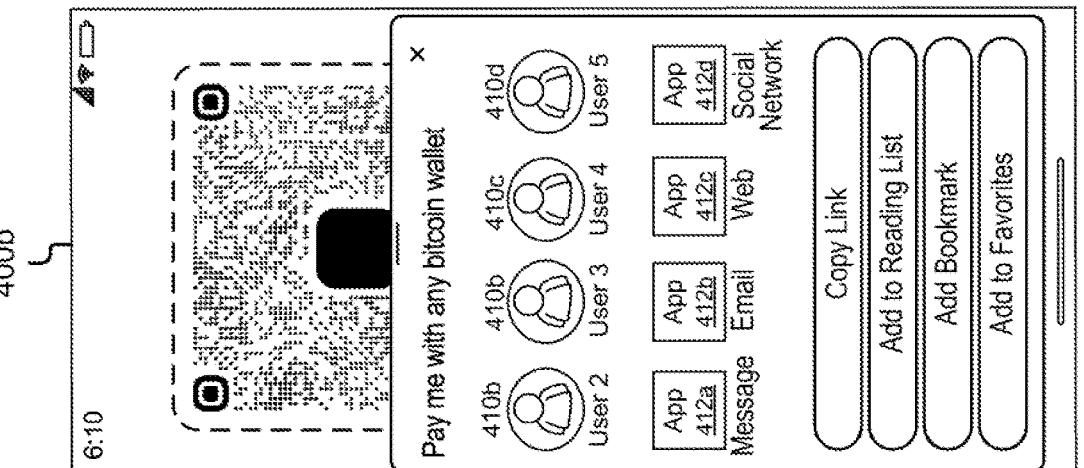
Figure 4A:
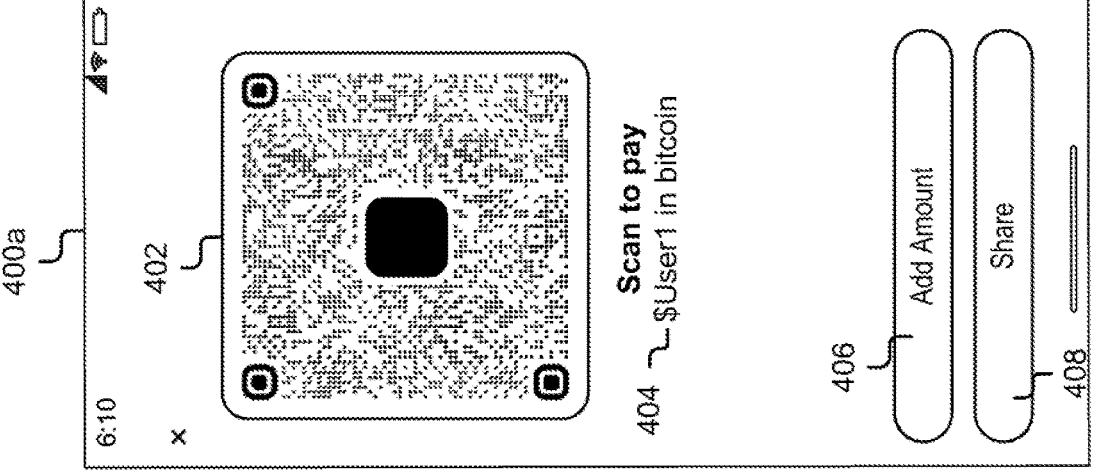

FIGS. 4A-4C illustrate example graphical user interfaces 400a-400c of a payee sharing an encoded object, such as a deep link, with a payor via a sharing application to receive cryptocurrency payment. Specifically, FIG. 4A illustrates an example interface 400a that is displayed in response to the first user (e.g., recipient) selecting the element 302 to request/receive cryptocurrency. As depicted, the user interface 400a includes a deep link 402 that is represented as a scannable QR code that a payor can scan to make the payment to the first user, a user ID 404 of the first user, an activatable user interface element 406 to add a custom or specific payment amount in a payment request (e.g., as shown in FIGS. 5A-5E), and an activatable user interface element 408 to share the deep link 402 with one or more other users via one or more sharing applications as shown in FIG. 4B.

FIG. 4B illustrates an example interface 400b for selecting a user and an application with which to share the deep link 402. In some examples, the interface 400b is displayed in response to the payee selecting the user interface element 408 to share the deep link 402. As depicted, the interface 400b shows a plurality of users 410a-410d that may be contacts (e.g., first-degree contacts, second-degree contacts, third-degree contacts, etc.) of the payee and a plurality of applications 412a-412d (e.g., messaging application, email application, web application, social-networking application, etc.) on which the deep link 402 can be shared with one or more users 410a-410d (individually or collectively herein referred to as 410). It should be understood that the list of users 410a-410d and applications 412a-412d shown in the interface are not limiting and a variety of other applications and any number of users can be shown and included in the interface 400b. Using the interface 400b, the payee can select a particular user from the plurality of users 410 to receive the payment and a particular application from the plurality of applications 412 on which to send the payment request to the particular user (e.g., payor).

FIG. 4C illustrates an example interface 400c for sending the deep link 402 as a message to a particular user via a messaging application. In some examples, the interface 400c is displayed in response to the payee selecting a user 410a and an application 412a from the interface 400b of FIG. 4B. As depicted, the interface 400c includes an interactable message 420 that incorporates the deep link 402. The message 420 shows at a glance the first user's information to whom the payment needs to be sent. The message 420 includes the deep link 402, which upon interaction may direct the interacting user to a payment making page, such as shown in interface 115b or interface 115c. The interface 400c further includes a comment box 422 to add any comments or notes to the message 420 and an activatable user interface element 424 to send the message 420 to the selected user 410a. In some examples, the message can be customized and/or personalized based on templates (e.g., holidays), user-designed designs, etc.

FIGS. 5A-5E illustrate example graphical user interfaces 500a-500e for adding a custom amount to a payment request. Particularly, FIG. 5A illustrates an example interface 500a that is displayed when a user (e.g., payee) inputs a desire to receive cryptocurrency payment on a cryptocurrency payment application (e.g., PS app 110a). The user may do so by selecting the element 302, as shown in the interface 300 of FIG. 3. As discussed elsewhere herein, the interface 500a may include an activatable user interface element 502 to add a custom or specific payment amount to an encoded object or deep link 501 and an activatable user interface element 504 to share the deep link with one or more other users. FIG. 5B illustrates an interface 500b for adding a specific amount 506 (e.g., $5) to the payment invoice associated with the deep link 501. In some examples, the interface 500b is displayed in response to the user selecting the activatable user interface element 502. FIG. 5C illustrates an interface 500c for adding an optional note or a remark regarding the payment amount 506 that the user is asking for. As depicted, the user may add a note 508 that the recipient is requesting $5 from the payor for coffee. The interface 500c may include an activatable user interface element 510 to finish adding the note 508. FIG. 5D illustrates an interface 500d showing confirmation of amount

506 and note 508 that has been added by the user for the deep link 501. In some examples, the interface 500*d* is displayed in response to the user selecting the activatable user interface element 510. FIG. 5E illustrates an interface 500*e* showing a modified encoded object or deep link 521 after the user has finished adding the specific amount 506 and optional note 508. In some examples, the interface 500*e* is displayed in response to the user selecting an activatable user interface element 512. The interface 500*e* further includes an activatable user interface element 522 to share the modified deep link 521 with another user for receiving the payment amount 506. Specifically, upon interacting with the activatable user interface element 522, user interfaces similar to interfaces 400*b* and 400*c* may be displayed to the user to share the modified deep link 521 with a particular user on a particular application.

FIGS. 6A-6D illustrate example graphical user interfaces 600*a*-600*d* for displaying and activating an encoded object, such as a deep link, received at a payor user device and making a cryptocurrency payment to a recipient through a default cryptocurrency application associated with the payment service system 106 discussed herein. Particularly, FIG. 6A illustrates an example interface 600*a* showing an example message 602 comprising a deep link received from a user (e.g., the recipient) to make a cryptocurrency payment. The message 602 is the same message 420 that was sent by the recipient through the messaging application, as discussed above in reference to FIG. 4C. The message 602 may be an interactable message, which when interacted sends the deep link (e.g., payment link) associated with the message 602 to the payment service system 106 for processing. The deep link can be formatted to identify the desired protocol, which may be customized for the payment service (e.g., app://), include information for the desired payment network or cryptocurrency (e.g., Bitcoin), include a user ID for the user (e.g., $user1) or a unique identifier for the payment invoice, and include contextual information). Upon the payor interacting (e.g., clicking) the message 602, a call based on the deep link may be sent to the user interface component 117. The user interface component 117 may coordinate with the payment medium selection component 121 to determine which particular payment application to open on the payor's device in order to make the cryptocurrency payment to the recipient. The payment medium selection component 121 may determine selection criteria for choosing a payment application to open based on the contextual data 134. The payment medium selection component 121 may send the selection criteria to the user interface component 117, which may then use the criteria to cause a particular application to be launched on the payor's device. For example, if the cryptocurrency payment application associated with the payment service system 106 is installed on the payor's device, then the user interface component 117 may cause the default cryptocurrency application 604 to transition to the foreground (e.g., as shown by interface 600*b* of FIG. 6B) and present a payment user interface 600*c* to enable the user to make the cryptocurrency payment to the recipient using cryptocurrency stored in a wallet of the payor's account associated with the default cryptocurrency application. In particular embodiments, the deep link can be configured to enable the user device to identify the cryptocurrency payment application to use. For example, the deep link can include the desired protocol (e.g., app://). This can be registered with the user device 112*b* of the recipient, which, in some examples, can automatically identify the cryptocurrency application associated with the payment service system 106 and bring it to the foreground. FIG. 6B illustrates an interface 600*b* showing launching of the default cryptocurrency application 604 for making the payment based on the instructions received from the user interface component 117 discussed herein. FIG. 6C illustrates an interface 600C showing payment details 606 for making the cryptocurrency payment to the recipient and an activatable user interface element 608 for paying cryptocurrencies from the payor's wallet equivalent to the payment amount (e.g., $5) requested by the recipient. FIG. 6D illustrates an example interface 600*d* showing confirmation of successful payment to the recipient after the payor has interacted with the activatable user interface element 608.

Figures 7A, 7B:
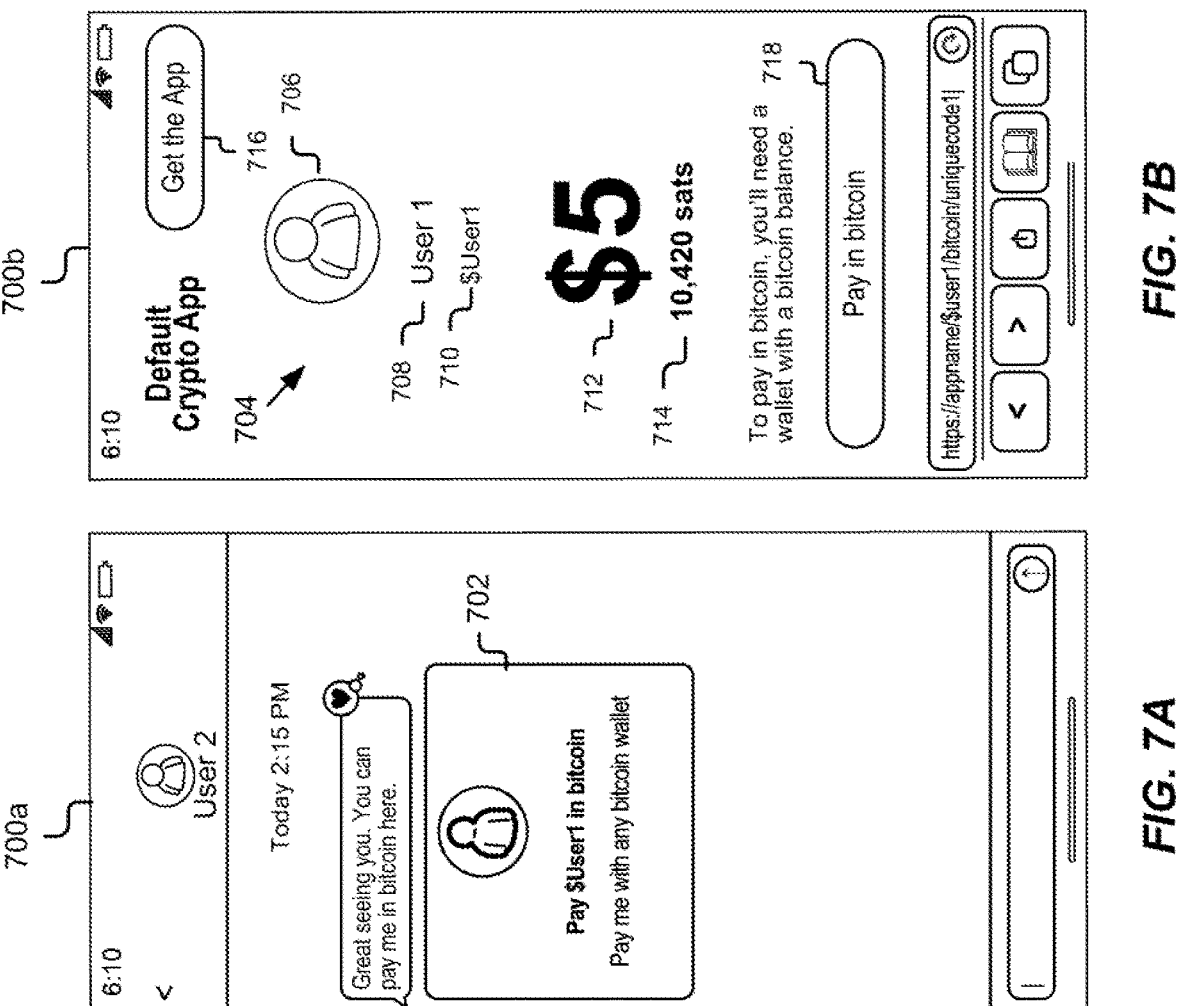
FIGS. 7A-7D illustrate example graphical user interfaces for displaying and activating an encoded object, such as a deep link, to make a cryptocurrency payment according to some embodiments disclosed herein.

FIGS. 7A-7D illustrate example graphical user interfaces 700*a*-700*d* for displaying and activating an encoded object, such as a deep link, received at a payor side and making a cryptocurrency payment to a recipient/payee through an alternate cryptocurrency application. Similar to FIG. 6A, FIG. 7A illustrates an example interface 700*a* showing an example interactable message 702 comprising a deep link received from a user (e.g., payee) to make a cryptocurrency payment. In response to the payor interacting with the message 702, the user interface component 117 may coordinate with the payment medium selection component 121 to determine which particular application to open on the payor's device in order to make the cryptocurrency payment to the recipient as discussed herein.

FIG. 7B illustrates an example interface 700*b* showing an example payment invoice 704 displayed on a web browser for making a cryptocurrency payment to a recipient. In some examples, the interface 700*b* may be displayed in response to the determination that the default cryptocurrency application associated with the payment service system 106 is not installed on the payor's device. In at least one example, this determination may be made by the payment service system 106. For instance, in response to the payor interacting with the message 702, the deep link associated with the message 702 may be sent to the user interface component 117, which may then coordinate with the payment medium selection component 121 to make a determination that the default cryptocurrency application is not installed on the user device 112*b*. Because the default cryptocurrency application is not installed, the payment invoice 704 can be opened in a web browser. As an example, the deep link can be configured such that, if no application is presently registered to handle the type of deep link, then the user device 112*b* defaults to opening the deep link in the web browser. The web browser sends a request to the payment service system 106 based on the deep link. The user interface component 117 may also coordinate with the lookup component 123 to retrieve the invoice 704 using an identifier (e.g., user ID, invoice number, token, etc.) referenced in the deep link associated with the message 702. Based on invoice retrieved by the lookup component 123, the user interface component 117 may send instructions to the payor's device to display the interface 700*b* comprising the invoice 704 in a web browser. As depicted, the payment invoice 704 may include an icon 706 showing the payee's picture, payee name 708, a unique user ID 710 of the payee, payment amount 712 requested by the payee, and a cryptocurrency amount 714 that may be equivalent to the payment amount 712. The interface 700*b* may include an activatable user interface element 716 to download the default cryptocurrency application associated with the payment service system 106 for future transactions. The interface 700*b* may further include an activatable user interface element 718 to pay the requested amount 712 or 714 to the recipient. In some examples, upon interacting with the activatable user interface element 718, the payor may be presented with options corresponding to one or more alternative cryptocurrency applications that may be installed on the payor's device and be compatible for making the payment to the recipient. The payor may select a desired alternative cryptocurrency application from these options to make the payment. In some examples, upon interacting with the activatable user interface element 718, an alternate cryptocurrency application 720 may be automatically opened or launched, as shown and discussed below with respect to the interface 700c of FIG. 7C.

Figures 7C, 7D:
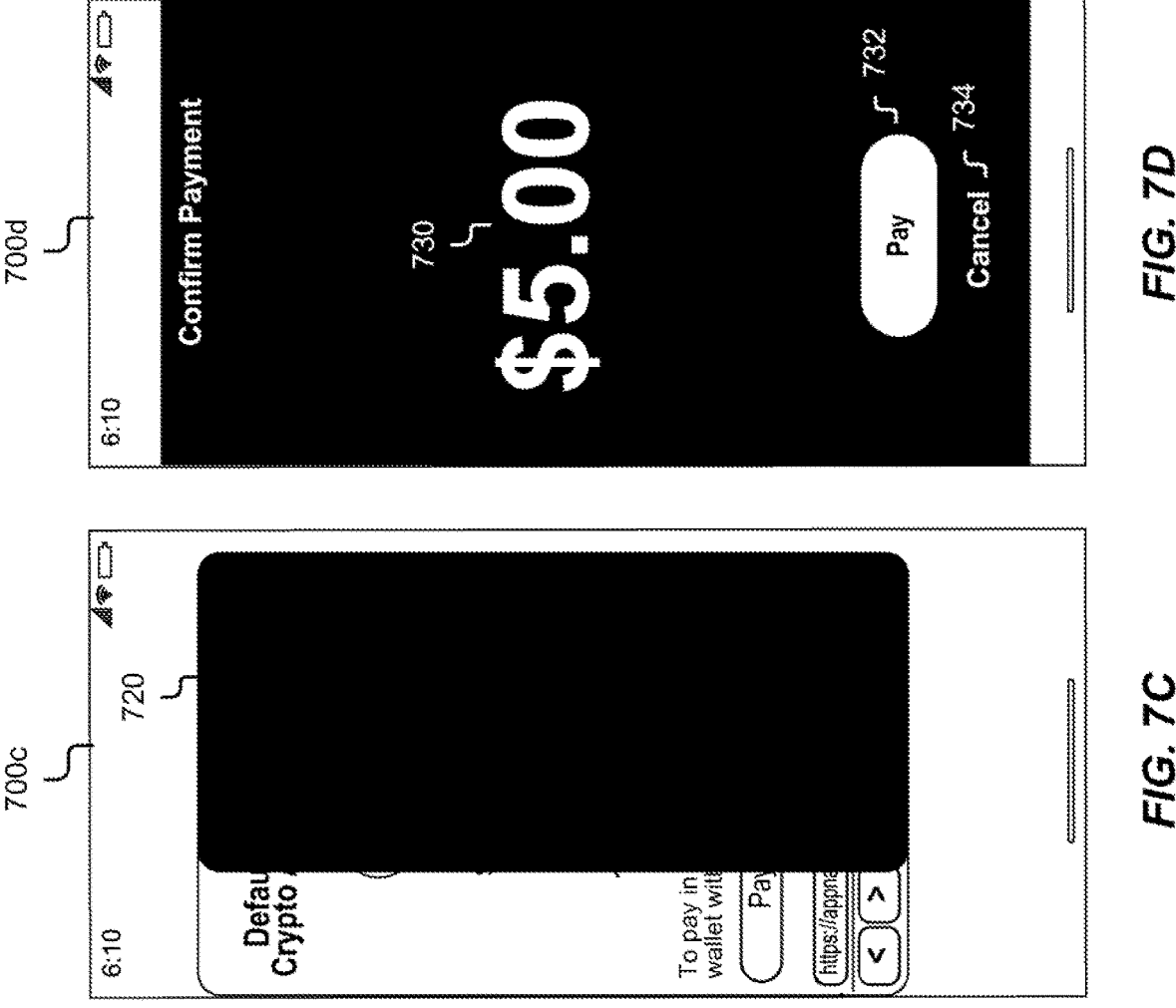

FIG. 7C illustrates an interface 700c showing launching of an alternate cryptocurrency application 720 for making the payment based on the instructions received from the user interface component 117. For instance, in response to the payor interacting with the element 718, the user interaction may be received by the user interface component 117, which may determine, in communication with the payment medium selection component 121, which particular alternate cryptocurrency application to launch in the absence of the default cryptocurrency application associated with the payment service system 106. The payment medium selection component 121 may select the alternate cryptocurrency application 720 based on the contextual data 134 (e.g., payor preferences with respect to application, speed of transaction associated with application, etc.) as discussed herein. Once the alternate cryptocurrency application has been selected or determined, the user interface component 117 may send instructions to the payor's device to launch the application 720 on the device. In another example, the deep link can be configured such that the alternative cryptocurrency application 720 is registered to handle the cryptocurrency payment in the absence of the default cryptocurrency payment application being installed.

FIG. 7D illustrates an interface 700d showing an indication 730 of the payment to be made to the recipient using the payor's wallet balance associated with the alternate cryptocurrency application, an activatable user interface element 732 to confirm to make the payment (e.g., send Bitcoin to recipient's wallet or address), and an activatable user interface element 734 to cancel the payment transaction.

Figure 8:
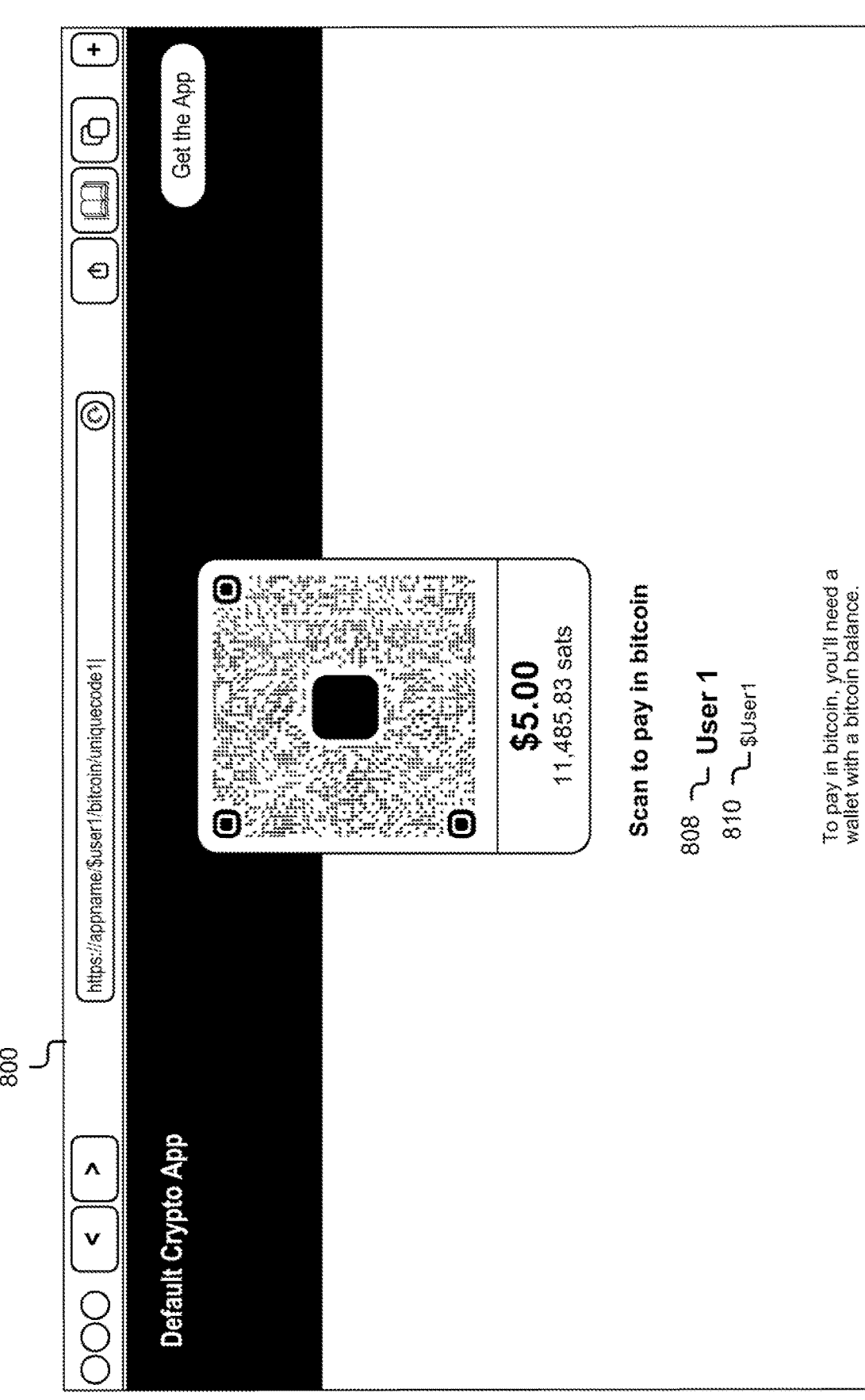
FIG. 8 illustrates an example graphical user interface for displaying an encoded object, such as a deep link, to make a cryptocurrency payment according to some embodiments disclosed herein.

FIG. 8 illustrates an example graphical user interface 800 for displaying an encoded object, such as a deep link, to make a cryptocurrency payment to a recipient. The interface 800 may include a scannable QR code 802, which a payor may scan using a camera on their device to make the payment. Upon scanning the code 802, the payor may be presented with one or more options to make the referenced payment (e.g., $5) to the recipient. By way of an example, upon scanning the code 802, the payor may be presented with options corresponding to one or more cryptocurrency applications installed on the payor's device through which they can make payment to the recipient. In addition to the code 802, the interface 800 further includes payment amount 804 requested by the payee, a cryptocurrency amount 806 that may be equivalent to the payment amount 804, payee name 808, and a unique user ID 810 of the payee. Similar to interface 700b, the interface 800 may include an activatable user interface element 812 to download the default cryptocurrency application associated with the payment service system 106 for future transactions.

In some examples, similar to interface 700b, the interface 800 may be displayed when a payor interacts with an interactable message (e.g., message 702) received from the recipient and a default cryptocurrency application associated with the payment service system 106 not being installed on the payor's device. The interface 800 may be displayed on a web browser on the payor's device based on instructions from the user interface component 117, as discussed above with respect to at least FIG. 7B. In at least one example, the payor's device depicted in FIG. 8 may be different from the payor's device depicted in FIG. 7B. For instance, the interface 800 may be displayed on a desktop device associated with the payor whereas the interface 700b may be displayed on a smartphone associated with the payor.

Figures 9A, 9B:
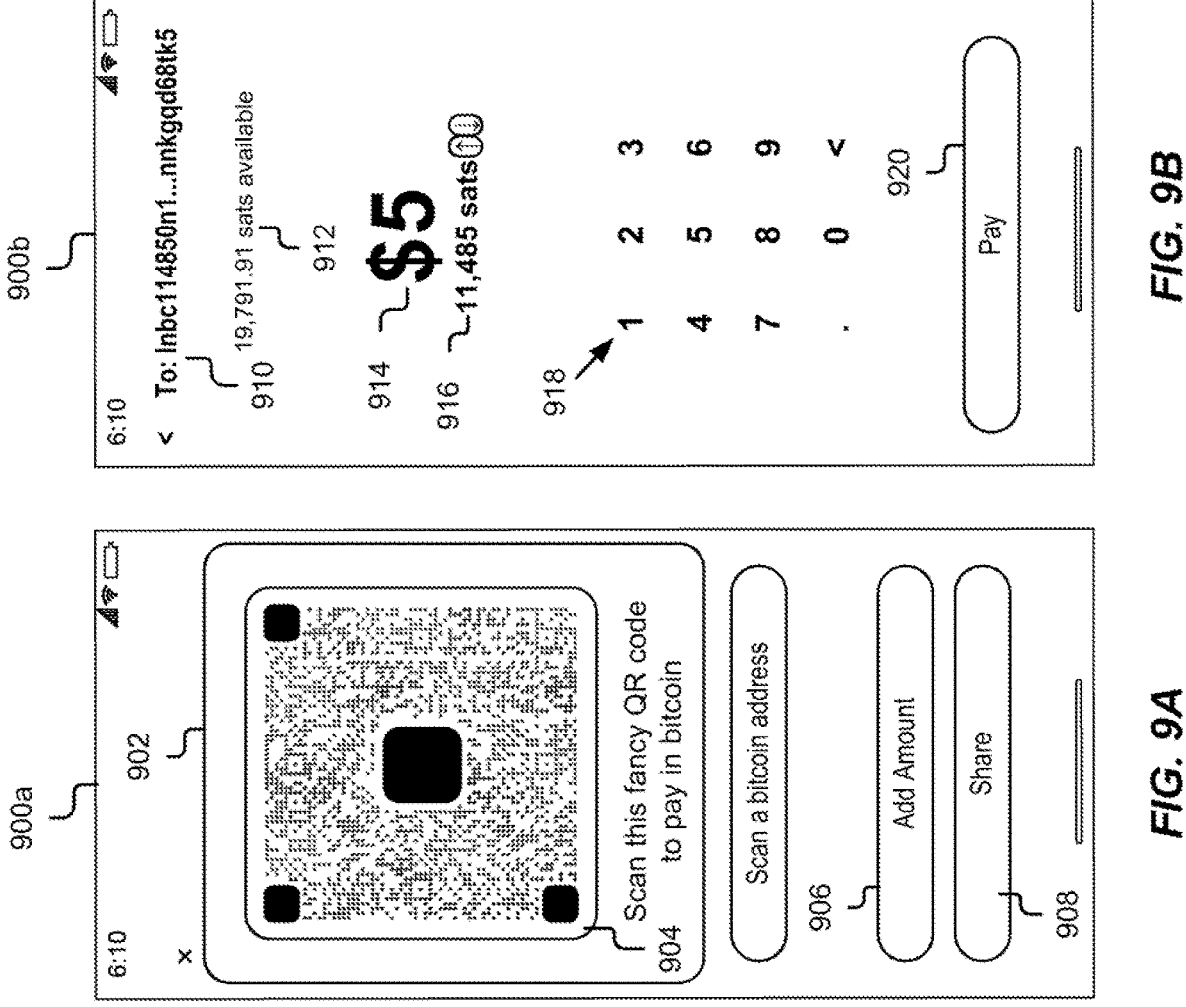
FIGS. 9A-9D illustrate example graphical user interfaces for displaying an encoded object, such as a deep link, in association with a matrix barcode to make a cryptocurrency payment according to some embodiments disclosed herein.

FIGS. 9A-9D illustrate example graphical user interfaces 900a-900d for displaying an encoded object, such as a deep link, in association with a matrix barcode to make a cryptocurrency payment. Particularly, FIG. 9A illustrates an example interface 900a showing an example deep link 902 received from a user (e.g., payee) to make a cryptocurrency payment. The deep link 902 here is represented as a scannable code 904. The payor may scan the code 904 to activate the deep link 902 and to make payment to the recipient. In addition to the deep link 902, the interface 900a further includes an activatable user interface element 906 to add a specific amount to the deep link 902 and an activatable user interface element 908 to share the deep link 902 with another user or on another application associated with the same user.

FIG. 9B illustrates an example interface 900b that may be displayed when the payor scans the code 904. In some examples, in response to the payor scanning the code 904, the payor may be directed to a payment interface associated with a default cryptocurrency application discussed herein. In the scenario illustrated in FIGS. 9A-9D, it is assumed that the default cryptocurrency application is installed on the payor's device. If in case the default application is not installed, then upon scanning the code 904, the payor may be presented with options corresponding to one or more other cryptocurrency applications installed on the payor's device through which they can make payment to the recipient, as discussed above, for example, in reference to FIG. 8. As depicted, the interface 900b may include a recipient's or payee's address 910 to where the cryptocurrency payment is transferring to, wallet balance 912 of the payor, a payment amount 914 requested by the payee, a cryptocurrency amount 916 equivalent to the requested payment amount 914, numpad 918 for modifying the payment amount 914 and corresponding cryptocurrency amount 916, and an activatable user interface element 920 to proceed with the payment.

Figures 9C, 9D:
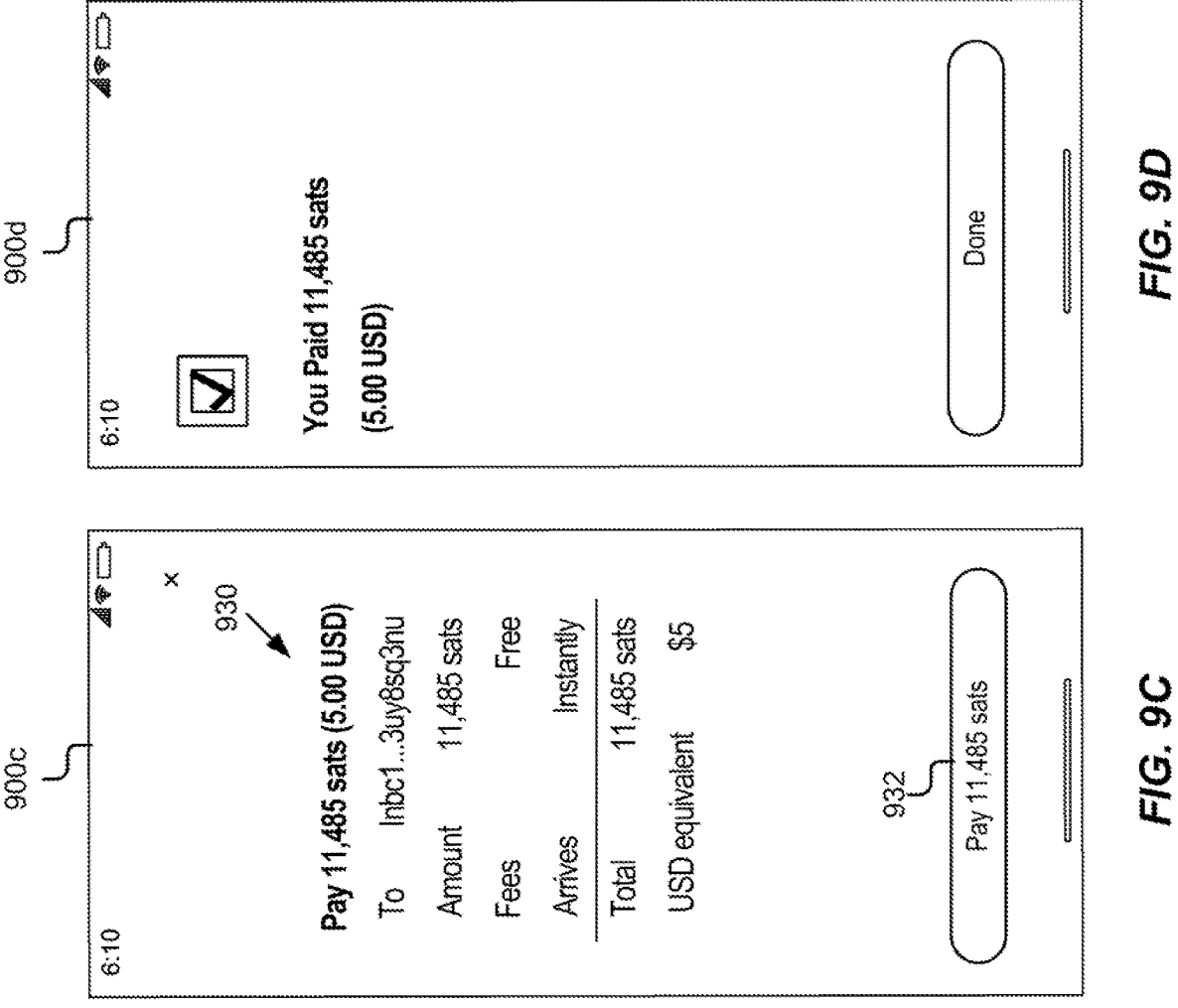

FIG. 9C illustrates an interface 900C showing payment details 930 for making the cryptocurrency payment to the recipient and an activatable user interface element 932 for paying cryptocurrencies from the payor's wallet equivalent to the payment amount (e.g., $5) requested by the recipient. FIG. 9D illustrates an example interface 900d showing confirmation of successful payment to the recipient after the payor has interacted with the activatable user interface element 932.

Figure 10B:
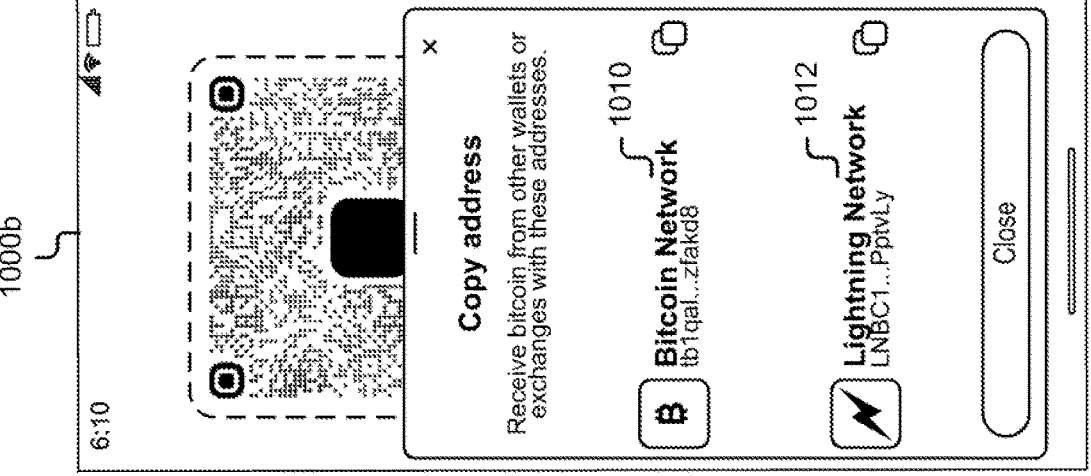
FIGS. 10A-10B illustrate example graphical user interfaces for selecting a cryptocurrency network to receive a cryptocurrency payment according to some embodiments disclosed herein.
Figure 10A:
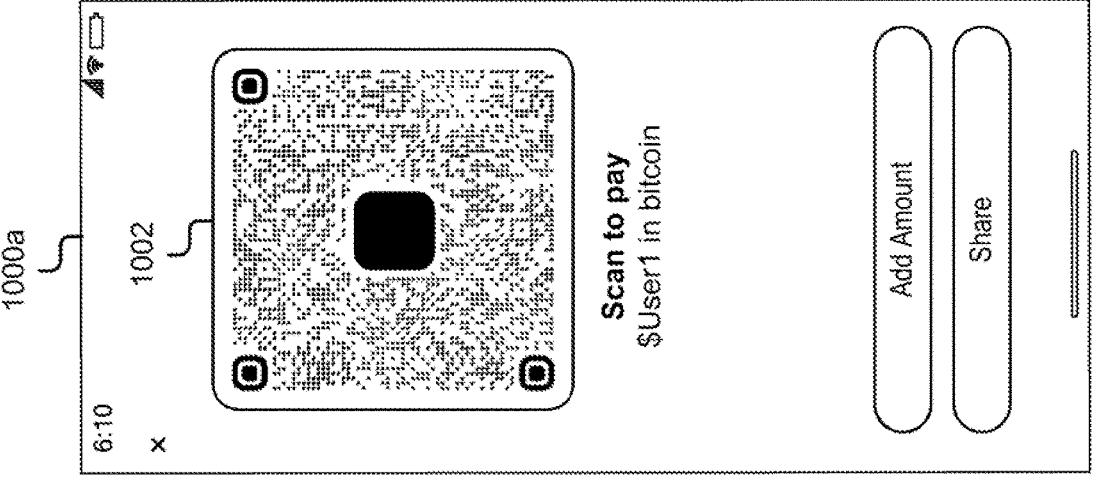

FIGS. 10A-10B illustrate example graphical user interfaces 1000a-1000b for selecting a cryptocurrency network, which can include a layer 1 cryptocurrency network or a layer 2 cryptocurrency network, to receive a cryptocurrency payment according to some embodiments disclosed herein. In some examples, the layer 1 cryptocurrency network is a Bitcoin network, which may be a conventional channel for exchanging cryptocurrencies or performing cryptocurrency transactions between parties on a blockchain network. The layer 2 cryptocurrency network is a Lightning network that is built on top of the layer 1 cryptocurrency network. The layer 2 cryptocurrency network may be a private channel that is established between two parties or nodes to exchange cryptocurrencies or perform cryptocurrency transactions off the blockchain. In at least one example, transactions performed using the layer 2 cryptocurrency network may be referred to as "off-chain" transactions. Transactions conducted on the layer 2 cryptocurrency network are generally faster, cheaper, and more readily confirmed than those conducted directly on the layer 1 cryptocurrency network. A user may select either network (i.e., layer 1 or layer 2 network) based on whether they have a channel pre-established with a transacting party or user. For example, if the user has already established a channel with another user to perform cryptocurrency transactions on a particular cryptocurrency application, then the user may choose the layer 2 cryptocurrency network (e.g., lighting network) to send or receive cryptocurrency payment. Otherwise, if there is no channel established between the two users or if the user is performing a transaction for the first time with another user, then the user may choose the layer 1 cryptocurrency network (e.g., Bitcoin network).

FIG. 10A illustrates an example interface 1000a that may be displayed in response to the payee selecting to receive cryptocurrency payment on their payment service application (e.g., PS app 110a). For example, as discussed in reference to FIG. 3, the payee may select the element 302 to receive cryptocurrency and in response, the user interface component 117 may cause the interface 1000a to be displayed on the payee's device. The interface 1000a is similar to the interface 400a and therefore, the description will not be repeated here in full. The interface 1000a includes an encoded object, such as a deep link 1002, that is represented here as a QR code. The payee can share the deep link 1002 to receive cryptocurrency (e.g., Bitcoin) from another user as discussed elsewhere herein. In some examples, the payee may select or tap on the deep link 1002 to select a particular recipient's or payee's address where the payee wants to receive cryptocurrency from another user, wallet, or other cryptocurrency service providers.

FIG. 10B illustrates an example interface 1000b for selecting a particular recipient address at which the recipient or payee wants to receive cryptocurrency payment from another user. In at least one example, the interface 1000b may be displayed in response to the payee tapping or clicking on the deep link 1002. As depicted, the payee may have an account (e.g., a wallet, a ledger) associated with the layer 1 cryptocurrency network 1010 (e.g., Bitcoin network) and also an account (e.g., wallet) associated with the layer 2 cryptocurrency network 1012 (e.g., lightning network). Each account or wallet associated with either network may have a corresponding address to which cryptocurrencies or payment may be sent or received. The payee may select between the layer 1 cryptocurrency network 1010 or the layer 2 cryptocurrency network 1012 and in response to selection, the recipient's address corresponding to the selected network 1010 or 1012 may be associated with the deep link 1002 to receive the payment to that address.

Figure 11B:
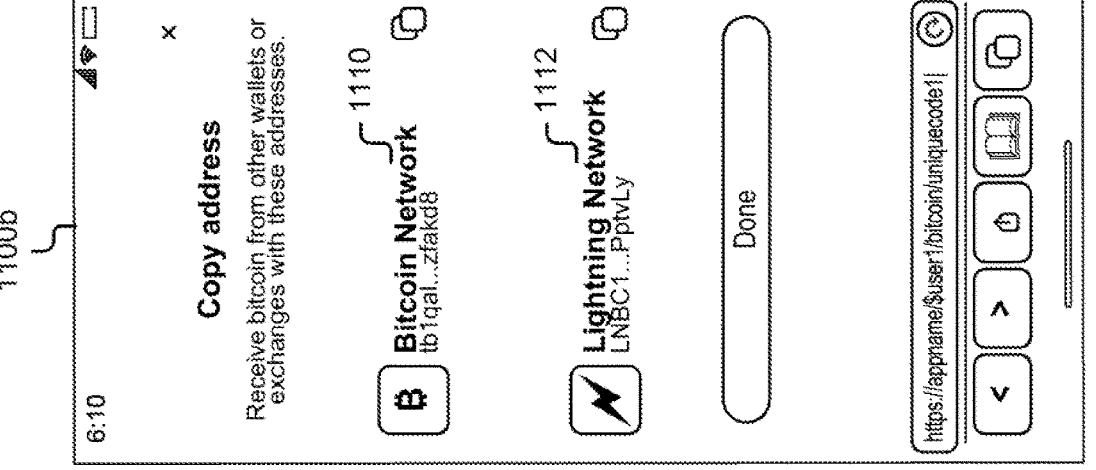
FIGS. 11A-11B illustrate example graphical user interfaces for selecting a cryptocurrency network to send a cryptocurrency payment according to some embodiments disclosed herein.
Figure 11A:

FIGS. 11A-11B illustrate example graphical user interfaces 1100a-1100b for selecting a cryptocurrency network, which can include the layer 1 cryptocurrency network or the layer 2 cryptocurrency network, to send a cryptocurrency payment according to some embodiments disclosed herein. Similar to the process discussed above with respect to FIGS. 10A-10B, the payor may also have the option to select which network (e.g., layer 1 or layer 2 cryptocurrency network) to choose to send cryptocurrency payment to the payee. In at least one example, if the payor has already established a private channel with a particular payee or has transacted before with that payee, then the payor may choose the layer 2 cryptocurrency network to send the payment to the payee.

Otherwise, the payor may choose the layer 1 cryptocurrency network to send the payment to the payee.

FIG. 11A illustrates an example interface 1100a showing an example payment interface displayed at a payor's side for making a cryptocurrency payment to a payee or recipient. In some examples, the interface 1100a may be displayed in response to the determination that the default cryptocurrency application associated with the payment service system 106 is not installed on the payor's device. It should be noted that the interface 1100a is similar to the interface 700b and therefore, the description will not be repeated here in full. The interface 1100a may include an activatable user interface element 1104 to pay a requested amount (e.g., $5) to the recipient. The interface 1100a further includes an activatable user interface element 1106 to select which particular payor's address or wallet to choose to make the payment to the recipient. The payor's address may be associated with the layer 1 cryptocurrency network and/or the layer 2 cryptocurrency network. The payor may select between the layer 1 or layer 2 cryptocurrency network using the interface 1100b discussed below.

FIG. 11B illustrates an example interface 1100b for selecting a particular payor's address from which the payor wants to send cryptocurrency payment to the payee. In at least one example, the interface 1100b may be displayed in response to the payor interacting with the activatable user interface element 1106. As depicted, the payor may have an account (e.g., wallet) associated with the layer 1 cryptocurrency network 1110 (e.g., Bitcoin network) and also an account (e.g., wallet) associated with the layer 2 cryptocurrency network 1112 (e.g., lightning network). Each account or wallet associated with either network may have a corresponding address from which cryptocurrencies or payment may be sent or received. The payor may select between the layer 1 cryptocurrency network 1110 or the layer 2 cryptocurrency network 1112 and in response to selection, the payor's address corresponding to the selected network 1110 or 1112 may be recorded and used when making the payment to the recipient.

Figures 12A, 12B, 12C:
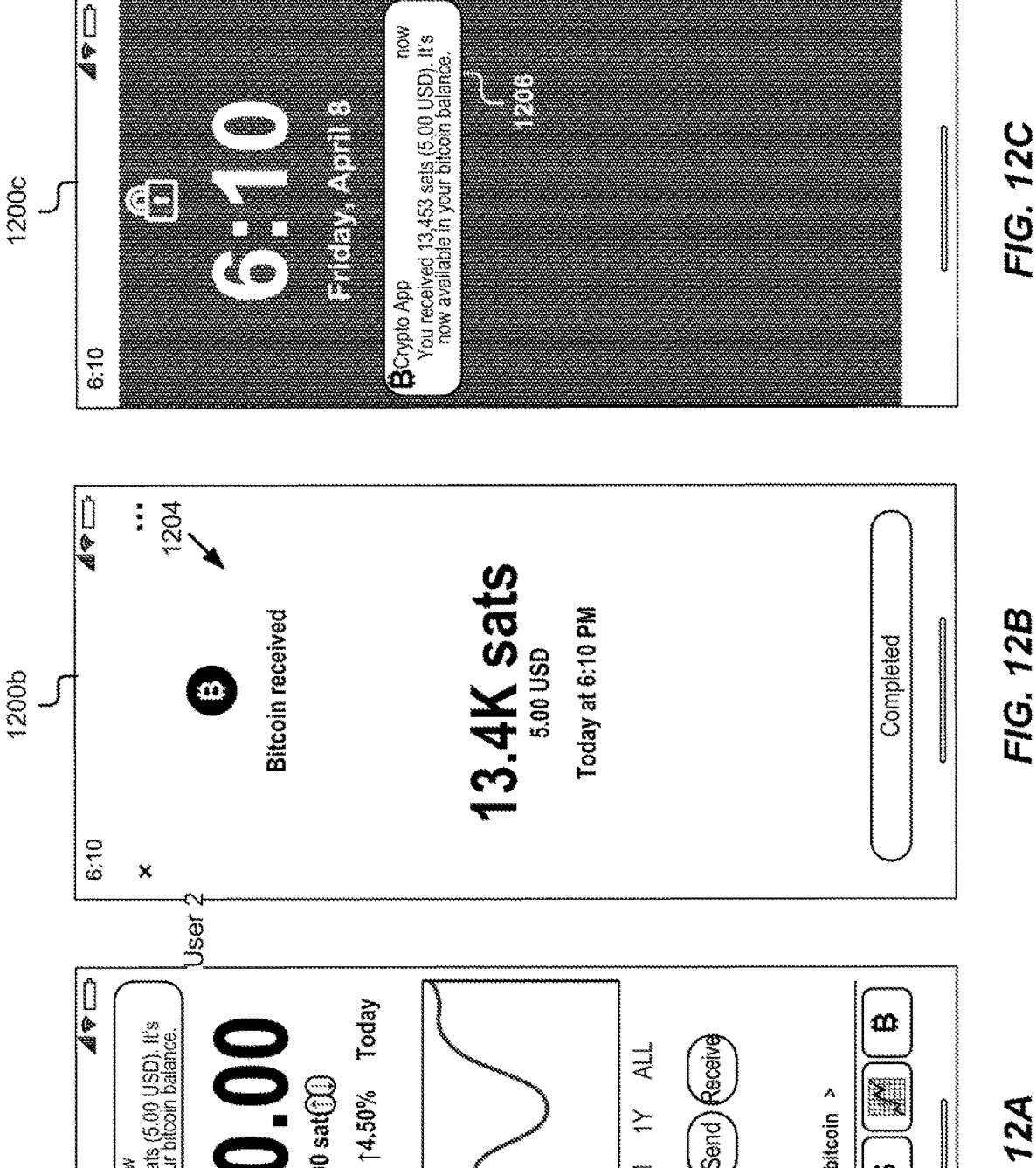
FIGS. 12A-12C illustrate example graphical user interfaces showing example notifications that may be received in relation to a cryptocurrency payment according to some embodiments disclosed herein.

FIGS. 12A-12C illustrate example graphical user interfaces 1200a-1200c showing example notifications that may be received in response to a cryptocurrency payment. Specifically, interfaces 1200a-1200c respectively show example notifications 1202, 1204, or 1206 on a recipient's device when the recipient has successfully received a requested payment (e.g., cryptocurrency payment) from another user. In particular, FIG. 12A illustrates an example interface 1200a showing an example notification 1202 received on a cryptocurrency application (e.g., PS app 110a) associated with the payment service system 106. FIG. 12B illustrates an example interface 1200b showing another example notification 1204 received on the cryptocurrency application associated with the payment service system 106. FIG. 12C illustrates an example interface 1200c showing an example notification 1206 on a home or lock screen of the recipient's device.

FIGS. 13A-13B illustrate example graphical user interfaces 1300a-1300b showing example transaction summaries associated with a cryptocurrency payment. Specifically, interfaces 1300a-1300b show two examples of a transaction summary (e.g., transaction summary 1302 and transaction summary 1304) that may be displayed when a user interacts with a notification shown in FIGS. 12A-12C. In particular, FIG. 13A illustrates an example interface 1300a showing an example transaction summary 1302 associated with a cryptocurrency transaction occurred between two users. FIG. 13B illustrates an example interface 1300b showing another example transaction summary 1304 associated with the cryptocurrency transaction occurred between two users. In at least one example, the transaction summary 1302 is an example of a short transaction summary and the transaction summary 1304 is an example of a more detailed transaction summary.

It should be noted that the graphical user interfaces of FIGS. 2A-2B, 3, 4A-4C, 5A-5E, 6A-6D, 7A-7D, 8, 9A-9D, 10A-10B, 11A-11B, 12A-12C, and 13A-13B are not by any way limited to the data shown in these interfaces and additional/alternative data, content, and/or information can be included in these interfaces and are within the scope of the present disclosure. The content shown in these interfaces is merely for example and illustration purposes and not to be construed as limiting.

Figure 14:
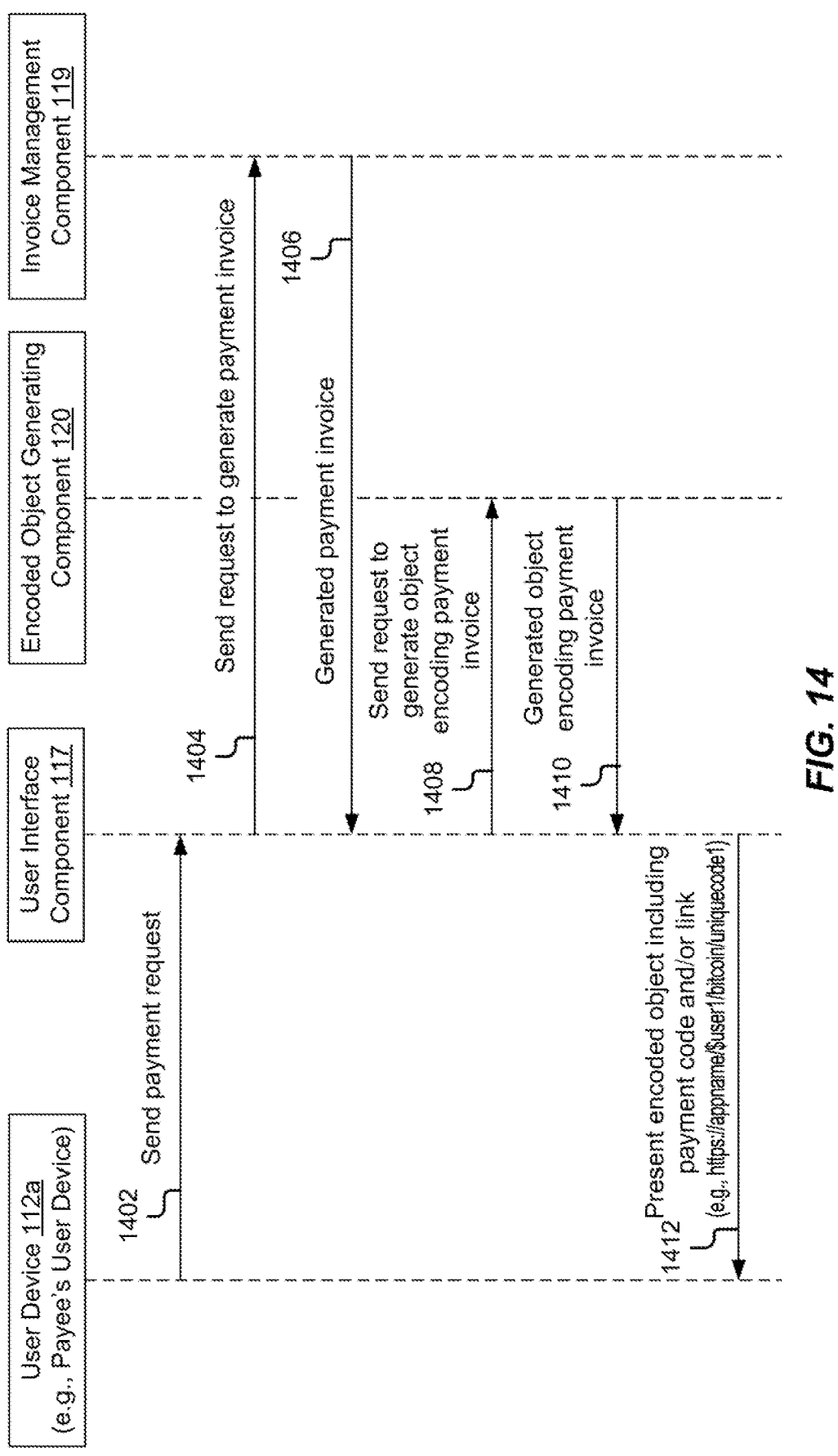
FIG. 14 illustrates an example sequence diagram showing example operations associated with receiving a payment according to some embodiments disclosed herein.

FIG. 14 illustrates an example sequence diagram 1400 showing example operations associated with receiving a payment. As depicted, the process may begin, at step 1402, with a user device 112a (e.g., payee's or recipient's user device) sending a payment request. The payment request may include a request to receive a particular cryptocurrency (e.g., Bitcoin) from another user, wallet, or service provider. In at least one example, the user (e.g., payee) may send the payment request by selecting the element 302 (e.g., see FIG. 3) via their PS app 110a. The payment request may include an identifier or tag associated with a user (e.g., $user1), a user picture or image, user's avatar, an amount to be received from another user or wallet, notes or remarks for the requested payment, etc. The payment request may be received by the user interface component 117 of the payment service system 106. Upon receiving the payment request, at step 1404, the user interface component 117 may send the request to the invoice management component 119 to generate a payment invoice including payee details and payment information that may be displayed to a paying customer or payor for making the requested payment to the user. An example payment invoice may include, for example, a name of the recipient/payee, an image representative of the recipient, a user identifier associated with the recipient to enable the payor to verify an identity of the recipient, payment amount requested by the recipient, a cryptocurrency amount that is equivalent to the requested payment amount, etc. The invoice management component 119 may generate such payment invoice.

At step 1406, the invoice management component 119 may send the generated invoice back to the user interface component 117. In some examples, the user interface component 117 or the invoice management component 119 may also store the invoice in the datastore 128 for later retrieval or look up discussed herein. At step 1408, the user interface component 117 may send a request to the encoded object generating component 120 to generate an object, such as a deep link, encoding the generated payment invoice. The generated object encoding the payment invoice may be represented as a scannable QR code or an interactable payment link. In at least one example, upon interacting with the generated object, a paying user may be directed to a particular payment interface on a cryptocurrency application or a web interface on a web browser (e.g., if the cryptocurrency application is not present), where the paying user may see the payment invoice and make the requested payment. At step 1410, the encoded object generating component 120 may send the generated deep link to the user interface component 117. At step 1412, the user interface component 117 may cause the user device 112a to present the encoded object or deep link, as shown for example in FIG. 4A.

Figure 15:
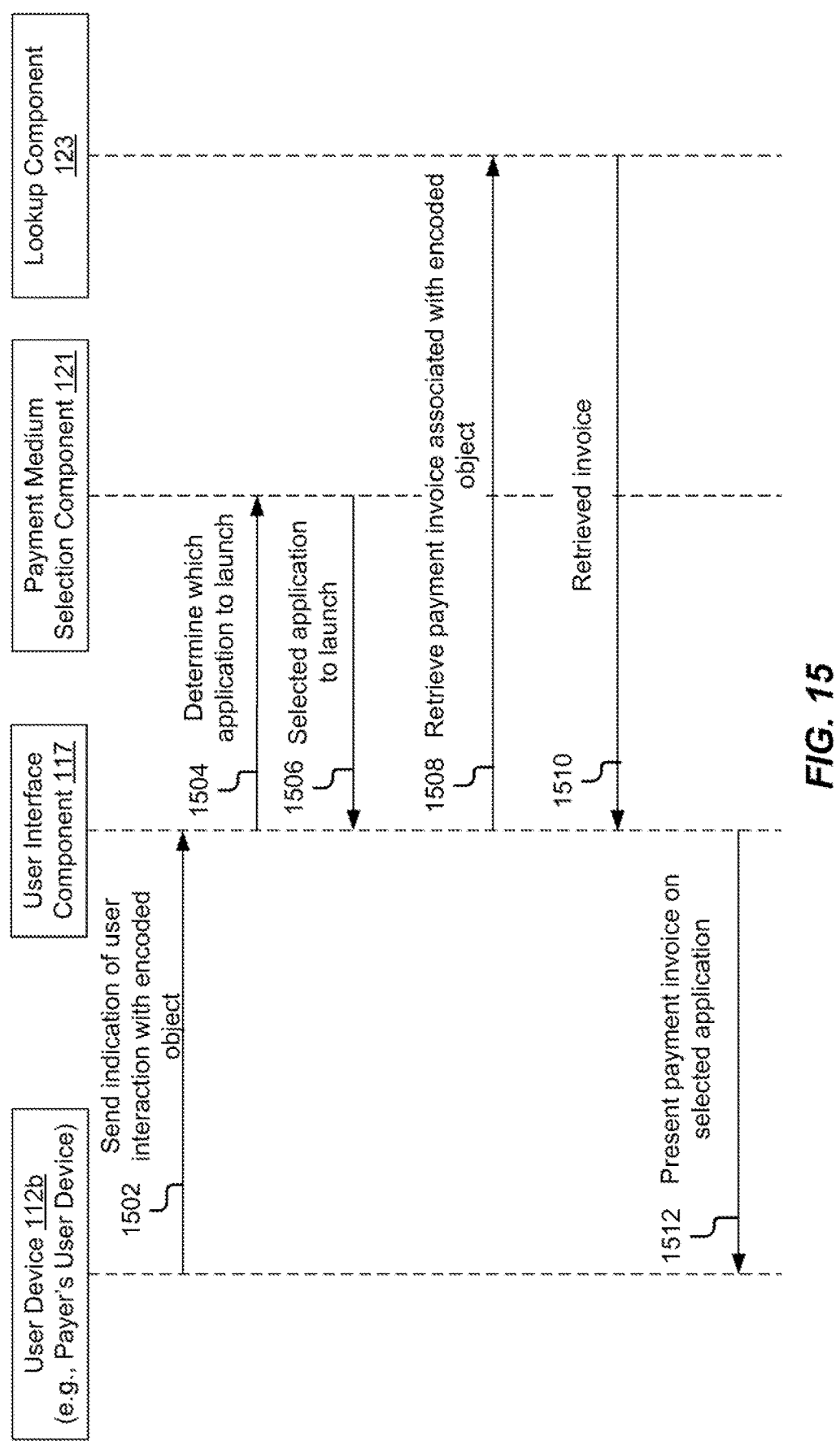
FIG. 15 illustrates an example sequence diagram showing example operations associated with sending a payment according to some embodiments disclosed herein.

FIG. 15 illustrates an example sequence diagram 1500 showing example operations associated with sending a payment. As depicted, the process may begin, at step 1502, with a user device 112b (e.g., payor's user device) sending an interaction of the payor with an encoded object, such as a deep link. For example, the payor may click on the message 602 a deep link shown in FIG. 6A. The user interaction with the deep link may be received by the user interface component 117 of the payment service system 106. At step 1504, the user interface component 117 may send a request to the payment medium selection component 121 to select a payment channel (e.g., a cryptocurrency application, a payment application, or a website with a payment interface and/or cryptocurrency interface in a web browser) to launch on the user device 112b in response to the payor interacting with the deep link. Selecting the payment channel may refer to determining which particular application (e.g., a cryptocurrency application, a payment application, or a website with a payment interface and/or cryptocurrency interface in a web browser) to launch on the user device 112b in response to the payor interacting with the deep link. For instance, the user interface component 117 may coordinate with the payment medium selection component 121 to select the payment channel, for example by determining whether to launch a default cryptocurrency application associated with the payment service system 106 (e.g., as shown in FIGS. 6A-6B), an alternate cryptocurrency application (e.g., as shown in FIG. 7C), a web browser displaying a website with a payment interface (e.g., as shown in FIG. 7A-7B or 10A-10B), or any other payment application present on the user device 112b. At step 1506, the payment medium selection component 121 may select a particular payment channel (e.g., application) and send an indication of the selected payment channel (e.g., application) to the user interface component 117. In some examples, the payment medium selection component 121 may select the payment channel (e.g., application) based on the contextual data 134 discussed herein. In some examples, if the payment medium selection component 121 selects or recommends a payment channel (e.g., a cryptocurrency application or an application that is different from the default cryptocurrency application associated with the payment service system 106), then the user interface component 117 may coordinate with the encoded object generating component 120 to reformat the received deep link to a modified deep link (e.g., make it a general request to pay the invoice). For example, the payment request can be restructured as a "bitcoin://" link. This second deep link is also interpreted by the user's device if a different payment channel or application is registered to handle the second deep link. A third-party application can then be used to process the invoice, even though the request was originally generated using the default cryptocurrency application.

At step 1508, the user interface component 117 may send a request to the lookup component 123 to retrieve or lookup the payment invoice associated with the deep link interacted by the payor. The payment invoice may be generated in the past and stored in the datastore 128 by the invoice management component 119 as discussed above with respect to FIG. 14. In one example, the user interface component 117 may provide a unique user ID of the payee to whom the payor is trying to make payment using the deep link. The user ID of the payee may be included in the deep link itself. At step 1510, the lookup component 123 may retrieve the payment invoice using the unique user ID from the datastore 128 and send the retrieved invoice back to the user interface component 117. In some examples, steps 1508 and 1510 by the lookup component 123 may further ensure that there are no phishing attacks involved with the user interaction with the deep link, as discussed in further detail below with respect to FIG. 16.

At step 1512, responsive to determining which particular application to launch and retrieving the payment invoice associated with the deep link, the user interface component 117 may cause the user device 112 to present the payment invoice on the particular application. By way of an example and without limitation, if the cryptocurrency application associated with the payment service system 106 is installed on the user device 112b, then the user interface component 117 may instruct the user device 112b to launch that cryptocurrency application and present the payment invoice thereon for the payor to make the payment, as shown in FIGS. 6A-6D. As another example, if the cryptocurrency application associated with the payment service system 106 is not installed on the user device 112b, then the user interface component 117 may instruct the user device 112b to launch a web browser to present the payment invoice on a web interface, as shown in FIGS. 7A-7D.

Figure 16:
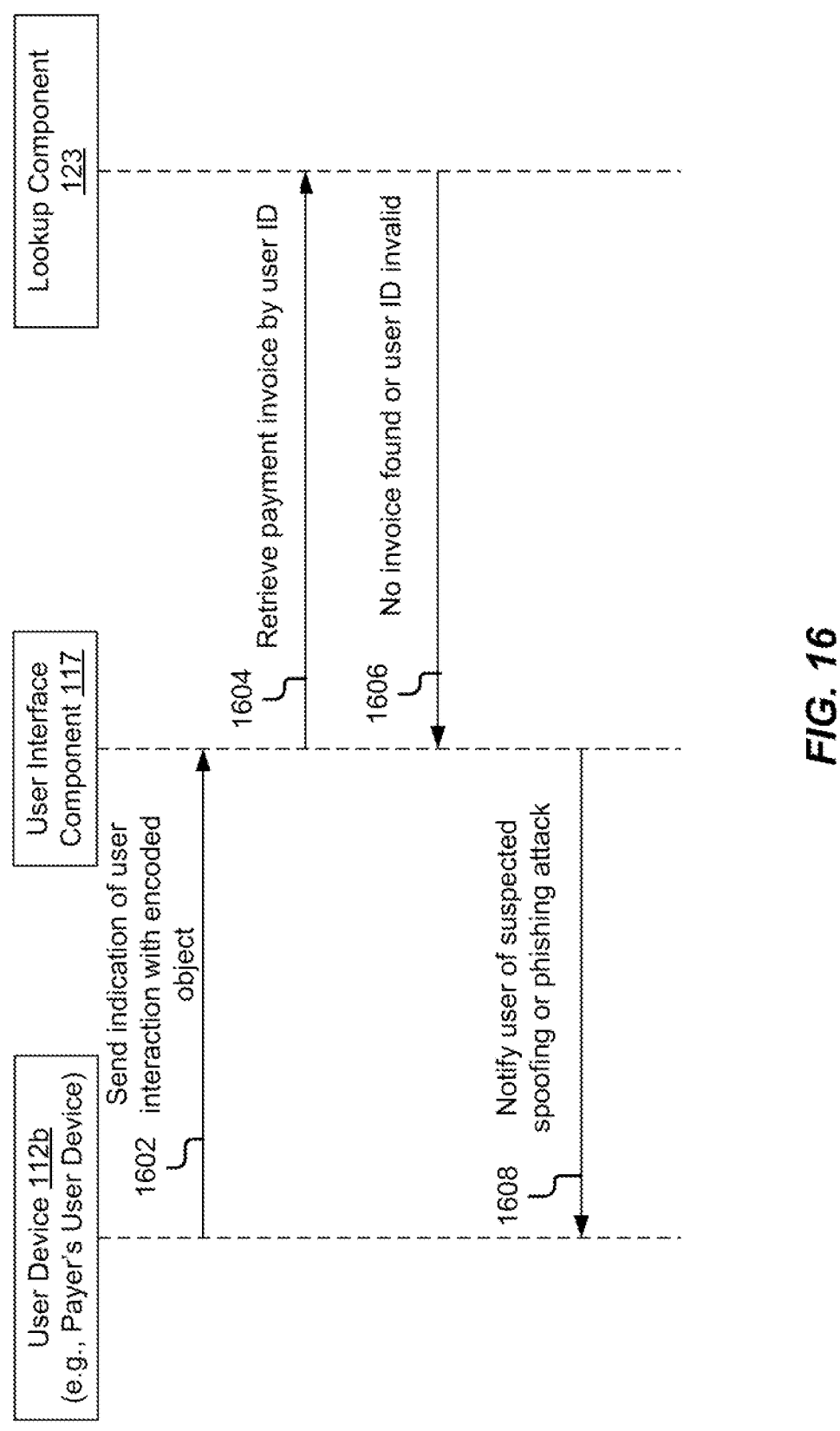
FIG. 16 illustrates an example sequence diagram showing another example operations associated with sending a payment according to some embodiments disclosed herein.

FIG. 16 illustrates an example sequence diagram 1600 showing another example operation associated with sending a payment. As depicted, the process may begin, at step 1602, with a user device 112b (e.g., payor's user device) sending an interaction of the payor with an encoded object, such as a deep link. For example, the payor may click on the message 602 including a deep link shown in FIG. 6A. The user interaction with the deep link may be received by the user interface component 117 of the payment service system 106. An indication of the user interaction with the deep link may represent an indication of a user interaction with an encoded object. In some examples, the user interaction with the deep link (or another user interaction with an encoded object or another indication) may include a request, such as a request for payment.

At step 1604, the user interface component 117 may send a request to the lookup component 123 to retrieve or lookup the payment invoice associated with the deep link interacted by the payor. The lookup component 123 may try to retrieve the invoice from the datastore 128 by the user ID of the payee or recipient included in the deep link. The datastore 128 may store invoices 132 generated in the past by the invoice management component 119 based on payees' payment requests. Each invoice 132 stored in the datastore 128 may be associated with a unique token or user ID associated with a payee who sent the payment request. If the invoice is found, the lookup component 123 may provide the retrieved invoice to the user interface component 117, which may then present the invoice to the user device 112b, as discussed above with respect to at least FIG. 15. If the invoice is not found, then, at step 1606, the lookup component 123 may notify the user interface component 117 that no invoice is found or the user ID associated with the deep link is invalid. At step 1608, the user interface component 117 may instruct the user device 112b to notify the payor that the payment link is suspected to be invalid or seems to be received from a suspicious account or fraudulent user. In this way, the payment service system 106 may try to avoid any spoofing or phishing attacks associated with the payment transactions discussed herein.

In some examples, the lookup component 123 may compare the invoice to other invoices associated with the payor or payee to determine whether the invoice is suspicious or otherwise appears to be fraudulent. That is, the lookup component 123 can compare the payment request or invoice to previous payment requests or invoices to determine whether the payor and payee have a history of transactions (e.g., fraudulent transactions and/or transactions as a whole), whether the amount of the payment request or invoice is consistent with previous payments and/or invoices of the payee or payor, whether transaction data, appointment data, or other third-party data is indicative of an existing relationship between the payor and the payee, etc., to determine whether the payment request and/or invoice is suspicious or otherwise appears to be fraudulent. In some examples, the lookup component 123 can detect suspected fraud by detecting that account(s) associated with the payor and/or the payee in a transaction have a history of at least one previous fraudulent transaction.

In some examples, the lookup component 123 or another component of the payment service system 106 can detect fraud attempt(s) based on contextual data 134. For instance, detection of numerous requests and/or invoices (e.g., more than a threshold amount) that are share attributes with only minor variations (e.g., difference(s) in address, name, device identifier(s), wallet identifier(s), currency, amount, or a combination thereof) can indicate a brute force attack to the lookup component 123 or another component of the payment service system 106. Detection of inconsistencies or differences that would be impossible or unlikely in non-fraudulent transactions may also be detected as fraud attempts, such as requests for, and/or invoices indicating, simultaneous transactions in different locations or a series of transactions in quick succession in different locations. Similarly, detection of certain patterns or trends in a user's transaction history may be detected as fraud attempts. For instance, transactions at regular intervals, such as every day at the same time, or periodically according to a repeating interval, could be detected as fraud attempts. In some examples, step 1606 can involve detection of suspected fraud or phishing through any of the types of detections discussed above. In some examples, step 1608 can involve alerts of suspected fraud or phishing detected through any of the types of detections discussed above.

It should be noted that the sequence diagrams 1400-1600 shown in FIGS. 14-16 are not by any way limited to the operations or steps shown in these sequence diagrams and additional/alternative operations and/or steps can be implemented and are within the scope of the present disclosure. The operations shown in these sequence diagrams 1400-1600 are merely for example and illustration purposes and not to be construed as limiting.

FIG. 17 illustrates an example process 1700 associated with techniques described herein. In at least one example, the process 1700 can be performed by functional components described above with reference to FIG. 1; however, the process is not limited to being performed by such functional components. Further, the process includes steps or operations that can be performed in any order and, in some examples, individual steps may be optional. Furthermore, the process 1700 is not limited to the steps 1705-1745 and additional or alternative steps can also be performed as part of the process 1700 and are within the scope of the present disclosure. The process shown in FIG. 17 may be performed utilizing one or more processing devices (e.g., user device 112 or payment service system 106) associated with the recited entities that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/ executing on one or more processors), firmware (e.g., micro-code), or some combination thereof. The process shown in FIG. 17 may be performed utilizing one or more specialized components of the processing devices (e.g., user interface component 117, invoice management component 119, encoded object generating component 120, payment medium selection component 121, or lookup component 123 of the payment service system 106) consistent with the description here. In some examples, the process 1700 can be computer-implemented. In some examples, the process 1700 can be effectuated based on execution of instructions stored in a non-transitory computer-readable storage medium.

Particular embodiments may repeat one or more steps of the process of FIG. 17, where appropriate. Although this disclosure describes and illustrates particular steps of the process of FIG. 17 as occurring in a particular order, this disclosure contemplates any suitable steps of the process of FIG. 17 occurring in any suitable order. Moreover, although this disclosure describes and illustrates an example method as described above, including the particular steps of the process of FIG. 17, this disclosure contemplates any suitable method for performing the respective process, including any suitable steps, which may include all, some, or none of the steps of the process of FIG. 17, where appropriate. Furthermore, although this disclosure describes and illustrates particular components, devices, or systems carrying out particular steps of the process of FIG. 17, this disclosure contemplates any suitable combination of any suitable components, devices, or systems carrying out any suitable steps of the process of FIG. 17.

Particularly, FIG. 17 illustrates an example process 1700 for processing a cryptocurrency payment request. Steps are described below as being performed by individual functional components of the payment service system 106; however, additional or alternative functional components can perform the steps in additional or alternative examples.

At step 1705, a computing device (e.g., server 104) of a cryptocurrency service provider (or the payment service system 106) may receive a cryptocurrency payment request. For instance, the user interface component 117 of the payment service system 106 may receive the cryptocurrency payment request from a user device of the recipient, such as the user device 112a. The cryptocurrency payment associated with the cryptocurrency payment request is to be made to a recipient address of the recipient. In some examples, the recipient address can be associated with a layer 2 crypto-currency network (e.g., lightning network) and the crypto-currency payment can be made using the layer 2 cryptocur-rency network.

At step 1710, the computing device of the cryptocurrency service provider (or the payment service system 106) may generate a code for facilitating the cryptocurrency payment. For instance, the payment service system 106 may use the encoded object generating component 120 to generate an encoded object, such as a deep link, that may be represented as a QR code or an interactable payment link, as discussed elsewhere herein. Examples of the code may include the encoded object, the deep link, and/or the QR code, the interactable payment, or a combination thereof. In some examples, the recipient address may be encoded in the deep link. In at least one example, the generated code may be a unified code (e.g., as shown in FIG. 2B) and an interaction with the code (e.g., the third interaction of step 1745)

enables the cryptocurrency payment to be implemented via a layer 1 cryptocurrency network and/or a layer 2 crypto-currency network.

At step 1715, the computing device of the cryptocurrency service provider (or the payment service system 106) may cause the generated code to be presented via a recipient user interface of a recipient user device (e.g., user device 112a) associated with the recipient. For instance, the user interface component 117 may instruct the user device 112a to present the encoded object or the deep link including the code and/or payment link, as shown for example in the user interface 400a of FIG. 4A. In some examples, the recipient user interface is associated with a first user interface element, an interaction (e.g., the first interaction of step 1715) with which causes one or more sharing options to be presented. The one or more sharing options may include one or more applications or one or more users, as shown for example in FIG. 4B. For example, as depicted in FIG. 4A, the user interface 400a may include an activatable user interface element 408 that enables the recipient to share the deep link 402 with one or more other users via one or more sharing applications discussed herein. The one or more sharing applications can include, for example and without limitation, a messaging application, an email application, a social networking application, a blogging application, a microb-logging application, a forum application, a close proximity data transfer application, and/or a collaboration application.

At step 1720, the computing device of the cryptocurrency service provider (or the payment service system 106) may receive an input associated with the one or more sharing options. The input may designate a user and an application (e.g., a channel) for sharing the cryptocurrency payment request. For example, in response to the recipient interacting with the interface element 408, an interface 400b (FIG. 4B) is displayed to the recipient using which the recipient may select a particular user and an application (e.g., messaging application, email application, etc.) to share the deep link 402 for receiving the cryptocurrency payment. User selec-tions made on the interface 400b may be received by the user interface component 117 of the payment service system 106. In some examples, the cryptocurrency payment request may be formatted based on specifications of the selected appli-cation prior to sharing to sharing the cryptocurrency pay-ment request via the selected application. In some examples, the recipient may also input a specific amount to be asso-ciated with the cryptocurrency payment request and the amount may be encoded in the code, as shown and discussed for example with respect to at least FIGS. 5A-5E. In some examples, the input is associated with the code.

At step 1725, the computing device of the cryptocurrency service provider (or the payment service system 106) may cause the cryptocurrency payment request to be shared with the user via the application. For example, upon receiving recipient's input to share a deep link with a particular user via a messaging application, the user interface component 117 may instruct a user device (e.g., user device 112b) associated with the user to present a message showing the deep link, as shown in FIG. 6A. In at least one example, a second user interface element (e.g., message 602) represen-tative of the cryptocurrency payment request is presented via a user interface (e.g., interface 600a) of the application. In some examples, the second user interface element may include at least one of a name of the recipient, an image representative of the recipient, or a user identifier associated with the recipient to enable the user (e.g., payor) to verify an identity of the recipient. The second user interface element may obfuscate the recipient address. In some examples, the code (which may be referred to as a code element) may obfuscate the recipient address. In some examples, the second user interface element is associated with the code.

At step 1730, the computing device of the cryptocurrency service provider (or the payment service system 106) may receive a user interaction (e.g., the second interaction of step 1730) with the second user interface element. For instance, the user interface component 117 may receive an interaction of a payor interacting with the deep link, as shown and discussed with respect to FIG. 6A. At step 1735, in response to the user interaction with the second user interface element (e.g., message 602), the user interface component 117 in communication or coordination with the payment medium selection component 121 may make a determination of whether the cryptocurrency application associated with the cryptocurrency service provider (or payment service system 106) is installed and/or present on the user device (e.g., user device 112b) associated with the user and which particular application to launch or trigger based on the user interaction with the second user interface element.

At step 1740, based at least in part on receiving an indication of an interaction with the second user interface element and based at least in part on a determination (e.g., at step 1735) that an instance of a cryptocurrency application associated with the cryptocurrency service provider is installed and/or present on the user device of the user, the computing device of the cryptocurrency service provider (or the payment service system 106) may cause the cryptocurrency application to transition from the background to the foreground (e.g., of the user device) and present a payment user interface to enable the cryptocurrency payment (e.g., enable the user to make the cryptocurrency payment) from the user to the recipient using cryptocurrency stored in a balance managed by the cryptocurrency service provider, as shown for example in FIGS. 6B-6D. In some examples, the payment user interface may include a third user interface element for receiving input indicating an amount of the cryptocurrency payment. For instance, the payor may specify an amount that they would like to send to the payee with respect to the payment request. Furthermore, in at least one example, the payment user interface may include at least one of a name of the recipient, an image representative of the recipient, or a user identifier associated with the recipient to enable the user to verify an identity of the recipient.

In some examples, there may be a plurality of instances of cryptocurrency applications, including the cryptocurrency application, installed and/or present on the user device (e.g., payer's device) and the computing device of the cryptocurrency service provider (or the payment service system 106) may cause the cryptocurrency application to transition from the background to the foreground and present the payment user interface based at least in part on a determination that the cryptocurrency application is an optimal cryptocurrency application of the plurality of instances of cryptocurrency applications. In at least one example, the computing device of the cryptocurrency service provider (or the payment service system 106) may perform this determination based on or using contextual data associated with at least one of the recipient, the user (e.g., payor), or the cryptocurrency payment At step 1745, based at least in part on receiving an indication of an interaction with the second user interface element and based at least in part on a determination (e.g., at step 1735) that the user device does not have an instance of the cryptocurrency application installed and/or present thereon, the computing device of the cryptocurrency service provider (or the payment service system 106) may cause the code to be presented (e.g., to the user device) via a web interface (e.g., of a website served to a web browser running on the user device), for instance as shown for example in FIG. 7B or FIG. 8. In some examples, an interaction with the code as presented via the web interface enables the cryptocurrency payment (e.g., enable the user to make the cryptocurrency payment) from the user to the recipient using cryptocurrency stored in another balance managed by a different cryptocurrency service provider (and/or the balance managed by the cryptocurrency service provider). In some examples, the causing of the code to be presented via the web interface may be based at least in part on a determination that the user device (e.g., payer's device) does not have an instance of any cryptocurrency application installed thereon (e.g., as determined at step 1735).

Figure 18:
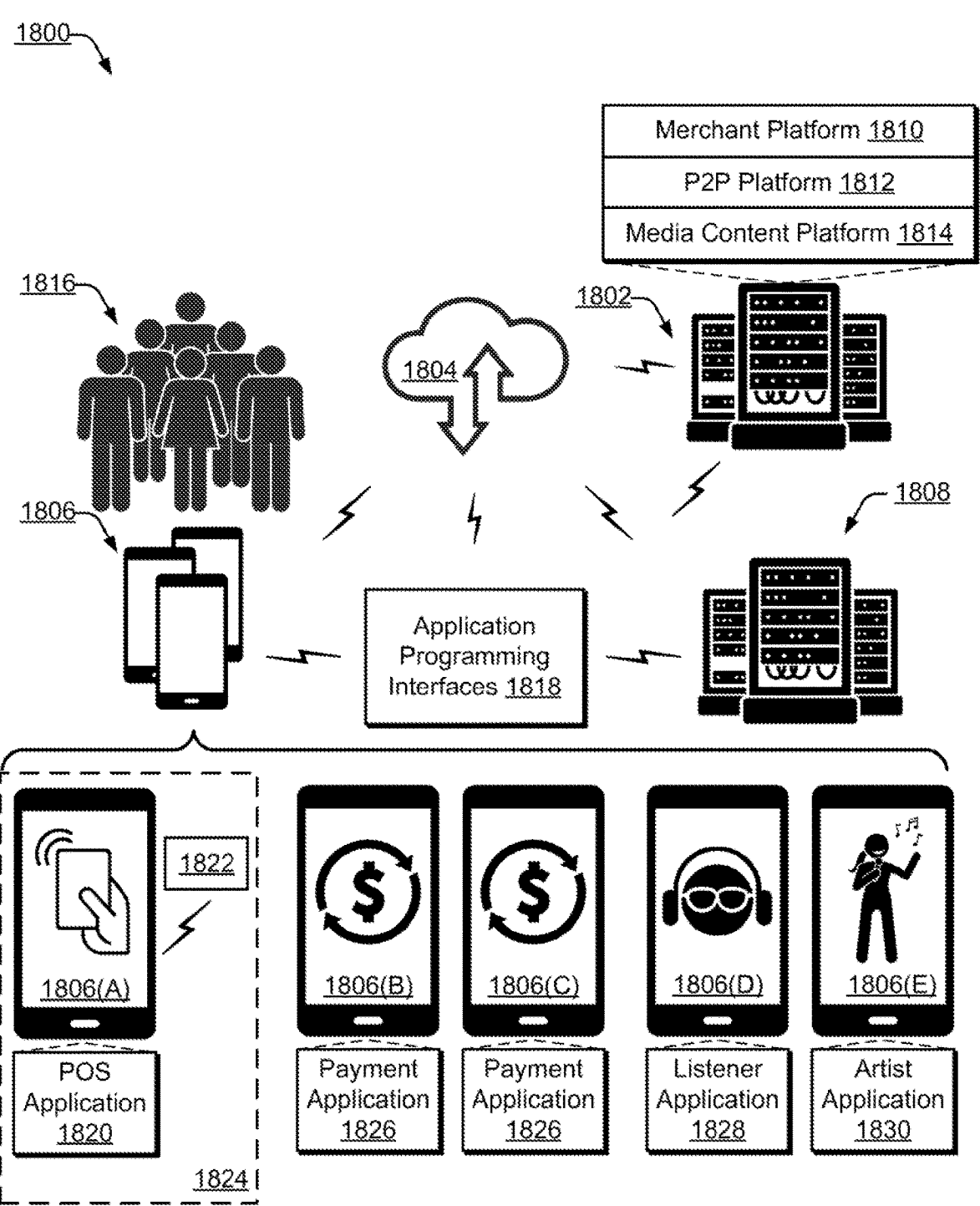
FIG. 18 is a block diagram illustrating an example environment for providing an application and/or for customizing the application for different platforms according to some embodiments disclosed herein.

FIG. 18 illustrates an example environment 1800 for application interface customization. The environment 1800 includes server(s) 1802 that can communicate over a network 1804 with end user devices 1806 and/or server(s) 1808 associated with third-party service provider(s). In various examples, the end user devices 1806 may comprise one or more merchant devices 1806(A), one or more user devices 1806(B) and/or 1806(C) in a peer network, one or more content consumption devices 1806(D), one or more artist user devices 1806(E), combinations of these examples, or other categories of user devices. The server(s) 1802 can be associated with one or more service providers that can provide one or more services for the benefit of users 1816, as described below. For example, the server(s) 1802 may enable services of service providers such as in association with a merchant platform 1810 (which may further include a buyer platform), a peer-to-peer (P2P) payment platform 1812, a media content platform 1814, a combination of these platforms, or other platforms associated with other service providers. While services and features are referenced throughout in connection with a particular one of the merchant platform 1810, the P2P payment platform 1812, or the media content platform 1814, it should be understood that any of these platforms may perform the functionality described in relation to any of the other platforms. Actions attributed to the service provider(s) can be performed by the server(s) 1802.

Certain elements of environment 100 described with respect to FIG. 1 correspond to similar elements described herein with respect to FIG. 18. For example, the server(s) 1802 and/or the server(s) 1808 can correspond to server(s) 104, the network(s) 1804 can correspond to the network(s) 108, the user device(s) 1806 can correspond to any of the user device(s) 112, the merchant platform 1810 and/or the server(s) 1802 and/or the server(s) 1808 associated with the third-party service provider(s) can correspond to third-party servers 130, payment service system (e.g., P2P payment platform 1812) can correspond to payment service system 106, the user(s) 1816 can correspond to user(s) 114, etc.

Similar to server(s) 104, servers 1802 can store one or more functional components that enable the payment service to perform operations as described herein. For example, the server(s) 1802 can store a user interface component 117, an invoice management component 119, a encoded object generating component 120, a payment medium selection component 121, and a lookup component 123. Each component can function similarly to the respective components described in FIG. 1. In some examples, the payment service system (e.g., P2P payment platform 1812) can store one or more functional components that enable the payment service to perform operations as described herein.

In some examples, individual ones of the end user devices 1806 can be operable by users 1816. The users 1816 (individually referred to herein as "user 1816") can be referred to as miners, customers, buyers, merchants, sellers, borrowers, employees, employers, payors, payees, couriers, artists, musicians, listeners, fans, supervisors, hosts, audience members, and so on. The users 1816 can interact with the end user devices 1806 via user interfaces presented via the end user devices 1806. In at least one example, a user interface can be presented via a web browser, or the like. Alternatively or additionally, a user interface can be presented via an application, such as a mobile application or desktop application, which can be provided by the merchant platform 1810, the P2P payment platform 1812, and/or the media content platform 1814, or which can be an otherwise dedicated application. In some examples, individual end user devices 1806 can have an instance or versioned instance of an application, which can be downloaded from an application store, for example, which can present the user interface(s) described herein.

In at least one example, the users 1816 can include merchants that can operate the seller device(s) 1806(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 1806(A) can have an instance of a point of sale ("POS") application 1820820 stored thereon. The POS application 1820 can configure the seller device 1806 (A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 1820 can determine transaction data associated with the POS transactions. Transaction data can include payment information, which can be obtained from a reader device 1822 associated with the seller device 1806(A), user authentication data, purchase amount information, point-of-purchase information (e.g., item(s) purchased, date of purchase, time of purchase, subscription type, etc.), etc. The POS application 1820 can send transaction data to the server(s) 1802 such that the server(s) 1802 can track transactions of the customers, merchants, and/or the users 1816 over time. Furthermore, the POS application 1820 can present a UI to enable the merchant to interact with the POS application 1820 and/or the merchant platform 1810 via the POS application 1820.

In at least one example, the seller device 1806(A) can be a special-purpose computing device configured as a POS terminal (via the execution of the POS application 1820). In at least one example, the POS terminal may be connected to a reader device 1822, which is capable of accepting a variety of payment instruments, such as credit cards, debit cards, gift cards, short-range communication based payment instruments, and the like, as described below. In at least one example, the reader device 1822 can plug in to a port in the seller device 1806(A), such as a microphone port, a headphone port, an audio-jack, a data port, or other suitable port. In additional or alternative examples, the reader device 1822 can be coupled to the seller device 1806(A) via another wired or wireless connection, such as via Bluetooth®, BLE, and so on. In some examples, the reader device 1822 can be a software solution executing on the POS terminal, e.g., a mobile phone. In some examples, the reader device 1822 can read information from alternative payment instruments including, but not limited to, wristbands and the like.

In some examples, the reader device 1822 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 1822, and communicate with the merchant platform 1810, which can provide, among other services, a payment processing service. The server(s) 1802 associated with the merchant platform 1810 can communicate with server(s) 1808, as described below. In this manner, the POS terminal and reader device 1822 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1822 of the POS system 1824 are shown as separate devices, in additional or alternative examples, the POS terminal and the reader device 1822 can be part of a single device. In some examples, the reader device 1822 can have a display integrated therein for presenting information to customers of a merchant. In additional or alternative examples, the POS terminal can have a display integrated therein for presenting information to the customers of the merchant. POS systems, such as the POS system 1824, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 1822, whereby the reader device 1822 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 1824, the server(s) 1802, and/or the server(s) 1808 may exchange payment information and transaction data to determine whether transactions are authorized. For example, the POS system 1824 may provide encrypted payment data, user authentication data, purchase amount information, point-of-purchase information, etc. (collectively, transaction data) to server(s) 1802 over the network(s) 1804. The server(s) 1802 may send the transaction data to the server(s) 1808.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. In at least one example, the service provider can serve as an acquirer and connect directly with the card payment network.

The card payment network (e.g., the server(s) 1808 associated therewith) can forward the fund transfer request to an issuing bank (e.g., "issuer"). The issuer is a bank or financial institution that offers a financial account (e.g., credit or debit card account) to a user. The issuer (e.g., the server(s) 1808 associated therewith) can make a determination as to whether the customer has the capacity to absorb the relevant charge associated with the payment transaction. In at least one example, the merchant platform 1810 can serve as an issuer and/or can partner with an issuer. The transaction is either approved or rejected by the issuer and/or the card payment network (e.g., the server(s) 1808 associated therewith), and a payment authorization message is communicated from the issuer to the POS device via a path opposite of that described above, or via an alternate path.

The server(s) 1808 may send an authorization notification over the network(s) 1804 to the server(s) 1802, which may send the authorization notification to the POS system 1824 over the network(s) 1804 to indicate whether the transaction is authorized. The server(s) 1802 may also transmit additional information such as transaction identifiers to the POS system 1824. In one example, the server(s) 1802 may include a merchant application and/or other functional components for communicating with the POS system 1824 and/or the server(s) 1808 to authorize or decline transactions (e.g., the API 1818). In examples, the merchant platform 1810 can enable the merchants to receive cash payments, payment card payments, and/or electronic payments from customers for POS transactions and the service provider can process transactions on behalf of the merchants.

Based on the authentication notification that is received by the POS system 1824 from server(s) 1802, the merchant may indicate to the customer whether the transaction has been approved. In some examples, approval may be indicated at the POS system 1824, for example, at a display of the POS system 1824. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The merchant platform 1810 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the end user devices 1806 can access all of the services. In some cases, the end user devices 1806 can have gradated access to the services, which can be based on risk tolerance, IDV outputs, subscriptions, and so on. In at least one example, access to such services can be availed to the merchants via the POS application 1820. In additional or alternative examples, each service can be associated with its own access point (e.g., application, web browser, etc.).

As the merchant platform 1810 processes transactions on behalf of the merchants, the merchant platform 1810 can maintain accounts or balances for the merchants in one or more ledgers. For example, the merchant platform 1810 can analyze transaction data received for a transaction to determine an amount of funds owed to a merchant for the transaction and deposit funds into an account of the merchant. The account can have a stored balance, which can be managed by the merchant platform 1810. The account can be different from a conventional bank account at least because the stored balance is managed by a ledger of the merchant platform 1810 and the associated funds are accessible via various withdrawal channels including, but not limited to, scheduled deposit, same-day deposit, instant deposit, and a linked payment instrument.

A scheduled deposit can occur when the merchant platform 1810 transfers funds associated with a stored balance of the merchant to a bank account of the merchant that is held at a bank or other financial institution (e.g., associated with the server(s) 1808). Scheduled deposits can occur at a prearranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the merchant platform 1810 to the bank account of the merchant.

In at least one example, the merchant platform 1810 may provide inventory management services. That is, the merchant platform 1810 may provide inventory tracking and reporting. Inventory management services may enable the merchant to access and manage a database storing data associated with a quantity of each item that the merchant has available (i.e., an inventory). Furthermore, in at least one example, the merchant platform 1810 can provide catalog management services to enable the merchant to maintain a catalog, which can be a database storing data associated with items that the merchant has available for acquisition (i.e., catalog management services). The merchant platform 1810 can offer recommendations related to pricing of the items, placement of items on the catalog, and multi-party fulfillment of the inventory, to name a few examples.

In at least one example, the merchant platform 1810 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the merchant platform 1810 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the merchant platform 1810 can provide financing services for offering and/or lending a loan to a borrower that is to be used for, in some instances, financing the borrower's short-term operational needs (e.g., a capital loan). Additionally or alternatively, the merchant platform 1810 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant. The merchant platform 1810 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The merchant platform 1810 can provide web-development services, which enable users 1816 who are unfamiliar with HTML, XML, Javascript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the merchant platform 1810 can recommend and/or generate content items to supplement omni-channel presences of the merchants.

Furthermore, the merchant platform 1810 can provide payroll services to enable employers to pay employees for work performed on behalf of employers. In at least one example, the merchant platform 1810 can receive data that includes time worked by an employee (e.g., through imported timecards and/or POS interactions), sales made by the employee, gratuities received by the employee, and so forth. Based on such data, the merchant platform 1810 can make payroll payments to employee(s) on behalf of an employer via the payroll service. For instance, the merchant platform 1810 can facilitate the transfer of a total amount to be paid out for the payroll of an employee from the bank of the employer to the bank of the merchant platform 1810 to be used to make payroll payments. In at least one example, when the funds have been received at the bank of the merchant platform 1810, the merchant platform 1810 can pay the employee, such as by check or direct deposit.

Moreover, in at least one example, the merchant platform 1810 can provide employee management services for managing schedules of employees. Further, the merchant platform 1810 can provide appointment services for enabling users 1816 to set schedules for scheduling appointments and/or users 1816 to schedule appointments.

In some examples, the merchant platform 1810 can provide restaurant management services to enable users 1816 to make and/or manage reservations, to monitor front-of-house and/or back-of-house operations, and so on. In such examples, the seller device(s) 1806(A) and/or server(s) 1802 can be configured to communicate with one or more other computing devices, which can be located in the front-of-house (e.g., POS device(s)) and/or back-of-house (e.g., kitchen display system(s) (KDS)). In at least one example, the merchant platform 1810 can provide order management services and/or fulfillment services to enable restaurants (or other merchant types) to manage open tickets, split tickets, and so on and/or manage fulfillment services.

In some examples, the merchant platform 1810 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the merchant platform 1810 can leverage other merchants and/or sales channels that are part of the merchant platform 1810 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the merchant platform 1810 can enable conversational commerce via conversational commerce services, which can use one or more machine learning mechanisms to analyze messages exchanged between two or more users 1816, voice inputs into a virtual assistant or the like, to determine intents of user(s) 1816. In some examples, the merchant platform 1810 can utilize determined intents to automate customer service, offer promotions, provide recommendations, or otherwise interact with customers in real-time. In at least one example, the merchant platform 1810 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1816 may be new to the merchant platform 1810 such that the user 1816 that has not registered (e.g., subscribed to receive access to one or more services offered by the merchant platform 1810) with the merchant platform 1810. The merchant platform 1810 can offer onboarding services for registering a potential user 1816 with the merchant platform 1810. In some examples, onboarding can involve presenting various questions, prompts, and the like to a potential user 1816 to obtain information that can be used to generate a profile for the potential user 1816. In at least one example, the merchant platform 1810 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the merchant platform 1810 can be transitioned to more permissive (e.g., less limited) or longer-term access to such services.

The merchant platform 1810 can be associated with IDV services, which can be used by the merchant platform 1810 for compliance purposes and/or can be offered as a service, for instance to third-party service providers (e.g., associated with the server(s) 1808). That is, the merchant platform 1810 can offer IDV services to verify the identity of users 1816 seeking to use or using their services. Identity verification may involve requesting a customer (or potential customer) to provide information that is used by compliance departments to prove that the information is associated with an identity of a real person or entity (e.g., an artist). In at least one example, the merchant platform 1810 can perform services for determining whether identifying information provided by a user 1816 accurately identifies the customer (or potential customer).

Techniques described herein can be configured to operate in both real-time/online and offline modes. "Online" modes refer to modes when devices are capable of communicating with the merchant platform 1810 while offline mode refers to modes when devices are unable to communicate with the server(s) 1808 due to network connectivity issue, for example. In such examples, devices may operate in "offline" mode where at least some payment data is stored (e.g., on the seller device(s) 1806(A)) and/or the server(s) 1802 until connectivity is restored and the payment data can be transmitted to the server(s) 1802 and/or the server(s) 1808 for processing.

In at least one example, the merchant platform 1810 can be associated with a hub, such as an order hub, an inventory hub, a fulfillment hub and so on, which can enable integration with one or more additional service providers (e.g., associated with the additional server(s) 1808). In some examples, such additional service providers can offer additional or alternative services and the service provider can provide an interface or other computer-readable instructions to integrate functionality of the service provider into the one or more additional service providers.

Turning now to the P2P functionality provided by the environment 1800, the P2P platform 1812 can provide a peer-to-peer payment service that enables peer-to-peer payments between two or more of the users 1816. Two or more of the users 1816 may be considered "peers" in a peer-to-peer interaction, such as a payment. In at least one example, the P2P platform 1812 can communicate with instances of a payment application 1826 (or other access point) installed on end user devices 1806 configured for operation by the users 1816. In an example, an instance of the payment application 1826 executing on a first user device 1806(B) operated by a payor (e.g., one of the users 1816) can send a request to the P2P platform 1812 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 1816) via a peer-to-peer payment. In some examples, assets associated with an account of the payor are transferred to an account of the payee. In some examples, assets can be held at least temporarily in an account of the P2P platform 1812 prior to transferring the assets to the account of the payee.

Figure 19:
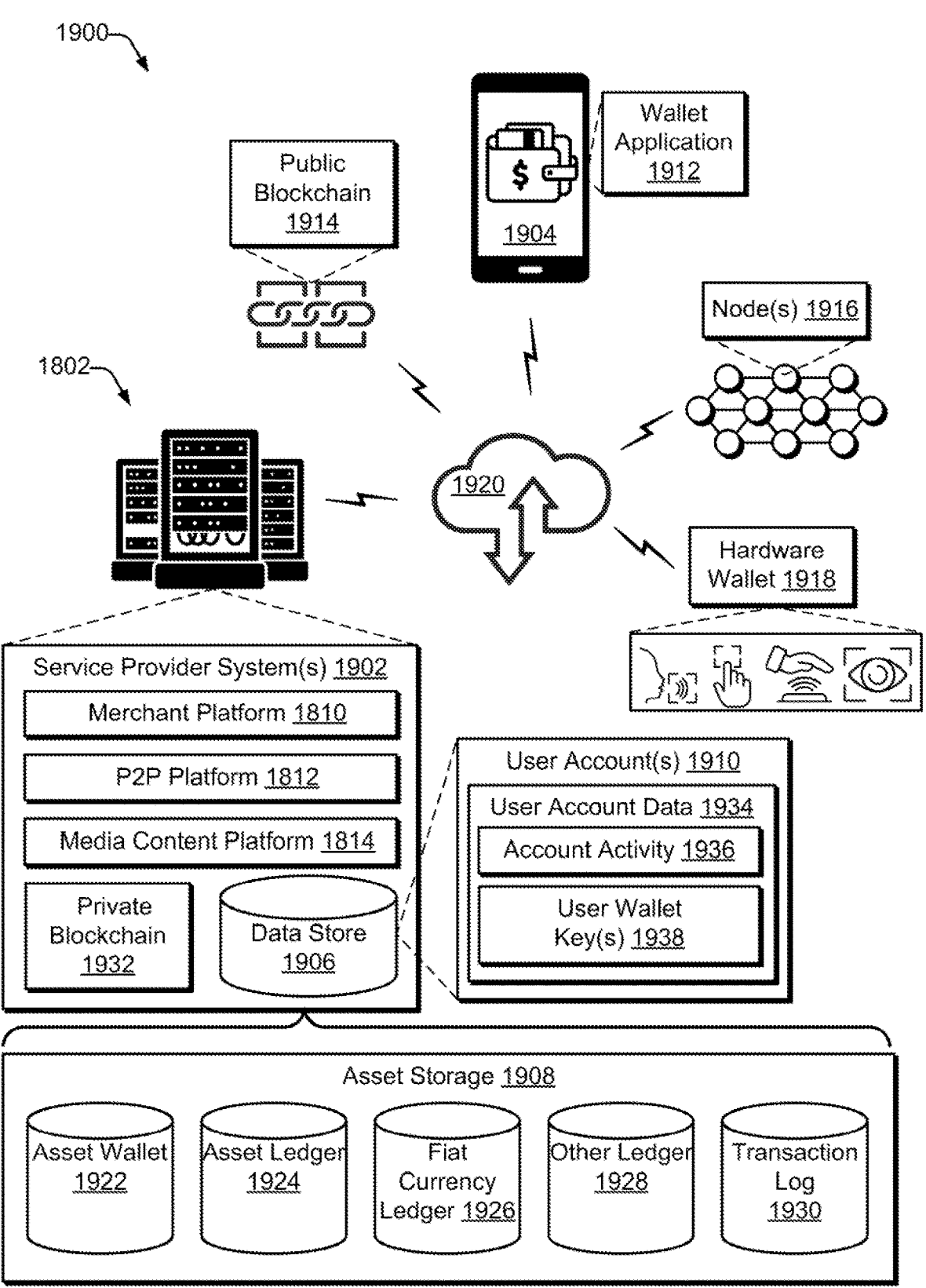
FIG. 19 is a block diagram illustrating an example environment including a service provider system which may be associated with the server(s) of FIG. 8 according to some embodiments disclosed herein.

In some examples, the P2P platform 1812 can utilize a ledger system to track transfers of assets between users 1816. FIG. 19, below, provides additional details associated with such a ledger system. The ledger system can enable users 1816 to own fractional shares of assets that are not conventionally available. For instance, a user can own a fraction of a Bitcoin, an NFT, or a stock. Additional details are described herein.

In at least one example, the P2P platform 1812 can facilitate transfers and can send notifications related thereto to instances of the payment application 1826 executing on user device(s) of payee(s). As an example, the P2P platform 1812 can transfer assets from an account of a first user to an account of a second user and can send a notification to the user device 1806(B) of the second user for presentation via a user interface. The notification can indicate that a transfer is in process, a transfer is complete, or the like. In some examples, the P2P platform 1812 can send additional or alternative information to the instances of the payment application 1826 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 1812 funds the request to payee on behalf of the payor, to speed up the transfer process and compensate for lags that may be attributed to the payor's financial network.

In some examples, the P2P platform 1812 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 1802 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 1826 executing on the end user devices 1806. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 1812 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 18 or a third-party service provider associated with the server(s) 1808. In examples where the content provider is a third-party service provider, the server (s) 1808 can be accessible via one or more APIs 1818 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 1812 (e.g., the P2P platform 1812 offers a chat or messaging service that is within the payment application or accessible via the payment application). In some examples, the messaging application can be external to the P2P platform 1812. (e.g., the messaging application is hosted by a third-party service provider associated with the server(s) 1808, which can be accessible via one or more of the APIs 1818 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 1812 can enable users 1816 to perform banking transactions via instances of the payment application 1826. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 1812 can enable users to allocate funds between different accounts, sub-accounts, or balances (e.g., spending, saving, different assets, different currencies), etc. Further, users 1816 can configure bill pay, recurring payments, and/or the like using assets associated with their accounts. In some examples, the P2P platform 1812, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 1812 enables users to buy and/or sell assets via asset networks such as cryptocurrency networks, securities networks, and/or the like. In some examples, acquisition of such assets can be in whole or fractional shares. The ledger system described below with reference to FIG. 19 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 1812 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 1812 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 1812 can automatically apply the amount of funds associated with the gift card to the transaction.

In some examples, users can configure their account such that when they use their payment instruments, the P2P platform 1812 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 1812 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 1812 can present activity data via an activity user interface of the payment application. In some examples, activity can be presented by merchant, date, time, amount, or the like. In some examples, interactions between entities can be represented in conversational communications such that each interaction or transaction is represented as a message. In some examples, users can interact with individual messages and/or send/request funds from within such a conversational communication. In some examples, such conversational communications can represent conversations of a group of two or more users. Groups can be used to pool funds, obtain group discounts or incentives, or enable multiple users to participate in financial transactions together (e.g., group investing, group savings, etc.).

The P2P platform 1812 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 1812.

In some examples, components of the environment 1800 may be integrated to enable payments at the point-of-sale using assets associated with user accounts of the P2P platform 1812. As illustrated in the environment 1800, the components can communicate with one another via the network 1804, where one or more APIs 1818 or other functional components can be used to facilitate such communication.

In at least one example, an integration can enable a customer to participate in a transaction via their own computing device (e.g., user device 1806(B)) instead of interacting with a merchant device of a merchant, such as the seller device 1806(A). In such an example, the POS application 1820, associated with a payment processing platform and executable by the seller device 1806(A) of the merchant, can present a Quick Response (QR) code, or other code that can be used to identify a transaction (e.g., a transaction code), in association with a transaction between the customer and the merchant. The QR code, or other transaction code, can be provided to the POS application 182020 via an API 1818 associated with the peer-to-peer payment platform. In an example, the customer can utilize their own computing device, such as the user device 1806(B), to capture the QR code, or the other transaction code, and to provide an indication of the captured QR code, or other transaction code, to server(s) 1802.

Based at least in part on the integration of the peer-to-peer payment platform and the payment processing platform (e.g., via the API 1818), the server(s) 1802 of the merchant platform 1810 can exchange communications with a payment application 1826 associated with the P2P platform 1812 and/or the POS application 182020 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 1812 and merchant platform 1810 (which can be a first- or third-party integration) such that a QR code, or other transaction code, specific to the transaction can be used for providing transaction details, location details, customer details, or the like to a computing device of the customer, such as the user device 1806(B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1806(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1820 and the payment application 1826, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. A customer computing device, such as the user device 1806(B), can be specially configured as a buyer-facing device having functionality similar to the functionality described above in the brick-and-mortar example.

In some examples, based at least in part on capturing the QR code, or other transaction code, the merchant platform 1810 can provide transaction data to the P2P platform 1812 for presentation via the payment application 182626 on the computing device of the customer, such as the user device 1806B (B), to enable the customer to complete the transaction via their own computing device. In some examples, in response to receiving an indication that the QR code, or other transaction code, has been captured or otherwise interacted with via the customer computing device, the P2P platform 1812 can determine that the customer authorizes payment of the transaction using funds associated with a stored balance of the customer that is managed and/or maintained by the P2P platform 1812. Such authorization can be implicit such that the interaction with the transaction code can imply authorization of the customer. Alternatively or additionally, the P2P platform 1812 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the P2P platform 1812 can transfer funds from the stored balance of the customer to the merchant platform 1810. In at least one example, the merchant platform 1810 can deposit the funds, or a portion thereof, into a stored balance of the merchant that is managed and/or maintained by the merchant platform 1810. In such an example, the merchant platform 1810 can be a "peer" to the customer in a peer-to-peer transaction.

In some examples, techniques described herein can enable the customer to interact with the transaction after payment for the transaction has been settled. For example, in at least one example, the merchant platform 1810 can cause a total amount of a transaction to be presented via a user interface associated with the payment application 1826 such that the customer can provide gratuity, feedback, loyalty information, or the like, via an interaction with the user interface. In another example, the merchant platform 1810 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 1812, if the customer inputs a tip and/or an event affecting the total amount of the transaction is triggered, the P2P platform 1812 can transfer additional funds, associated with the tip or event, to the merchant platform 1810. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1826 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 1812 as described herein (e.g., a debit card linked to a stored balance of a customer) such that when the payment instrument is caused to interact with a payment reader, the merchant platform 1810 can exchange communications with the P2P platform 1812 to authorize payment for a transaction and/or provision associated transaction data to a computing device of the customer associated with the transaction.

Turning now to media content functionality provided by the environment 1800, the media content platform 1814 can provide digital media to a content consumption device 1806(D) where playback may occur using "streaming." In examples, "streaming" media content involves encoding the media content and transmitting the encoded media content over the network 1804 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 1814 can provide a digital media streaming service (e.g., subscription-based, non-subscription-based) that enables a content consumption device 1806(D) to stream and/or download digital media content via a listener application 1828 installed on the content consumption device 1806(D). For instance, the media content platform 1814 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 1806(D), the listener application 1828 may verify access rights to the digital media content items at time intervals, for instance intermittently (e.g., when the content consumption device 1806(D) has a network connection with the media content platform 1814 via the network(s) 1804), and/or at regular intervals (e.g., daily, weekly, monthly, etc.). In examples, access rights to the digital media content items may be provided when a subscription to the media content platform 1814 is active, while access rights to the digital media content items may be withheld when the subscription to the media content platform 1814 is terminated. Enabling storage on the end user devices 1806 and subsequent access to digital media content items via the listener application 1828 provides the users 1816 with the ability to access the digital media content items "offline" such as when a connection to the media content platform 1814 via the network(s) 1804 is unavailable or unreliable.

In some examples, the media content platform 1814 may additionally or alternatively provide an artist management service that enables the users 1816 to manage aspects of artist business via an artist application 1830 installed on the artist device 1806(E), such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some cases, the users 1816 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 1816 may have access to a single user account via respective end user devices 1806, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 1830 and the listener application 1828 may be distinct applications having differing user experiences and verification processes for access, such as illustrated in the environment 1800. For instance, the media content platform 1814 may request additional verification, such as a link to an artist website, a sample of an artist's work, a verified credential supplied by a third party, etc. to grant access to the artist application 1830 in addition to information requested to access the listener application 1828. Further, the artist application 1830 may provide the artist management services described herein, without the subscription-based digital media streaming services described herein, and vice versa. However, examples are also considered in which functionality provided by the artist application 1830 and the listener application 1828 partially or fully overlap, and/or where verification processes for access are substantially similar.

In at least some examples, the media content platform 1814 enables interaction between the users 1816 utilizing the listener application 1828 installed on the content consumption devices 1806(D), and the users 1816 utilizing the artist application 1830 installed on the artist end user devices 1806(E). For example, the media content platform 1814 may provide interconnectivity between the subscription-based digital media streaming service and the artist management service. Functionality provided by the media content platform 1814 in such instances may include a communication channel between one or more of the users 1816 (e.g., a listener, fan, music supervisor, publisher, etc.) utilizing the listener application 1828 and another user (e.g., an artist) of the users 1816 utilizing the artist application 1830. The communication channel may include, for instance, a messaging platform (also referred to as a "messaging application" herein), a live streaming platform, a videoconferencing or teleconferencing platform, and/or a combination of these.

Additionally, in some cases, the media content platform 1814 may facilitate a resource transfer between the listener application 1828 and the artist application 1830. In an example, the media content platform 1814 may direct a resource, such as a portion of a subscription fee paid by one of the users 1816 designated as a listener, to one or more of the users 1816 designated as artists based on a number of instances that the listening user consumed (e.g., streamed, downloaded, etc.) content created by respective ones of the artist users. Alternatively or additionally, the media content platform 1814 may direct a resource, such as funds, from an account associated with a listening user to an account associated with an artist user (or vice versa), in accordance with transfers between accounts as described herein. The media content platform 1814 may facilitate resource transfers in examples such as merchandise purchases, event ticket purchases, "tipping" an artist, payments for royalties or other fees, and so forth.

In some examples, the media content platform 1814 enables interaction between individual ones of the users 1816 with one another via the listener application 1828 installed on the content consumption device 1806(D) and other of the content consumption devices 1806(D) via a communication channel as described above. In an example, the listener application 1828 may provide functionality via a communication channel for a user to stream an individual digital media item, a playlist, or the like to an audience comprising other ones of the content consumption devices 1806(D). Alternatively or additionally, the communication channel may facilitate sharing of individual digital media items, playlists, user and/or artist profiles, and the like between the users 1816 via messages, uniform resource locators (URLs), quick response (QR) codes, and so forth.

In some cases, the media content platform 1814 enables interaction between individual ones of the users 1816 with one another via the artist application 1830 installed on the artist device 1806(E) and other of the artist end user devices 1806 via a communication channel as described above. In some instances, the media content platform 1814 may provide recommendations for a particular user indicating which of the other users 1816 to communicate with. Such a recommendation may be based on a similarity (or dissimilarity) of content created by two or more of the users 1816, an overlap (or lack thereof) of audience members of the users 1816, a geographic location of the users 1816, a coinciding event location of the users 1816, and so forth. In some examples, a user may input parameters for a desired connection via the artist application 1830, and the media content platform 1814 may filter which of the users 1816 to surface for recommendations to the user based on the input parameters. Alternatively or additionally, the media content platform 1814 may implement one or more machine learning models to filter which of the users 1816 to surface for recommendations to the user. The recommendations provided by the media content platform 1814 may be data driven and thus increase relevance of communications presented to the users 1816 and reduce unsolicited communications that may be received by the users 1816.

The media content platform 1814 may interact with the server(s) 1808 associated with the third-party service providers to, for instance, ingest digital media items, report digital media consumption data, pay royalties, and the like. In some examples, the server(s) 1808 may be accessible by the media content platform 1814 via one or more APIs 1818 or other integrations. In some cases, the third-party service provider may be a digital media content provider (e.g., a record label, a performance rights organization (PRO), an independent artist, etc.). In such cases, the media content platform 1814 may receive digital media content items from the server(s) 1808, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title, track duration, clean or explicit version, jurisdiction information, and the like. The media content platform 1814 may use the metadata to associate the digital media content item as being created by a particular user, to provide search results to the users 1816, to generate playlists, and so forth. Further, the media content platform 1814 may provide payments (e.g., royalties) to the third-party service provider based on a number of streams and/or downloads of individual digital media content items by the users 1816 via the listener application 1828.

Techniques described herein are directed to services provided via a distributed system of end user devices 1806 that are in communication with server(s) 1802 of the service provider. That is, techniques described herein are directed to a specific implementation—or, a practical application—of utilizing a distributed system of end user devices 1806 that are in communication with server(s) 1802 of the merchant platform 1810, the P2P platform 1812, and/or the media content platform 1814 to perform a variety of services, as described above. The unconventional configuration of the distributed system described herein enables the server(s) 1802 that are remotely-located from end-users (e.g., users 1816) to intelligently offer services based on aggregated data associated with the end-users, such as the users 1816 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the merchant platform 1810, the P2P platform 1812, and/or the media content platform 1814, and those outside of the control of these service providers, to track the standing (payables, receivables, payroll, invoices, appointments, capital, balances, collaborations, etc.) of the users 1816. The techniques herein provide a consolidated view of a user's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1816 and end user devices 1806. Furthermore, such features are changed dynamically based on the profiles of the users involved interacting with the GUIs. As such, techniques described herein are directed to improvements to computing systems.

The merchant platform 1810, the P2P platform 1812, and/or the media content platform 1814 are capable of providing additional or alternative services, and the services described above are offered as a sampling of services. In at least one example, the merchant platform 1810, the P2P platform 1812, and/or the media content platform 1814 can exchange data with the server(s) 1808 associated with third-party service providers. Such third-party service providers can provide information that enables the merchant platform 1810, the P2P platform 1812, and/or the media content platform 1814 to provide services, such as those described above. In additional or alternative examples, such third-party service providers can access services of the merchant platform 1810, the P2P platform 1812, and/or the media content platform 1814. That is, in some examples, the third-party service providers can be subscribers, or otherwise access, services of the merchant platform 1810, the P2P platform 1812, and/or the media content platform 1814.

FIG. 19 illustrates an example environment 1900 including a service provider system 1902 which may be associated with the server(s) 1802 of FIG. 18. The environment 1900 may also include a user device 1904, which may correspond to any of the end user devices 1806 described in relation to FIG. 18. In examples, the service provider system 1902 may include one or a combination of the merchant platform 1810, the P2P platform 1812, or the media content platform 1814, as well as one or more data store(s) 1906 that can store assets in an asset storage 1908, as well as data in user account(s) 1910. In some examples, the environment 1900 may also include a public blockchain 1914, one or more nodes 1916, and/or a hardware wallet 1918. The service provider system 1902, the user device 1904, public blockchain 1914, the node(s) 1916, and the hardware wallet 1918 may be connected and able to communicate via one or more networks 1920, which may have the same or similar functionality described in relation to the network 1804 of FIG. 18.

In some examples, user account(s) 1910 can include merchant account(s), customer account(s), media content subscriber account(s), artist account(s), and so forth. In at least one example, the asset storage 1908 can be used to record whether individual assets are registered to a user account 1910. For example, the asset storage 1908 can include asset wallet(s) 1922 for storing records of assets owned by the service provider system 1902, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 1808 of FIG. 18 can be associated therewith.

The asset wallet 1922 can be associated with one or more addresses and can vary addresses used to acquire assets (e.g., from the asset network(s)) so that its holdings are represented under a variety of addresses on the asset network. In examples where the service provider system 1902 has holdings of cryptocurrency (e.g., in the asset wallet 1922), a user can acquire cryptocurrency directly from the service provider system 1902. In some examples, the service provider system 1902 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 1902 can provide the same or similar functionality for securities or other assets.

The asset storage 1908 may contain ledgers that store records of assignments of assets to users 1816. Specifically, the asset storage 1908 may include asset ledger 1924, fiat currency ledger 1926, and/or other ledger(s) 1928, which can be used to record transfers of assets between users 1816 and/or one or more third-parties (e.g., merchant network(s), payment card network(s), ACH network(s), equities network(s), the asset network, securities networks, etc.). In doing so, the asset storage 1908 can maintain a running balance of assets managed by the service provider system 1902. The ledger(s) of the asset storage 1908 can further indicate some of the running balance for individual ledger(s) stored in the asset storage 1908 are assigned or registered to one or more user account(s) 1910.

In at least one example, the asset storage 1908 can include transaction logs 1930, which can include, as transaction data, records of past transactions involving the service provider system 1902 and/or the user account 1910. In some examples, the data store(s) 1906 can store a private blockchain 1932. A private blockchain 1932 can function to record sender addresses, recipient addresses, public keys, values of cryptocurrency transferred, and/or can be used to verify ownership of cryptocurrency tokens to be transferred. In some examples, the service provider system 1902 can record transactions involving cryptocurrency until the number of transactions has exceeded a determined limit (e.g., number of transactions, storage space allocation, etc.). Based at least in part on determining that the limit has been reached, the service provider system 1902 can publish the transactions in the private blockchain 1932 to the public blockchain 1914 (e.g., associated with the asset network), where miners can verify the transactions and record the transactions to blocks on the public blockchain 1914. In at least one example, the service provider system 1902 can participate as miner(s) at least for transactions to which the respective platform is a party to, to be posted to the public blockchain 1914.

In some cases, the data store(s) 1906 can store and/or manage multiple user accounts, an example of which is described in relation to the user account 1910. In at least one example, the user account 1910 can include user account data 1934, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1934 can include account activity 1936 and user wallet key(s) 1938. In some examples, the user wallet key(s) 1938 can include a public-private key-pair and a respective address associated with the asset network or other asset networks. In some examples, the user wallet key(s) 1938 may include one or more key pairs, which can be unique to the asset network or other asset networks.

In addition to the user account data 1934, the user account 1910 can include ledger(s) for account(s) managed by the service provider system 1902, for the user. For example, the user account 1910 may include an asset ledger 1924, a fiat currency ledger 1926, and/or one or more other ledgers 1928. The ledger(s) can indicate that a corresponding user utilizes the service provider system 1902 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 1902.

In some examples, the asset ledger 1924 can store a balance for each of one or more cryptocurrencies (e.g., Bitcoin, Ethereum, Litecoin, etc.) registered to the user account 1910. In at least one example, the asset ledger 1924 can further record transactions of cryptocurrency assets associated with the user account 1910. For example, the user account 1910 can receive cryptocurrency from the asset network using the user wallet key(s) 1938. In some examples, the user wallet key(s) 1938 may be generated for the user upon request. User wallet key(s) 1938 can be requested by the user in order to send, exchange, or otherwise control the balance of cryptocurrency held by the service provider system 1902 (e.g., in the asset wallet 1922) and registered to the user. In some examples, the user wallet key(s) 1938 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider system 1902 and the value is credited as a balance in asset ledger 1924), by purchasing currency in the form associated with the account using currency in a different form (e.g., buying a value of cryptocurrency from the service provider system 1902 using a value of fiat currency reflected in fiat currency ledger 19261926, and crediting the value of cryptocurrency in asset ledger 1924), or by conducting a transaction with another user (customer or merchant) of the service provider system 1902 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 1902 (i.e., an external account). Such a transaction can request that the user to transfer an amount of the cryptocurrency in a message signed by user's private key to an address provided by the service provider system 1902. In at least one example, the transaction can be sent to miners to bundle the transaction into a block of transactions and to verify the authenticity of the transactions in the block. Once a miner has verified the block, the block is written to the public blockchain 1914 where the service provider system 1902 can then verify that the transaction has been confirmed and can credit the user's asset ledger 1924 with the transferred amount. When an account is funded by transferring cryptocurrency from a third-party cryptocurrency wallet, an update can be made to the public blockchain 1914. In some cases, this update of the public blockchain 1914 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 1902. As described above, in some examples, the service provider system 1902 can acquire cryptocurrency from a third-party source. In examples where the service provider system 1902 has its own cryptocurrency assets, cryptocurrency transferred in a transaction (e.g., data with address provided for receipt of transaction and a balance of cryptocurrency transferred in the transaction) can be stored in an asset wallet 1922 associated with the service provider system 1902. In at least one example, the service provider system 1902 can credit the asset ledger 1924 of the user. Additionally, while the service provider system 1902 recognizes that the user retains the value of the transferred cryptocurrency through crediting the asset ledger 1924, an inspection of the blockchain will show the cryptocurrency as having been transferred to the service provider system 1902. In some examples, the asset wallet 1922 can be associated with many different addresses. In such examples, an inspection of the blockchain may not necessarily associate all cryptocurrency stored in asset wallet 1922 as belonging to the same entity. The presence of a private ledger used for real-time transactions and maintained by the service provider system 1902, combined with updates to the public ledger at other times, allows for extremely fast transactions using cryptocurrency to be achieved. In some examples, the "private ledger" can refer to the asset ledger 1924, which in some examples, can utilize the private blockchain 1932, as described herein. The "public ledger" can correspond to the public blockchain 1914 associated with the asset network.

In at least one example, an asset ledger 1924, fiat currency ledger 1926, or the like associated with the user account 1910 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1924. In some examples, a user can receive fiat currency or another currency in the form of payment for a transaction with another user. In at least one example, at least a portion of such funds can be converted into cryptocurrency by the service provider system 1902 and used to fund the asset ledger 1924 of the user.

In examples, a user can also have an account in U.S. dollars, which can be tracked, for example, via the fiat currency ledger 1926. Such an account can be funded by transferring money from a bank account at a third-party bank to an account maintained by the service provider system 1902 as is conventionally known. In some examples, a user can receive fiat currency in the form of payment for a transaction with another user. In such examples, at least a portion of such funds can be used to fund the fiat currency ledger 1926.

In some examples, a user can have one or more internal payment cards registered with the service provider system 1902. Internal payment cards can be linked to one or more of the accounts associated with the user account 1910. In some embodiments, options with respect to internal payment cards can be adjusted and managed using an application (e.g., the payment application 1826, a wallet application 1912, etc.).

In at least one example, the user account 1910 can be associated with the asset wallet accessible via a wallet application 1912 of the user device 1904, or a stored balance for use in payment transactions, peer-to-peer transactions, payroll payments, etc. In at least one example, the asset wallet 1922 can store data indicating an address provided for receipt of a cryptocurrency transaction. In at least one example, the balance of the asset wallet 1922 can be based at least in part on a balance of the asset ledger 1924. In at least one example, funds availed via the asset wallet 1922 can be stored in the asset wallet 1922. Funds availed via the asset wallet 1922 can be tracked via the asset ledger 1924. The asset wallet 1922, however, can be associated with additional cryptocurrency funds.

In at least one example, when the service provider system 1902 includes a private blockchain 1932 for recording and validating cryptocurrency transactions, the asset wallet 1922 can be used instead of, or in addition to, the asset ledger 1924. For example, a merchant can provide the address of the asset wallet 1922 for receiving payments. In an example where a customer is paying in cryptocurrency and the customer has their own cryptocurrency wallet account associated with the service provider system 1902, the customer can send a message signed by its private key including its wallet address (i.e., of the customer) and identifying the cryptocurrency and value to be transferred to the merchant's asset wallet 1922. The service provider system 1902 can complete the transaction by reducing the cryptocurrency balance in the customer's cryptocurrency wallet and increasing the cryptocurrency balance in the merchant's asset wallet 1922. In addition to recording the transaction in the respective cryptocurrency wallets, the transaction can be recorded in the private blockchain 1932 and the transaction can be confirmed. A user can perform a similar transaction with cryptocurrency in a peer-to-peer transaction as described above.

While the asset ledger 1924 and/or asset wallet 1922 are each described above with reference to cryptocurrency, the asset ledger 1924 and/or asset wallet 1922 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 1902 is an aspect of the technology disclosed that enables technical advantages of increased processing speed and improved security.

The description of the environment 1900 above generally relates to a centralized service provider system 1902 that at least partially facilitates storing and managing assets in the data store 1906. However, the environment 1900 may also facilitate decentralized storage and management of assets alternatively or in addition to centralized storage and management as described above. For instance, the environment 1900 may include a decentralized platform implemented using a plurality of nodes (e.g., web nodes), an example of which is illustrated as node 1916. The node 1916 is representative of a computer or other device tasked with validat-ing transactions and/or maintaining a copy of a blockchain ledger, such as a ledger associated with the public blockchain 1914. The decentralized platform may be implemented via the environment 1900 through use of decentralized identifiers and verifiable credentials that are stored and managed by user devices 1904. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 1902). The decentralized identity referenced by a decentralized identifier gives an entity control over what data can be accessed, stored, modified, and so forth by other entities, such as the service provider system 1902.

The node 1916, as representative of one of a plurality of decentralized nodes (e.g., decentralized web nodes), supports data storage and relays that allows entities, service provider systems, individuals, organizations and so forth to send, store, and receive encrypted or public messages and data. The node 1916 is universally addressable and is "crawlable" using data addressing in relation to the decentralized identifiers. The node 1916 is also configured to support decentralized replication of data across the nodes that is consistent across multiple nodes over time through continued data communication between the nodes in the decentralized platform. The node 1916 is configurable to support secure encryption through use of a cryptographic key associated with an individual's decentralized identifier and support semantic discovery to discover different forms of published data.

Verifiable credentials are an open standard for digital credentials, and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 1904 may be an issuer, a holder, and/or a verifier, as can the service provider system 1902.

In some examples, the user device 1904 may implement a wallet application 1912 configured to manage decentralized identifiers and/or verifiable credentials. For instance, the wallet application 1912 may provide a user interface for implementation of access controls to various data associated with the decentralized identifier by the service provider system 1902, to other user devices, and so forth. Additionally, the wallet application 1912 may be configured to provide functionality for resource transfers (e.g., cryptocurrency, fiat currency, etc.) with the service provider system 1902, other user devices, and the like, based on techniques described herein.

In some examples, the hardware wallet 1918 may store cryptocurrency assets in combination with the wallet application 1912 and the service provider system 1902. For instance, the hardware wallet 1918, the wallet application 1912, and the service provider system 1902 may each store a respective, different private key, where a transaction with the cryptocurrency assets is signed by at least two of the three private keys. The user interface provided by the wallet application 1912 may allow a user to request a transaction. The wallet application 1912 may then sign the transaction with the private key of the wallet application 1912, have either the hardware wallet 1918 or the service provider system 1902 use a second of the three private keys to sign the transaction, and then provide the transaction with two signatures to the public blockchain 1914 for processing.

FIG. 20 depicts an illustrative block diagram illustrating a system 2000 for performing techniques described herein. The system 2000 includes a user device 2002, that communicates with server computing device(s) (e.g., server(s) 2004) via network(s) 2006 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 2002 is illustrated, in additional or alternate examples, the system 2000 can have multiple user devices, as described above with reference to FIG. 18.

The one or more other components and data 2244 can include programs, drivers, etc., and the data used or generated by the functional components (e.g., functional components 2035-2041). Further, the server(s) 2004 can include many other logical, programmatic and physical components, of which those described above are merely examples that are related to the discussion herein.

In at least one example, the user device 2002 can be any suitable type of computing device, e.g., portable, semi-portable, semi-stationary, or stationary. Some examples of the user device 2002 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 2002 can be any computing device capable of sending communications and performing the functions according to the techniques described herein. The user device 2002 can include devices, e.g., payment card readers, or components capable of accepting payments, as described below. The user device 2002 may be representative of, and provide functionality for, the user devices 1806 described in relation to FIG. 18.

In the illustrated example, the user device 2002 includes one or more processors 2008, one or more computer-readable media 2010, one or more communication interface(s) 2012, one or more input/output (I/O) devices 2014, a display 2016, sensor(s) 2018, one or more encoders 2046, and one or more decoders 2048.

In at least one example, each processor 2008 can itself comprise one or more processors or processing cores. For example, the processor(s) 2008 can be implemented as one or more microprocessors, microcomputers, microcontrollers, digital signal processors, central processing units, state machines, logic circuitries, and/or any devices that manipulate signals based on operational instructions. In some examples, the processor(s) 2008 can be one or more hardware processors and/or logic circuits of any suitable type specifically programmed or configured to execute the algorithms and processes described herein. The processor(s) 2008 can be configured to fetch and execute computer-readable processor-executable instructions stored in the computer-readable media 2010.

Depending on the configuration of the user device 2002, the computer-readable media 2010 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 2010 can include, but is not limited to, RAM, ROM, EEPROM, flash memory, solid-state storage, magnetic disk storage, optical storage, and/or other computer-readable media technology. Further, in some examples, the user device 2002 can access external storage, such as RAID storage systems, storage arrays, network attached storage, storage area networks, cloud storage, or any other medium that can be used to store information and that can be accessed by the processor(s) 2008 directly or through another computing device or network. Accordingly, the computer-readable media 2010 can be computer storage media able to store instructions, components or components that can be executed by the processor(s) 2008. Further, when mentioned, non-transitory computer-readable media exclude media such as energy, carrier signals, electromagnetic waves, and signals per se.

The computer-readable media 2010 can be used to store and maintain any number of functional components that are executable by the processor(s) 2008. In some implementations, these functional components comprise instructions or programs that are executable by the processor(s) 2008 and that, when executed, implement operational logic for performing the actions and services attributed above to the user device 2002. Functional components stored in the computer-readable media 2010 can include a user interface 2020 to enable users to interact with the user device 2002, and thus the server(s) 2004 and/or other networked devices. In some examples, the user interface 2020 can include a UI associated with, and/or including, any of the user interfaces of any of FIGS. 1-13B. In at least one example, a user can interact with the user interface via touch input, spoken input, gesture, or any other type of input. The word "input" is also used to describe "contextual" input that may not be directly provided by the user via the user interface 2020. For example, user's interactions with the user interface 2020 are analyzed using, e.g., natural language processing techniques, user movement tracking techniques, eye tracking techniques, etc. to determine context or intent of the user, which may be treated in a manner similar to "direct" input.

Depending on the type of the user device 2002, the computer-readable media 2010 can also optionally include other functional components and data, such as other components and data 2022, which can include programs, drivers, etc., and the data used or generated by the functional components. In addition, the computer-readable media 2010 can also store data, data structures and the like, that are used by the functional components. Further, the user device 2002 can include many other logical, programmatic and physical components, of which those described are merely examples that are related to the discussion herein.

In at least one example, the computer-readable media 2010 can include additional functional components, such as an operating system 2024 for controlling and managing various functions of the user device 2002 and for enabling user interactions.

The communication interface(s) 2012 can include one or more interfaces and hardware components for enabling communication with various other devices, such as over the network(s) 2006 or directly. For example, communication interface(s) 2012 can enable communication through one or more network(s) 2006, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 2006 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 2002 can further include one or more input/output (I/O) devices 2014. The I/O devices 2014 can include speakers, a microphone, a camera, and various user controls (e.g., buttons, a joystick, a keyboard, a keypad, etc.), a haptic output device, and so forth. The I/O devices 2014 can also include attachments that leverage the accessories (audio-jack, USB-C, Bluetooth, etc.) to connect with the user device 2002.

In at least one example, user device 2002 can include a display 2016. Depending on the type of computing device(s) used as the user device 2002, the display 2016 can employ any suitable display technology. For example, the display 2016 can be a liquid crystal display, a plasma display, a light emitting diode display, an OLED (organic light-emitting diode) display, an electronic paper display, or any other suitable type of display able to present digital content thereon. In at least one example, the display 2016 can be an augmented reality display, a virtual reality display, or any other display able to present and/or project digital content. In some examples, the display 2016 can have a touch sensor associated with the display 2016 to provide a touchscreen display configured to receive touch inputs for enabling interaction with a graphic interface presented on the display 2016. Accordingly, implementations herein are not limited to any particular display technology. In some examples, the user device 2002 may not include the display 2016, and information can be presented by other means, such as aurally, haptically, etc.

In addition, the user device 2002 can include sensor(s) 2018. The sensor(s) 2018 can include a global positioning system ("GPS") device able to indicate location information. Further, the sensor(s) 2018 can include, but are not limited to, an accelerometer, gyroscope, compass, proximity sensor, camera, microphone, and/or a switch.

In some examples, the GPS device can be used to identify a location of a user. In at least one example, the location of the user can be used by the merchant platform 1810, the P2P platform 1812, and/or the media content platform 1814, described above, to provide one or more services. That is, in some examples, the service provider can implement geofencing to provide particular services to users by the merchant platform 1810, the P2P platform 1812, and/or the media content platform 1814.

In examples, the user device 2002 includes a codec system, which may comprise an encoder 2046 and/or a decoder 2048. The encoder 2046 is configured to encode a data stream or signal from an analog signal (e.g., an analog audio signal, an analog video signal, etc.) to a digital signal for transmission or storage. The decoder 2048 is configured to convert the digital signal back to an analog signal, such as for playback or editing. In some cases, the encoder 2046 may be configured to encode the data stream or analog signal in an encrypted format, and the decoder 2048 may accordingly be configured to decrypt the digital signal as part of the decoding process (e.g., using a cryptographic key). Additionally, in some examples, the encoder 2046 may compress data to reduce transmission bandwidth and/or storage space for the digital signal. One example of a compression codec system is a lossless codec, in which the digital data stream is a compressed format of the original data stream, but retains the information present in the original data stream. Another example of a compression codec system is a lossy codec which reduces the quality of the digital data stream but can increase the compression of the data stream relative to lossless codec systems. The codec system comprising the encoder 2046 and/or the decoder 2048 may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 2000, the server 2004 may include an encoder 2046 and/or a decoder 2048 as well.

Additionally, the user device 2002 can include various other components that are not shown, examples of which include removable storage, a power source, such as a battery and power control unit, a barcode scanner, a printer, a cash drawer, and so forth.

In addition, as described in relation to FIG. 18, the user device 2002 can include, be connectable to, or otherwise be coupled to a reader device 2026, for reading payment instruments and/or identifiers associated with payment objects. The reader device 2026 can include a read head for reading a magnetic strip of a payment card, and further can include encryption technology for encrypting the information read from the magnetic strip. Additionally or alternatively, the reader device 2026 can be an EMV payment reader, which in some examples, can be embedded in the user device 2002. Moreover, numerous other types of readers can be employed with the user device 2002 herein, depending on the type and configuration of the user device 2002.

The reader device 2026 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 2026 may include hardware implementation, such as slots, magnetic tracks, and rails with one or more sensors or electrical contacts to facilitate detection and acceptance of a payment instrument. That is, the reader device 2026 may include hardware implementations to enable the reader device 2026 to interact with a payment instrument via a swipe, a dip, or a tap to obtain payment data associated with a customer. Additionally or optionally, the reader device 2026 may also include a biometric sensor to receive and process biometric characteristics and process them as payment instruments, given that such biometric characteristics are registered with the payment service and connected to a financial account with a bank server. The reader device 2026 may include processing unit(s), computer-readable media, a reader chip, a transaction chip, a timer, a clock, a network interface, a power supply, and so on. That is, the reader device 2026 may include any of the computing components described herein with reference to the user device 2002 to implement the functionality provided by the reader device 2026.

In examples, the reader device 2026 includes a reader chip, which may perform functionality to control the power supply, among other functionality of the reader device 2026. The power supply may include one or more power supplies such as a physical connection to AC power or a battery. Power supply may include power conversion circuitry for converting AC power and generating a plurality of DC voltages for use by components of reader device 2026. When power supply includes a battery, the battery may be charged via a physical power connection, via inductive charging, or via any other suitable method.

The reader device 2026 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 2002, which can be a POS terminal, and the reader device 2026 are shown as separate devices, in additional or alternative examples, the user device 2002 and the reader device 2026 can be part of a single device, which may be a battery-operated device. In some examples, the reader device 2026 can have a display integrated therewith, which can be in addition to (or as an alternative of) the display 2016 associated with the user device 2002.

The server(s) 2004 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 2004 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 2004 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 2004 can include one or more processors 2028, one or more computer-readable media 2030, one or more I/O devices 2032, and one or more communication interfaces 2034. Each processor 2028 can be a single processing unit or a number of processing units, and can include single or multiple computing units or multiple processing cores. The processor(s) 2028 can be implemented as one or more microprocessors, microcomputers, microcontrollers, digital signal processors, central processing units, state machines, logic circuitries, and/or any devices that manipulate signals based on operational instructions. For example, the processor(s) 2028 can be one or more hardware processors and/or logic circuits of any suitable type specifically programmed or configured to execute the algorithms and processes described herein. The processor(s) 2028 can be configured to fetch and execute computer-readable instructions stored in the computer-readable media 2030, which can program the processor(s) 2028 to perform the functions described herein.

The computer-readable media 2030 can include volatile and nonvolatile memory and/or removable and non-removable media implemented in any type of technology for storage of information, such as computer-readable instructions, data structures, program components, or other data. Such computer-readable media 2030 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 2004, the computer-readable media 2030 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 2030 can be used to store any number of functional components that are executable by the processor(s) 2028. In many implementations, these functional components comprise instructions or programs that are executable by the processors 2028 and that, when executed, specifically configure the one or more processors 2028 to perform the actions attributed above to the merchant platform 1810, the P2P platform 1812, and/or the media content platform 1814. Functional components stored in the computer-readable media 2030 can optionally include a user interface component 2035, an invoice management component 2036, a encoded object generating component 2037, a payment medium selection component 2038, and a lookup component 2039, a merchant component 2040, and/or one or more other components and data 2041. The computer-readable media 2030 can additionally include an operating system 2042 for controlling and managing various functions of the server(s) 2004.

Certain elements of environment 100 described with respect to FIG. 1 correspond to similar elements described herein with respect to FIG. 20. For example, the server(s) 2004 can correspond to server(s) 104, the network(s) 2006 can correspond to the network(s) 108, the client device(s) 2002 can correspond to any of the user device(s) 112, the datastore 1944 can correspond to datastore 128, etc.

Similar to server(s) 104, servers 2004 can store one or more functional components that enable the payment service to perform operations as described herein. For example, the server(s) 2004 can store a user interface component 2035 that can correspond to user interface component 117, an invoice management component 2036 that can correspond to invoice management component 119, a encoded object generating component 2037 that can correspond to encoded object generating component 120, a payment medium selection component 2038 that can correspond to payment medium selection component 121, and a lookup component 2039 that can correspond to lookup component 123. The computer-readable media 2030 can also include a merchant component 2040 and/or one or more other components and data 2041. The merchant component 2040 can be configured to receive transaction data from POS systems. The merchant component 2040 can transmit requests (e.g., authorization, capture, settlement, etc.) to payment service server computing device(s) to facilitate POS transactions between merchants and customers. The merchant component 2040 can communicate the successes or failures of the POS transactions to the POS systems. Each component can function similarly to the respective components described in FIG. 1. In some examples, the user interface 2020 can be any of the user interfaces of any of FIGS. 1-13B.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The communication interface(s) 2034 can include one or more interfaces and hardware components for enabling communication with various other devices, such as over the network(s) 2006 or directly. For example, communication interface(s) 2034 can enable communication through one or more network(s) 2006, which can include, but are not limited any type of network known in the art, as described herein.

The server(s) 2004 can further be equipped with various I/O devices 2032. Such I/O devices 2032 can include a display, various user interface controls (e.g., buttons, joystick, keyboard, mouse, touch screen, biometric or sensory input devices, etc.), audio speakers, connection ports and so forth.

In at least one example, the system 2000 can include a datastore 2044 that can be configured to store data that is accessible, manageable, and updatable. In some examples, the datastore 2044 can be integrated with the user device 2002 and/or the server(s) 2004. In other examples, as shown in FIG. 0, the datastore 2044 can be located remotely from the server(s) 2004 and can be accessible to the server(s) 2004. The datastore 2044 can comprise multiple databases and/or servers connected locally and/or remotely via the network(s) 2006. In at least one example, the datastore 2044 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 2044 can store inventory database(s) and/or catalog database(s). As described above, an inventory can store data associated with a quantity of each item that a merchant has available to the merchant. Furthermore, a catalog can store data associated with items that a merchant has available for acquisition. The datastore 2044 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

What is claimed is:

1. A computer-implemented method comprising:

receiving, by at least one computing device of a cryptocurrency service provider, a cryptocurrency payment request, wherein a cryptocurrency payment associated with the cryptocurrency payment request is to be made to a recipient address of a recipient;

generating, by the at least one computing device of the cryptocurrency service provider, a link for facilitating the cryptocurrency payment, wherein the recipient address is encoded in the link;

causing, by the at least one computing device of the cryptocurrency service provider, the link to be presented via a recipient user interface of a recipient user device associated with the recipient, wherein the recipient user interface is associated with a first user interface element, a first interaction with which causes one or more sharing options to be presented;

receiving, by the at least one computing device of the cryptocurrency service provider, an input associated with the one or more sharing options, wherein the input designates a user and an application on a user device of the user for sharing the cryptocurrency payment request;

causing, by the at least one computing device of the cryptocurrency service provider and responsive to receiving the input, the link to be shared over a network with the user device via the application, wherein a second user interface element representative of the link is presented via an interactive user interface of the application; and based at least in part on receiving an indication of a second interaction with the link via the second user interface element, causing the application to transition from a background of the user device to a foreground of the user device and present an interactive payment user interface to activate the cryptocurrency payment from the user to the recipient using cryptocurrency stored in a balance managed by the cryptocurrency service provider.

2. The computer-implemented method of claim 1, wherein the recipient address is associated with a layer 2 cryptocurrency network, and wherein the cryptocurrency payment is made using the layer 2 cryptocurrency network.

3. The computer-implemented method of claim 1, wherein the second interaction with the link enables the cryptocurrency payment to be implemented via at least one of a layer 1 cryptocurrency network or a layer 2 cryptocurrency network.

4. The computer-implemented method of claim 1, wherein the application comprises at least one of a messaging application, an email application, a social networking application, a blogging application, a microblogging application, a forum application, a close proximity data transfer application, a collaboration application, a payment application, a web browser application, or a cryptocurrency application associated with the cryptocurrency service provider.

5. The computer-implemented method of claim 1, further comprising receiving, in association with the cryptocurrency payment request, an amount of the cryptocurrency payment request, wherein the amount is encoded in the link.

6. The computer-implemented method of claim 1, further comprising receiving, via an additional input received through the interactive payment user interface, an amount of the cryptocurrency payment.

7. The computer-implemented method of claim 1, wherein the one or more sharing options include at least one of a plurality of applications or a plurality of users.

8. The computer-implemented method of claim 1, wherein the link is formatted based on specifications of at least one of the application or the user device prior to sharing the link via the application.

9. The computer-implemented method of claim 1, further comprising:

determining contextual data associated with at least one of the recipient, the user, or the cryptocurrency payment; and selecting the application from a plurality of applications installed on the user device based on the contextual data, wherein causing of the application to transition from the background of the user device to the foreground of the user device and present the interactive payment user interface to activate the cryptocurrency payment from the user to the recipient using the cryptocurrency stored in the balance is based at least in part on the application being selected.

10. The computer-implemented method of claim 1, wherein the second user interface element representative of the link being presented via the interactive user interface is based at least in part on a determination about whether the user device has an instance of a cryptocurrency application installed thereon.

11. The computer-implemented method of claim 1, wherein the interactive payment user interface includes an identifier of the recipient for verification of an identity of the recipient, wherein the identifier includes at least one of a name of the recipient, an image representative of the recipient, or a user identifier associated with the recipient.

12. The computer-implemented method of claim 1, wherein the second user interface element includes an identifier of the recipient for verification of an identity of the recipient, wherein the identifier includes at least one of a name of the recipient, an image representative of the recipient, or a user identifier associated with the recipient.

13. The computer-implemented method of claim 1, wherein the second user interface element includes an obfuscated instance of the recipient address.

14. The computer-implemented method of claim 1, wherein the link includes an obfuscated instance of the recipient address.

15. A system associated with a cryptocurrency service provider and comprising one or more processors and a non-transitory computer-readable memory communicatively coupled with the one or more processors, the non-transitory computer-readable memory storing instructions that, when executed by the one or more processors, cause the one or more processors to perform operations comprising:

receiving a cryptocurrency payment request, wherein a cryptocurrency payment associated with the cryptocurrency payment request is to be made to a recipient address of a recipient;

generating a link for facilitating the cryptocurrency payment, wherein the recipient address is encoded in the link;

causing the link to be presented via a recipient user interface of a recipient user device associated with the recipient, wherein the recipient user interface is associated with a first user interface element, a first interaction with which causes one or more sharing options to be presented;

receiving an input associated with the one or more sharing options, wherein the input designates a user and an application on a user device of the user for sharing the cryptocurrency payment request;

causing, responsive to receiving the input, the link to be shared over a network with the user device via the application, wherein a second user interface element representative of the link is presented via an interactive user interface of the application; and based at least in part on receiving an indication of a second interaction with the link via the second user interface element, causing the application to transition from a background of the user device to a foreground of the user device and present an interactive payment user interface to activate the cryptocurrency payment from the user to the recipient using cryptocurrency stored in a balance managed by the cryptocurrency service provider.

16. The system of claim 15, wherein the recipient address is associated with a layer 2 cryptocurrency network, and wherein the cryptocurrency payment is made using the layer 2 cryptocurrency network.

17. The system of claim 15, wherein the second interaction with the link enables the cryptocurrency payment to be implemented via at least one of a layer 1 cryptocurrency network or a layer 2 cryptocurrency network.

18. A non-transitory computer-readable medium storing instructions that, when executed, effectuate operations comprising:

receiving, by at least one computing device of a cryptocurrency service provider, a cryptocurrency payment request, wherein a cryptocurrency payment associated with the cryptocurrency payment request is to be made to a recipient address of a recipient;

generating, by the at least one computing device of the cryptocurrency service provider, a link for facilitating the cryptocurrency payment, wherein the recipient address is encoded in the link;

causing, by the at least one computing device of the cryptocurrency service provider, the link to be presented via a recipient user interface of a recipient user device associated with the recipient, wherein the recipient user interface is associated with a first user interface element, a first interaction with which causes one or more sharing options to be presented;

receiving, by the at least one computing device of the cryptocurrency service provider, an input associated with the one or more sharing options, wherein the input designates a user and an application on a user device of the user for sharing the cryptocurrency payment request;

causing, by the at least one computing device of the cryptocurrency service provider and responsive to receiving the input, the link to be shared over a network with the user device via the application, wherein a second user interface element representative of the link is presented via an interactive user interface of the application; and based at least in part on receiving an indication of a second interaction with the link via the second user interface element, causing the application to transition from a background of the user device to a foreground of the user device and present an interactive payment user interface to activate the cryptocurrency payment from the user to the recipient using cryptocurrency stored in a balance managed by the cryptocurrency service provider.

19. The computer-implemented method of claim 1, wherein the application is a cryptocurrency application associated with the cryptocurrency service provider, and wherein the cryptocurrency application includes the interactive payment user interface.

20. The computer-implemented method of claim 1, wherein the application is a web browser, and wherein the interactive payment user interface is part of a website accessed through the web browser.

* * * * *